(12) United States Patent
Date et al.

(10) Patent No.: US 8,116,537 B2
(45) Date of Patent: Feb. 14, 2012

(54) IMAGE RECORDING DEVICE, PLAYER DEVICE, IMAGING DEVICE, PLAYER SYSTEM, METHOD OF RECORDING IMAGE, AND COMPUTER PROGRAM

(75) Inventors: Osamu Date, Tokyo (JP); Toshihiro Ishizaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 996 days.

(21) Appl. No.: 12/053,899

(22) Filed: Mar. 24, 2008

(65) Prior Publication Data

US 2008/0247600 A1 Oct. 9, 2008

(30) Foreign Application Priority Data

Apr. 4, 2007 (JP) .................................. 2007-098101
May 22, 2007 (JP) .................................. 2007-134948

(51) Int. Cl.
*G06K 9/62* (2006.01)
(52) U.S. Cl. ....................................................... 382/118
(58) Field of Classification Search ........................ None
See application file for complete search history.

(56) References Cited

U.S. PATENT DOCUMENTS

| 7,835,550 | B2 * | 11/2010 | Tamaru ........................... 382/118 |
| 2003/0182297 | A1 | 9/2003 | Murakami et al. |
| 2004/0221356 | A1 | 11/2004 | Rekkedal |
| 2006/0195486 | A1 | 8/2006 | Ohno et al. |
| 2006/0274978 | A1 * | 12/2006 | Fukuda et al. ................. 382/305 |

FOREIGN PATENT DOCUMENTS

| CN | 1462398 A | 12/2003 |
| CN | 1825461 A | 8/2006 |
| CN | 1908936 A | 2/2007 |
| EP | 1 372 087 A1 | 12/2003 |
| EP | 1 453 054 A1 | 9/2004 |
| EP | 1 708 197 A2 | 10/2006 |
| EP | 1 737 215 A1 | 12/2006 |
| EP | 1 816 568 A1 | 8/2007 |
| GB | 2 395 653 A | 6/2004 |
| GB | 2 395 653 B | 6/2004 |

(Continued)

OTHER PUBLICATIONS

Lei Zhang, et al "Automated Annotation of Human Faces in Family Albums", Proceedings of the 11th, ACM International Conference on Multimedia, MM ' 03, XP002361520, Nov. 2, 2003, 4 Pages.

*Primary Examiner* — Brian Werner
(74) *Attorney, Agent, or Firm* — Oblon, Spivak, McClelland, Maier & Neustadt, L.L.P.

(57) ABSTRACT

An imaging device detects a face of a subject from an image in response to inputting of the image containing the subject, and generates face data related to the face. The imaging device generates face data management information managing the face data and controls recording of the input image, the generated face data and the face data management information on a recording unit with the input image mapped to the face data and the face data management information. The face data contains a plurality information components recorded in a predetermined recording order. The face data management information, in a data structure responsive to the recording order of the information components of the face data, contains a train of consecutively assigned bits. The information components are assigned predetermined flags in the recording order. Each flag represents the presence or absence of the information component corresponding to the flag in the face data.

25 Claims, 34 Drawing Sheets

FOREIGN PATENT DOCUMENTS

| GB | 2 395 853 A | 6/2004 |
| JP | 3-185967 | 8/1991 |
| JP | 11-219352 | 8/1999 |
| JP | 11-306186 | 11/1999 |
| JP | 2004-318603 | 11/2004 |
| JP | 2004-336466 | 11/2004 |
| JP | 2007-41987 | 2/2007 |
| WO | WO 2006/134110 A1 | 12/2006 |
| WO | WO 2007/023784 A1 | 3/2007 |

\* cited by examiner

FIG. 7A
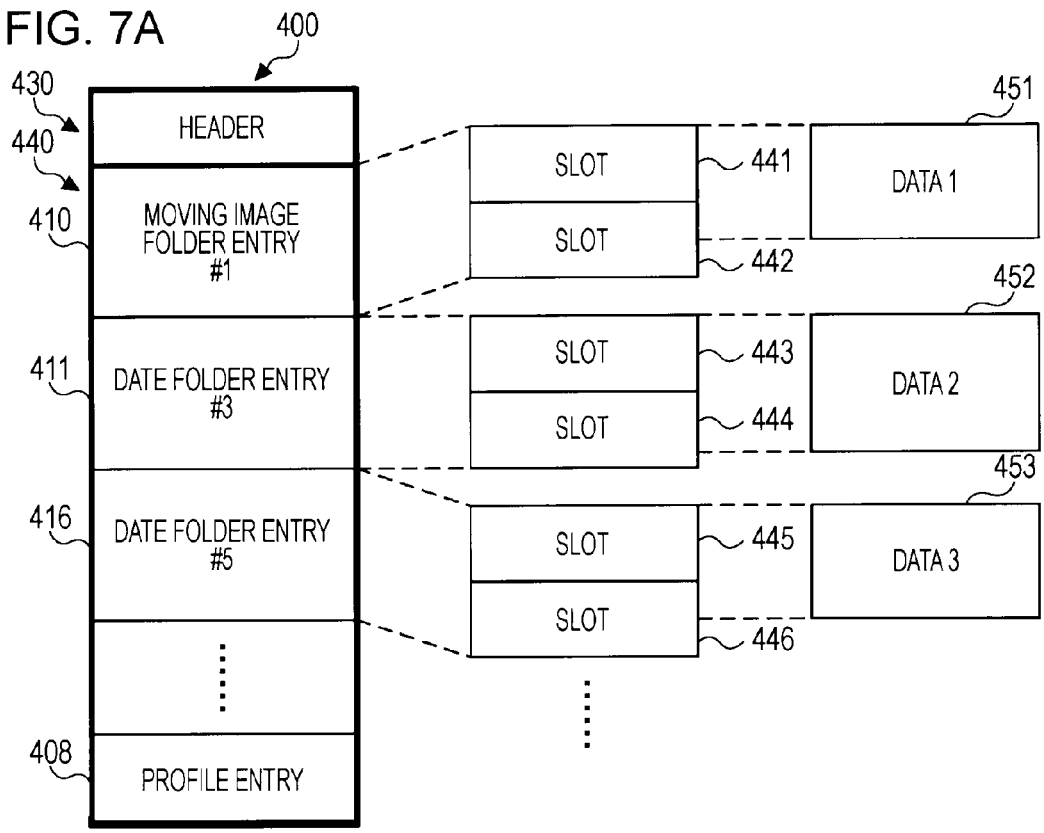
FIG. 7B
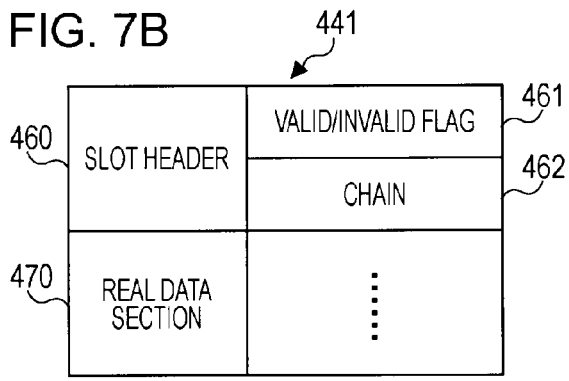
FIG. 7C
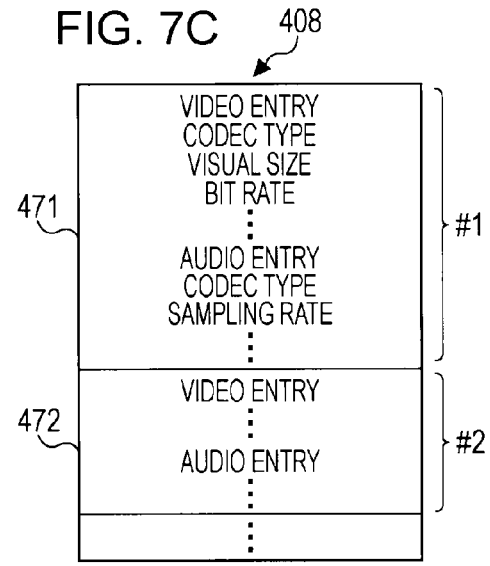
FIG. 7D
| HD MOVING IMAGE | SD MOVING IMAGE | STILL IMAGE | RESERVED | | | | |
|---|---|---|---|---|---|---|---|
| 0 | 0 | 0 | 0 | 0 | 0 | 0 | 0 |

| FIELD NAME | | SIZE | | CONTENTS |
|---|---|---|---|---|
| FACE DETECTION TIME INFORMATION | | 5 bytes | | DETECTION TIME OF FACE |
| BASIC FACE INFORMATION | FACE POSITION | 8 bytes | UPPER 4 bytes | POSITION INFORMATION OF DETECTED FACE |
| | FACE SIZE | | LOWER 4 bytes | IMAGE SIZE OF DETECTED FACE |
| FACE SCORE | | 4 bytes | | SCORE INFORMATION INDICATING LIKELINESS OF FACE |
| SMILING FACE SCORE | | 4 bytes | | SCORE INFORMATION OF DEGREE OF SMILE |
| IMPORTANCE OF FACE | | 1 byte | | INFORMATION INDICATING IMPORTANCE OF FACES IN IMAGE DETECTED AT THE SAME TIME |

641 — FACE DETECTION TIME INFORMATION
642 — BASIC FACE INFORMATION
643 — FACE SCORE
644 — SMILING FACE SCORE
645 — IMPORTANCE OF FACE

| Bit | FLAG NAME (CORRESPONDING TO FIELD NAME IN FACE DATA SECTION) |
|---|---|
| 0 | FACE DETECTION TIME INFORMATION |
| 1 | BASIC FACE INFORMATION |
| 2 | FACE SCORE |
| 3 | SMILING FACE SCORE |
| 4 | FACE IMPORTANCE |
| 127-5 | RESERVED AREA = 0 |

| FACE DATA |
|---|
| FACE DETECTION TIME INFORMATION |
| BASIC FACE INFORMATION |
| FACE SCORE |
| SMILING FACE SCORE |
| FACE IMPORTANCE |

660

| Bit | FLAG NAME (CORRESPONDING TO FIELD NAME IN FACE DATA SECTION) | VALUE |
|---|---|---|
| 0 | FACE DETECTION TIME INFORMATION | 1 |
| 1 | BASIC FACE INFORMATION | 1 |
| 2 | FACE SCORE | 1 |
| 3 | SMILING FACE SCORE | 1 |
| 4 | FACE IMPORTANCE | 1 |
| 127-5 | RESERVED AREA = 0 | 0 |

| FACE DATA |
|---|
| FACE DETECTION TIME INFORMATION |
| BASIC FACE INFORMATION |
| FACE SCORE |

660

| Bit | FLAG NAME<br>(CORRESPONDING TO FIELD NAME IN FACE DATA SECTION) | VALUE |
|---|---|---|
| 0 | FACE DETECTION TIME INFORMATION | 1 |
| 1 | BASIC FACE INFORMATION | 1 |
| 2 | FACE SCORE | 1 |
| 3 | SMILING FACE SCORE | 0 |
| 4 | FACE IMPORTANCE | 0 |
| 127-5 | RESERVED AREA = 0 | 0 |

FIG. 15A

| FACE DATA |
|---|
| FACE DETECTION TIME INFORMATION |
| BASIC FACE INFORMATION |
| FACE SCORE |
| SMILING FACE SCORE |
| FACE IMPORTANCE |
| SEX DIFFERENCE SCORE |
| ANGLE INFORMATION |

| Bit | FLAG NAME (CORRESPONDING TO FIELD NAME WITHIN IN FACE DATA SECTION) | VALUE |
|---|---|---|
| 0 | FACE DETECTION TIME INFORMATION | 1 |
| 1 | BASIC FACE INFORMATION | 1 |
| 2 | FACE SCORE | 1 |
| 3 | SMILING FACE SCORE | 1 |
| 4 | FACE IMPORTANCE | 1 |
| 5 | SEX DIFFERENCE SCORE | 1 |
| 6 | ANGLE INFORMATION | 1 |
| 127-5 | RESERVED AREA = 0 | 0 |

| FACE DATA |
|---|
| FACE DETECTION TIME INFORMATION |
| BASIC FACE INFORMATION |
| FACE SCORE |
| FACE IMPORTANCE |
| ANGLE INFORMATION |

660

| Bit | FLAG NAME<br>(CORRESPONDING TO FIELD NAME WITHIN IN FACE DATA SECTION) | VALUE |
|---|---|---|
| 0 | FACE DETECTION TIME INFORMATION | 1 |
| 1 | BASIC FACE INFORMATION | 1 |
| 2 | FACE SCORE | 1 |
| 3 | SMILING FACE SCORE | 0 |
| 4 | FACE IMPORTANCE | 1 |
| 5 | SEX DIFFERENCE SCORE | 0 |
| 6 | ANGLE INFORMATION | 1 |
| 127-5 | RESERVED AREA = 0 | 0 |

IMAGE RECORDING DEVICE, PLAYER DEVICE, IMAGING DEVICE, PLAYER SYSTEM, METHOD OF RECORDING IMAGE, AND COMPUTER PROGRAM

CROSS REFERENCES TO RELATED APPLICATIONS

The present invention contains subject matter related to Japanese Patent Application JP 2007-098101 filed in the Japanese Patent Office on Apr. 4, 2007, and Japanese Patent Application JP 2007-134948 filed in the Japanese Patent Office on May 22, 2007, the entire contents of which are incorporated herein by reference.

BACKGROUND OF THE INVENTION

1. Field of the Invention

The present invention relates to an image recording device. In particular, the present invention relates to an image recording device for recording and playing an image, a player device, an imaging device, an image player system, a method of recording image and a computer program.

2. Description of the Related Art

Content data such as a still image or a moving image and metadata incidental to the content data are recorded with the content data mapped to the metadata and various operations are performed using the metadata. A variety of techniques have been proposed to facilitate such operations.

In one current technique, a character's face contained in the content data such as a still image or a moving image is detected and information relating to the detected face is registered as metadata. An identification process to identify whether the detected character's face is a face of a particular person can be also performed.

In Japanese Unexamined Patent Application Publication No. 2004-336466 discloses a metadata registration method. In accordance with the disclosure, a face is detected in a captured image, a rectangular region containing the face and personal information such as a name of the person of the face are registered in a tag format in an image file as metadata.

SUMMARY OF THE INVENTION

The metadata including the rectangular region containing the detected face and the personal information is stored in a tag format in an image file in the related art. When the image file is viewed, an operation to use the metadata mapped to the face is activated by clicking the predetermined face.

The image file is now searched, for example. When the image file is searched using the metadata registered in accordance with the related art, each tag needs to be detected and verified because the metadata is written in the tag format in the image file. Detecting and verifying each tag are time consuming, leading to longer search time for the image file. The content cannot be quickly used.

It is thus desirable that the use of the content data be sped up by means of using the metadata.

In accordance with one embodiment of the present invention, an image player system includes an image recording device, having an image input unit for inputting an image containing a subject, and a player device for playing the image input to the image recording device. The image recording device includes a face detection unit for detecting a face of the subject contained in the input image, a face data generation unit for generating face data related to the face based on the detected face, a face data management information generation unit for generating face data management information managing the generated face data, and a record control unit for controlling recording of the generated face data and the generated face data management information onto a predetermined recording unit. The face data includes a plurality of information components, the information components being recorded in a predetermined recording sequence. The face data management information is in a data structure having a train of bits assigned in the recording sequence of the information components of the face data, and contains face data structure information related to a presence or absence of the information component of the face data in the recording sequence. The player device includes an information component verification unit for verifying the presence or absence of the information component forming the face data in accordance with the face data structure information contained in the face data management information, a recording offset value calculating unit for calculating a recording offset value from a head of each face data of a desired information component out of information components forming the face data verified by the information component verification unit, and an information component reading unit for reading the desired information component out of the information components forming the face data in accordance with the calculated recording offset value. The face contained in the input image is thus detected. The face data generated based on the detected face and the face data management information managing the face data are recorded on the recording unit with the face data mapped to the face data management information. The presence or absence of the information component forming the face data is verified based on the face data structure information contained in the face data management information. The recording offset value from the head of the face data in the desired information component is calculated from among the information components forming the verified face data. The desired information component is read from the information component forming the face data in accordance with the recorded offset value.

In accordance with one embodiment of the present invention, an image recording device includes an image input unit for inputting an image containing a subject, a face detection unit for detecting a face of the subject contained in the input image, a face data generation unit for generating face data related to the face based on the detected face, a face data management information generation unit for generating face data management information managing the generated face data, and a record control unit for controlling recording of the generated face data and the generated face data management information onto predetermined recording unit. The face data includes a plurality of information components, the information components being recorded in a predetermined recording sequence. The face data management information contains face data structure information in a data structure having a train of bits assigned in the recording sequence of the information components of the face data. The face contained in the input image is thus detected. The face data generated based on the detected face and the face data management information managing the face data are recorded on the recording unit with the face data mapped to the face data management information.

The face data structure information may have a data structure of a train of consecutive bits with predetermined flags assigned in the recording sequence to the information components recorded in the recording sequence, and each flag may indicate the presence or absence of the information component corresponding to the flag in the face data. The face data management information containing the face data structure information is thus produced. The face data structure information has the data structure of the train of consecutively assigned bits. Each flag indicates the presence or absence of the information component corresponding to the flag in the face data.

The face data structure information may include a reserve bit train reserved for extended face data other than the information components. In this way, the face data management information containing the face data structure information is generated wherein the face data structure information contains the reserve bit train reserved for the extended face data other than the information components.

The face data generation unit may leave ungenerated the face data of a face detected by the face detection unit if the detected face fails to satisfy a predetermined condition. The face data of the face failing to satisfy the predetermined condition is left ungenerated.

The face data management information may contain data size information indicating a data size of the corresponding face data and version information indicating a version of the face data. The face data management information containing the data size information indicating the data size of the corresponding face data and the version information indicating the version of the face data is thus generated.

The face data may contain data regarding a position and a size of the face detected by the face detection unit. The face data containing the data regarding the position and the size of the face detected by the face detection unit is thus generated.

The image may be a moving image file, and the face detection unit may detect a face, contained in the moving image file, every predetermined time intervals. With this arrangement, the face contained in the moving image file is detected at predetermined time intervals. The record control unit may record the face data and the face data management information, related to the detected face, in the moving image file from which the face has been detected. With this arrangement, the face data and the face data management information, related to the detected face, are recorded in the moving image file from which the face has been detected.

The image may be an AVC codecked moving image file, and the face detection unit may detect a face in one of an IDR picture and an I picture contained in an SPS attached AU. With this arrangement, the face is detected in one of the IDR picture and the I picture contained in an SPS attached AU. The record control unit may record the face data and the face data management information, related to the detected face, in SEI in the AU containing one of the IDR picture and the I picture from which the face has been detected. With this arrangement, the face data and the face data management information, related to the detected face, are recorded in the SEI in the AU containing one of the IDR picture and the I picture from which the face has been detected.

The image may be a still image file, and the record control unit may record the face data and the face data management information, related to the detected face, in the still image file from which the face has been detected. With this arrangement, the face data and the face data management information, related to the detected face, are recorded in the still image file from which the face has been detected.

In accordance with one embodiment of the present invention, a player device plays an image in accordance with face data and face data management information, the face data related to a face contained in the image and including a plurality of information components, the information components being recorded in a predetermined recording sequence, the face data management information managing the face data and being in a data structure having a train of consecutively assigned bits in the recording sequence of the information components of the face data, and containing face data structure information related to a presence or absence of the information component of the face data in the recording sequence of the information components of the face data. The player device includes an information component verification unit for verifying the presence or absence of the information component forming the face data in accordance with the face data structure information contained in the face data management information, a recording offset value calculating unit for calculating a recording offset value from a head of each face data of a desired information component out of information components forming the face data verified by the information component verification unit and an information component reading unit for reading the desired information component out of the information components forming the face data in accordance with the calculated recording offset value. The presence or absence of the information component forming the face data is verified based on the face data structure information contained in the face data management information. The recording offset value from the head of the face data of the desired information component out of the information components forming the verified face data is calculated. The desired information component is read from the information component of the face data based on the recording offset value.

The image may contain information regarding update date and time at which the image has been updated. The face data management information may contain information regarding update date and time at which the corresponding image has been updated. The player device may further include an update information comparison unit for comparing the update date and time contained in the image with the update date and time contained in the face data management information of the corresponding image to determine whether the update time and date in the image matches the update time and date in the face data management information. The recording offset value calculating unit may calculate the recording offset value of the face data of the face contained in the image that the update information comparison unit has determined as having matched update date and time. With this arrangement, the update date and time of the image are compared with the update date and time contained in the face data management information of the image. The recording offset value of the face data of the face contained in the image determined as having the matched update date and time is thus calculated.

The player device may further include a face detection unit for detecting a face of a subject contained in the image that the update information comparison unit has determined as having unmatched update date and time, a face data generation unit for generating the face data of the face based on the face detected by the face detection unit, a face data management information generation unit for generating face data management information managing the face data, and a record control unit for controlling recording of the generated face data and the generated face data management information onto a predetermined recording unit, with respect to the image that the update information comparison unit has determined as having unmatched date and time. With this arrangement, as for the image determined as having the unmatched update date and time, the face data of the face is generated based on the face of the subject contained in the image. The face data management information managing the face data is generated. The image, the face data and the face data management information are recorded on the recording unit with each data mapped to the other data.

The player device may further include a search unit for searching for face data and face data management information, corresponding to an image different from the image that the update information comparison unit has determined as having unmatched update date and time if the update information comparison unit has determined that the update date and time in the image fail to match the update date and time in the face data management information. With this arrangement, if the update date and time in the image fail to match the update date and time in the face data management information, the face data and the face data management information, of the image different from the image determined as having the unmatched update date and time, are searched.

The image may contain information regarding an image size. The face data management information contains information regarding an image size of the corresponding image. The player device may further include an image size comparison unit for comparing the image size contained in the image with the image size contained in the face data management information of the corresponding image to determine whether the image size in the image matches the image size in the face data management information. The recording offset value calculating unit may calculate the recording offset value of the face data of the face contained in the image that the image size comparison unit has determined as having an matched image size. With this arrangement, as for the image determined as having the matched image size, the recording offset value of the face data of the face contained in the image is calculated. In this case, the image may contain rotation information related to a rotation thereof. The player device may further include a rotation information verification unit for verifying whether the rotation information is present in the image and whether the rotation information is valid. The offset value calculating unit may calculate the recording offset value of the face data of the face contained in the image that the rotation information verification unit has verified that the rotation information is present in the image and that the rotation information present in the image is valid. The recording offset value of the face data of the face contained in the image is calculated if the image contains the rotation information and if the rotation information is determined to be valid.

The face data management information may contain an error detection code value determined from the corresponding image. The player device may further include an error detection code value calculating unit for calculating the error detection code value based on at least a portion of image data of the image, and an error detection code value comparison unit for comparing the calculated error detection code value of the image with the error detection code value contained in the face data management information of the corresponding image. The offset value calculating unit may calculate the recording offset value of the face data of the face contained in the image that the error detection code value comparison unit has determined as having a matched error detection code value. With this arrangement, the recording offset value is calculated of the face data of the face contained in the image if the image is determined as having the matched error detection code value.

The face data management information may contain version information indicating a version of the face data. The player device may further include a version verification unit for verifying, based on the version information contained in the face data management information, whether the face data corresponding to the face data management information is valid. The offset value calculating unit may calculate the recording offset value of the face data that the version verification unit has determined as being valid. With this arrangement, the face data of the face data management information is determined whether the face data is supported, based on the version information contained in the face data management information. If the face data is determined to be supported, the recording offset value of the face data is calculated.

In accordance with one embodiment of the present invention, an imaging device include an imaging unit for capturing an image of a subject, an image input unit for inputting the image captured by the imaging unit, a face detection unit for detecting a face of the subject contained in the input image, a face data generation unit for generating face data relating to the detected face, a face data management information generation unit for generating face data management information managing the generated face data, and a record control unit for controlling recording the generated face data and face data management information onto a predetermined recording unit. The face data includes a plurality of information components, the information components being recorded in a predetermined recording sequence. The face data management information contains face data structure information related to a presence or absence of the information component of the face data in a recording sequence and has a data structure having a train of bits assigned in the recording sequence of the information components of the face data. With this arrangement, the face contained in the captured image is detected. The face data and the face data management information, generated based on the detected face, are recorded on the recording unit with the face data mapped to the face data management information.

In accordance with embodiments of the present invention, the content data is quickly used.

BRIEF DESCRIPTION OF THE DRAWINGS

FIGS. 7A-7D illustrate a basic structure of the property file in accordance with one embodiment of the present invention;

FIG. 11 diagrammatically illustrates face data stored on a header section in accordance with one embodiment of the present invention;

FIG. 12 illustrates a data structure of a face data structure flag of the header section in accordance with one embodiment of the present invention;

FIGS. 15A and 15B illustrate a relationship between a bit stored on the face data structure flag and face data stored on the face data section in accordance with one embodiment of the present invention;

DESCRIPTION OF THE PREFERRED EMBODIMENTS

The embodiments of the present invention are described below with reference to the attached drawings.

Figure 1:
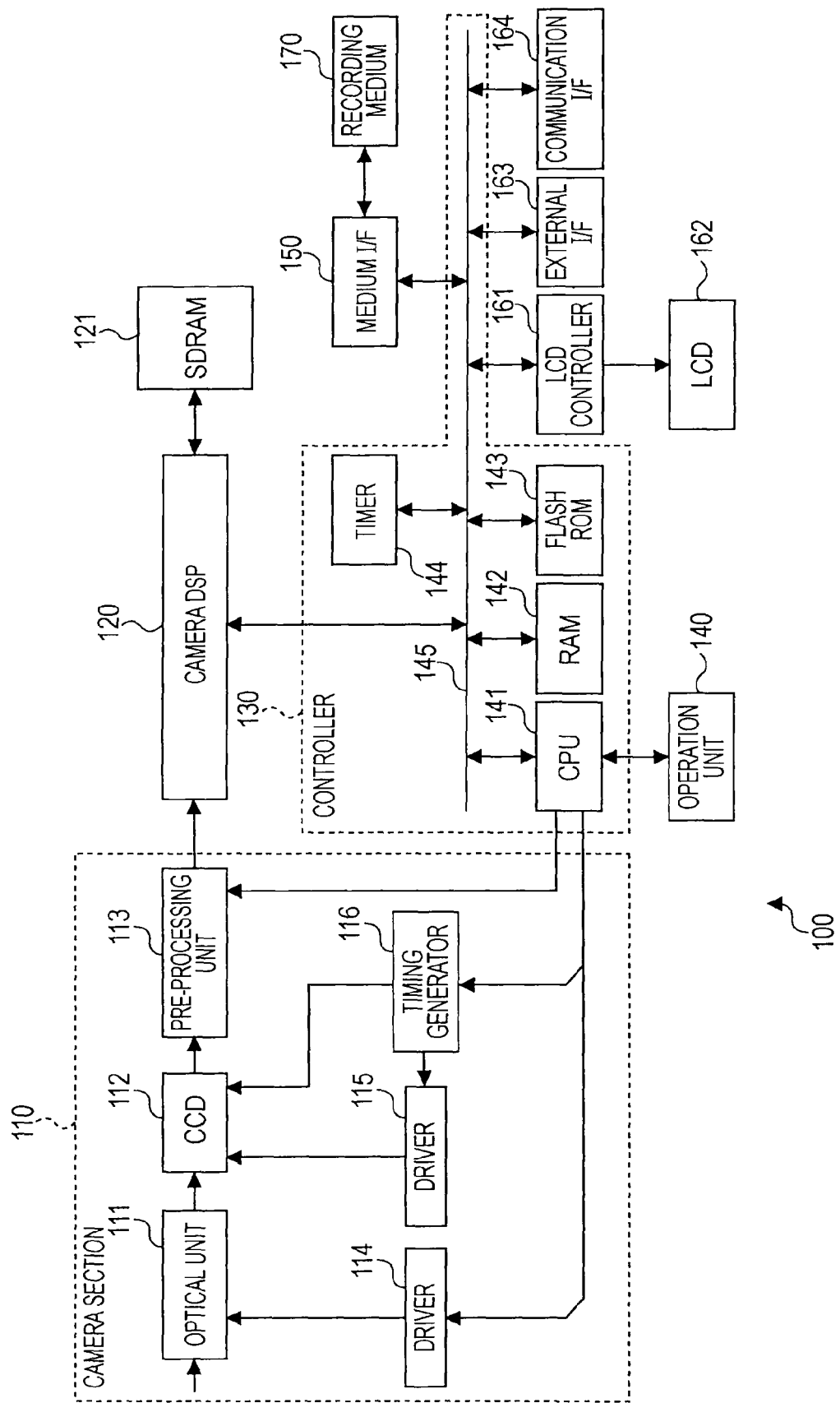
FIG. 1 is a block diagram of an imaging device in accordance with one embodiment of the present invention.

FIG. 1 is a block diagram of an imaging device 100 in accordance with one embodiment of the present invention. The imaging device 100 includes, as major elements thereof, a camera section 110, a camera digital signal processor (DSP) 120, a synchronous dynamic random access memory (SDRAM) 121, a controller 130, an operation unit 140, a medium interface (I/F) 150, a liquid-crystal display (LCD) controller 161, an LCD 162, an external I/F 163 and a communication I/F 164. A recording medium 170 connected to the medium I/F 150 may or may not internal to the imaging device 100. Alternatively, the recording medium 170 may be removably loaded onto the imaging device 100.

The recording medium 170 may be a memory card constructed of a semiconductor memory, an optical recording medium such as a digital versatile disk (DVD) or a recordable compact disk (CD), a magnetic disk or a hard disk drive (HDD).

The camera section 110 includes an optical unit 111, a charge-coupled device (CCD) 112, a pre-processing unit 113, an optical block driver 114, a CCD driver 115 and a timing generator 116. The optical unit 111 includes a lens, a focus mechanism, a shutter mechanism, an iris mechanism, etc.

The controller 130 includes a central processing unit (CPU) 141, a random-access memory (RAM) 142, a flash read-only memory (ROM) 143 and a timer 144 with these elements mutually connected to each other by a system bus 145. The controller 130 may be a general-purpose built-in microcomputer or a dedicated large scale integrated circuit (LSI). The controller 130 generally controls each element of the imaging device 100.

The RAM 142 serves as a working area to temporarily store interim results of each process. The flash ROM 143 stores a variety of programs executed by the CPU 141 and data required by the CPU 141 in each process. The timer 144 gives present day, month, year and present day of the week, and present time. The timer 144 also gives image capturing date and time.

In the image capturing, the optical unit driver 114 under the control of the controller 130 generates a drive signal to drive the optical unit 111 and drives the drive signal to the optical unit 111 by supplying the drive signal thereto. The focus mechanism, the shutter mechanism and the iris mechanism in the optical unit 111 are controlled in response to the drive signal from the optical unit driver 114. The optical unit 111 captures an optical image of a subject and focuses the optical images on the CCD 112.

The CCD 112 photoelectrically converts the optical image from the optical unit 111 and outputs an electrical signal of the image as a result of photoelectrical conversion. More specifically, the CCD 112 receives the optical image of the subject from the optical unit 111 in response to a drive signal from a CCD driver 115. In response to a timing signal from the timing generator 116 controlled by the controller 130, the CCD 112 supplies to the pre-processing unit 113 the captured image of the subject (image information) in the form of an electrical signal. A photoelectric converter such as a complementary metal-oxide semiconductor (CMOS) sensor may be substituted for the CCD 112.

As described above, the timing generator 116 under the control of the controller 130 generates the timing signal to provide a predetermined timing. In response to the timing signal from the timing generator 116, the CCD driver 115 generates the drive signal to be supplied to the CCD 112.

The pre-processing unit 113 performs a correlated double sampling (CDS) process on the electrical signal as the image information supplied from the CCD 112 in order to keep signal-to-noise (S/N) ratio at an excellent level. The pre-processing unit 113 also performs automatic gain control (AGC) process on the electrical signal, thereby controlling gain. The pre-processing unit 113 also an analog-to-digital conversion process on the electrical signal as the image information, thereby resulting in image data in the form of a digital signal.

The image data converted into the form of digital signal by the pre-processing unit 113 is supplied to the camera DSP 120. The camera DSP 120 performs, on the supplied image data, camera signal processing including an auto focus (AF) process, an auto exposure (AE) process, and an auto white balance (AWB) process. The image data having undergone such a variety of processes is encoded in accordance with joint photographic experts group (JPEG) or JPEG2000, and then supplied to the recording medium 170 via the system bus 145 and the medium I/F 150. The image data is thus recorded as a file on the recording medium 170. The camera DSP 120 performs one of a data compression process and a data decompression process in accordance with MPEG4-AVC standard.

Target image data is then read from the recording medium 170 via the medium I/F 150 in response to a user operation input received by the operation unit 140 including a touch-panel and control keys. The read target image data is then supplied to the camera DSP 120.

The camera DSP 120 decodes the encoded image data read from the recording medium 170 via the medium I/F 150 and supplies the decoded image data to the LCD controller 161 via the system bus 145. The LCD controller 161 generates an image signal to be supplied to the LCD 162 from the supplied video data. An image responsive to the image data recorded on the recording medium 170 is thus displayed on the LCD 162. The camera DSP 120 detects a face contained in the image data supplied from one of the pre-processing unit 113 and the recording medium 170 and outputs to the controller 130 information related to the detected face.

The imaging device 100 includes the external I/F 163. The imaging device 100, connected to an outside personal computer via the external I/F 163, receives image data from the outside personal computer. The imaging device 100 then records the image data onto the recording medium 170 or supplies, to the outside personal computer, image data recorded on the recording medium 170 loaded thereon.

The communication I/F 164 includes a network interface card (NIC). The communication I/F 164, connected to a network, acquires a variety of image data and other information via the network.

The imaging device 100 reads and plays image data and the like acquired from the outside personal computer or via the network and displays the image data and the like on the LCD 162 for user.

The communication I/F 164 may be a wired interface complying with Institute of Electrical and Electronic Engineers (IEEE) 1394 and Universal Serial Bus (USB). The communication I/F 164 may be a wireless interface complying with IEEE802 11a, IEEE802 11b, IEEE802 11g or Bluetooth standards. In other words, the communication I/F 164 may be a wired interface or a wireless interface.

The imaging device 100 captures an image of a subject and records the image onto the recording medium 170 loaded thereon. The imaging device 100 reads and plays image data recorded on the recording medium 170. The imaging device 100 receives image data from the outside personal computer or via the network and records the received image data onto the recording medium 170. The imaging device 100 then reads and plays image data recorded on the recording medium 170.

A moving image content file used in one embodiment of the present invention is described in detail below.

Figure 2:
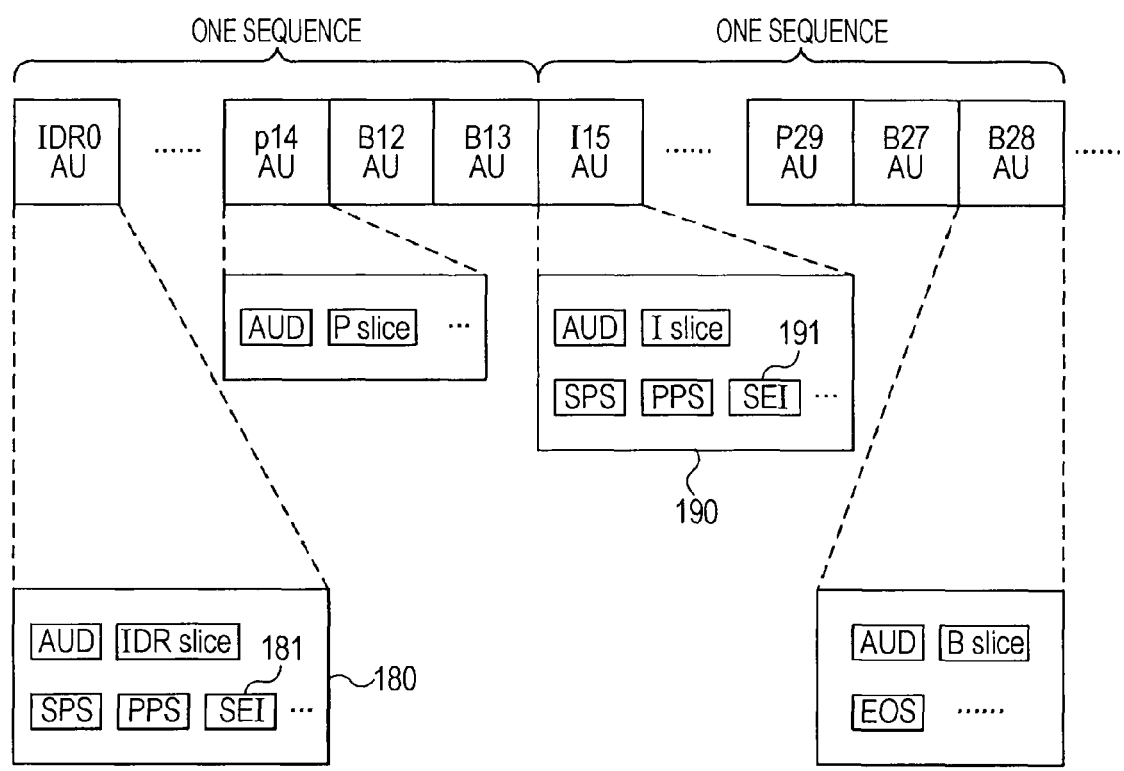
FIG. 2 diagrammatically illustrates a frame of a video signal encoded into which image data captured by the imaging device is encoded in accordance with MPEG 4-AVC in accordance with one embodiment of the present invention.

FIG. 2 diagrammatically illustrates a predetermined frame of a video signal into which image data captured by the imaging device 100 is encoded in accordance with MPEG4-AVC (MPEG-4 part10:AVC).

In accordance with one embodiment of the present invention, a face of a person contained in a video signal encoded in accordance with MPEG4-AVC is detected. Face metadata related to the detected face is then recorded. Such recording process is described below.

In accordance with MPEG4-AVC standard, network abstract layer (NAL) is present between a video coding layer (VCL) for handling a moving image encoding process and a lower system for transmitting and storing encoded information. A parameter set corresponding to header information of a sequence or a picture may be handled separately from information generated in the VCL. Mapping of a bit stream to a lower system such as an MPEG-2 system is performed according to "NAL unit" as one session of NAL.

The NAL unit is described. Sequence parameter set (SPS) NAL unit contains information related to encoding of an entire sequence, such as profile and level information. In an access unit (AU) to be discussed later, an AU session having an SPS NAL unit inserted therewithin is generally considered one sequence. Editing of a stream, such as partial deletion or coupling, is performed by sequence as an edit unit. A picture parameter set (PPS) NAL unit contains information related to an encoding mode of an entire picture, such as an entropy encoding mode and a quantization parameter on a per picture unit.

Encoded data of instantaneous decoder refresh (IDR) picture is stored in code slice of an IDR picture NAL unit. Encoded data of other picture than the IDR picture is stored in coded slice of a non IDR picture NAL unit.

Incidental information not essential to encoding of VCL is stored in supplemental enhancement information (SEI) NAL unit. For example, information convenient for random access and information uniquely defined by a user are stored in the SEI NAL unit. An access unit delimiter (AUD) NAL unit is attached to a head of the AU to be discussed later. The AUD NAL unit contains information indicating a type of slice contained in the access unit. Also defined are end of sequence (EOS) NAL unit indicating the end of the sequence and an end of stream (EOST) NAL unit indicating the end of stream.

A set of several NAL units formed to access information in the bit stream by picture is referred to as access unit (AU). The AU contains NAL units (coded slice of an IDR picture NAL unit or coded slice of a non-IDR NAL unit) corresponding to a slice of the picture. In accordance with one embodiment of the present invention, a chunk of AUs starting with an AU containing one SPS NAL unit and ending an AU containing one EOS NAL unit is defined as one sequence. The AU containing an SPS contains a NAL unit corresponding to a slice of the IDR picture or the I picture. Since one of the IDR picture and the I picture, each decodable without dependence on another picture, is positioned at the head of decoding sequence of one sequence, one sequence can be set as a random access unit or editing unit.

As shown in FIG. 2, an AU 180 containing an SPS contains an SEI NAL unit 181. An AU 190 containing an SPS contains an SEI NAL unit 191. The SEI NAL unit 181 and the SEI NAL unit 191 will be described later in conjunction with a modification of one embodiment of the present invention.

In accordance with one embodiment of the present invention, a face of a person is detected from moving content data and unit of detection used is one sequence. More specifically, within one sequence, a face is detected from within one frame contained in the one sequence and face detection is not performed from another frame. Alternatively, face detection may be performed every predetermined sequences, or at each sequence containing the IDR.

A real file recorded on the recording medium 170 is described in detail in conjunction with drawings.

Figure 3:
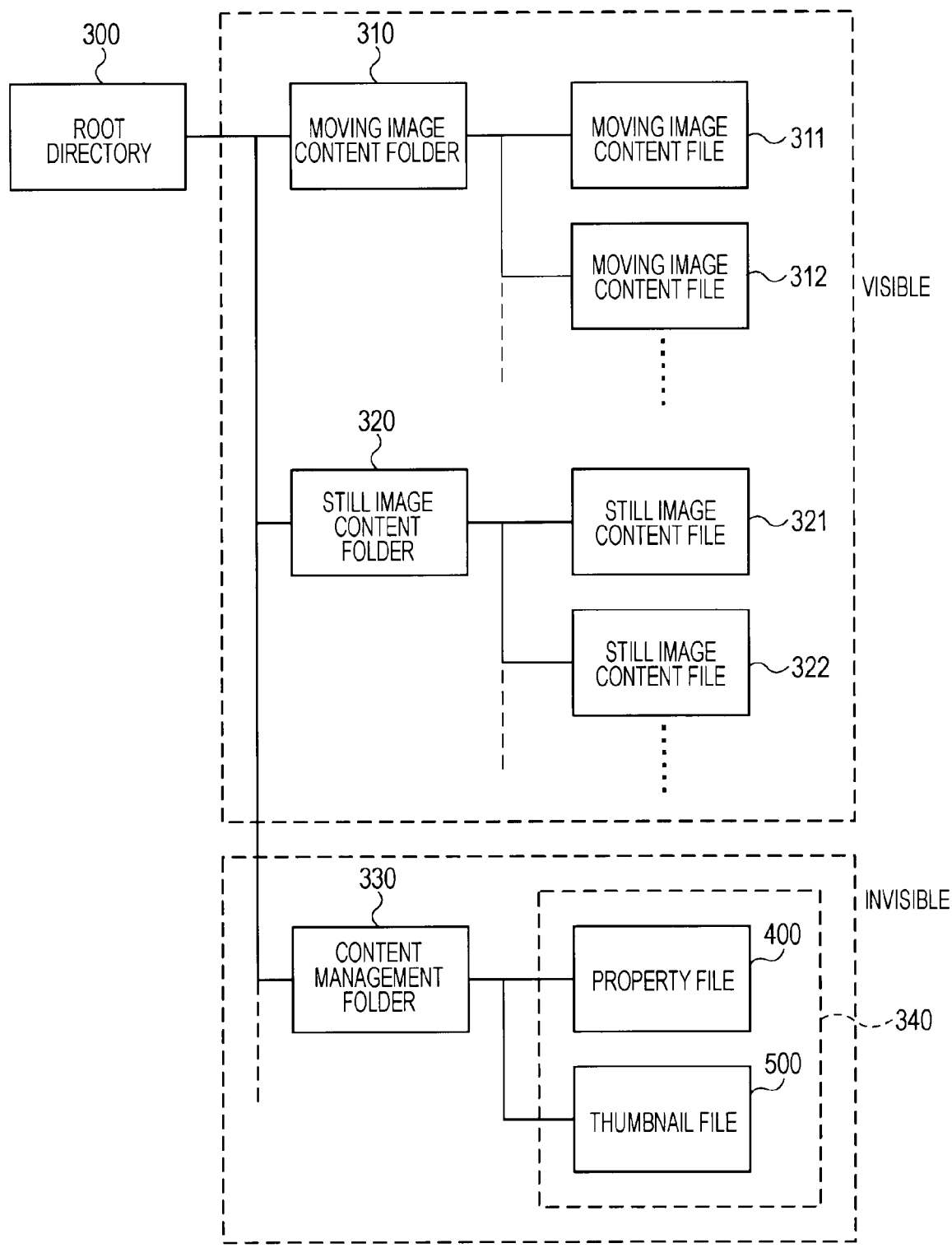
FIG. 3 illustrates a file structure of a real file managed in a property file in accordance with one embodiment of the present invention.

FIG. 3 diagrammatically illustrates a file structure of a real file registered on a file system. In accordance with one embodiment of the present invention, one of a moving image file and a still image file and face metadata related to these content files are managed in a virtual entry structure different from a real directory. More specifically, a content management file 340 managing the face metadata and one of the moving image file and the still image file is recorded on the recording medium 170.

A root directory 300 contains a moving image content folder 310, a still image content folder 320 and a content management folder 330.

The moving image content folder 310 contains moving image content files 311 and 312 captured by the imaging device 100. The moving image content files 311 and 312 thus belong to the moving image content folder 310.

The still image content folder 320 contains the still image content files 321 and 322 captured by the imaging device 100. The still image content files 321 and 322 thus belong to the still image content folder 320.

A content management folder 330 contains a content management file 340. The content management file 340 manages, by virtual layer entry, the content files belonging to each of the moving image content folder 310 and the still image content folder 320. The content management folder 330 contains a property file 400 and a thumbnail file 500. The property file 400 contains management information for virtually managing each content file, content attribute information such as date and time of creation of each content file, and metadata incidental to each content file such as face metadata. The thumbnail file 500 stores a representative thumbnail image of each content file. The property file 400 and the thumbnail file 500 will be described in detail later with reference to FIGS. 4 through 8.

The moving image files belonging to the moving image content folder 310 and the still image files belonging to the still image content folder 320 are visible to a user. More specifically, the user can display on the LCD 162 an image corresponding to each content file specified by a user operation input.

The content management file 340 is set to be invisible to the user so that the content of the content management file 340 may not be modified by the user. The content of the content management file 340 is set to be invisible to the user, for example, by setting on a flag to render the content management folder 330 of a file system. The flag may be set to be on when the imaging device 100 recognizes that the imaging device 100 is connected a personal computer (PC) via a universal serial bus (USB) interface (in mass storage connection) (i.e., the imaging device 100 receives from the host PC a signal that connection has been correctly established).

The virtual entry structure of the property file 400 is described in detail.

Figure 4:
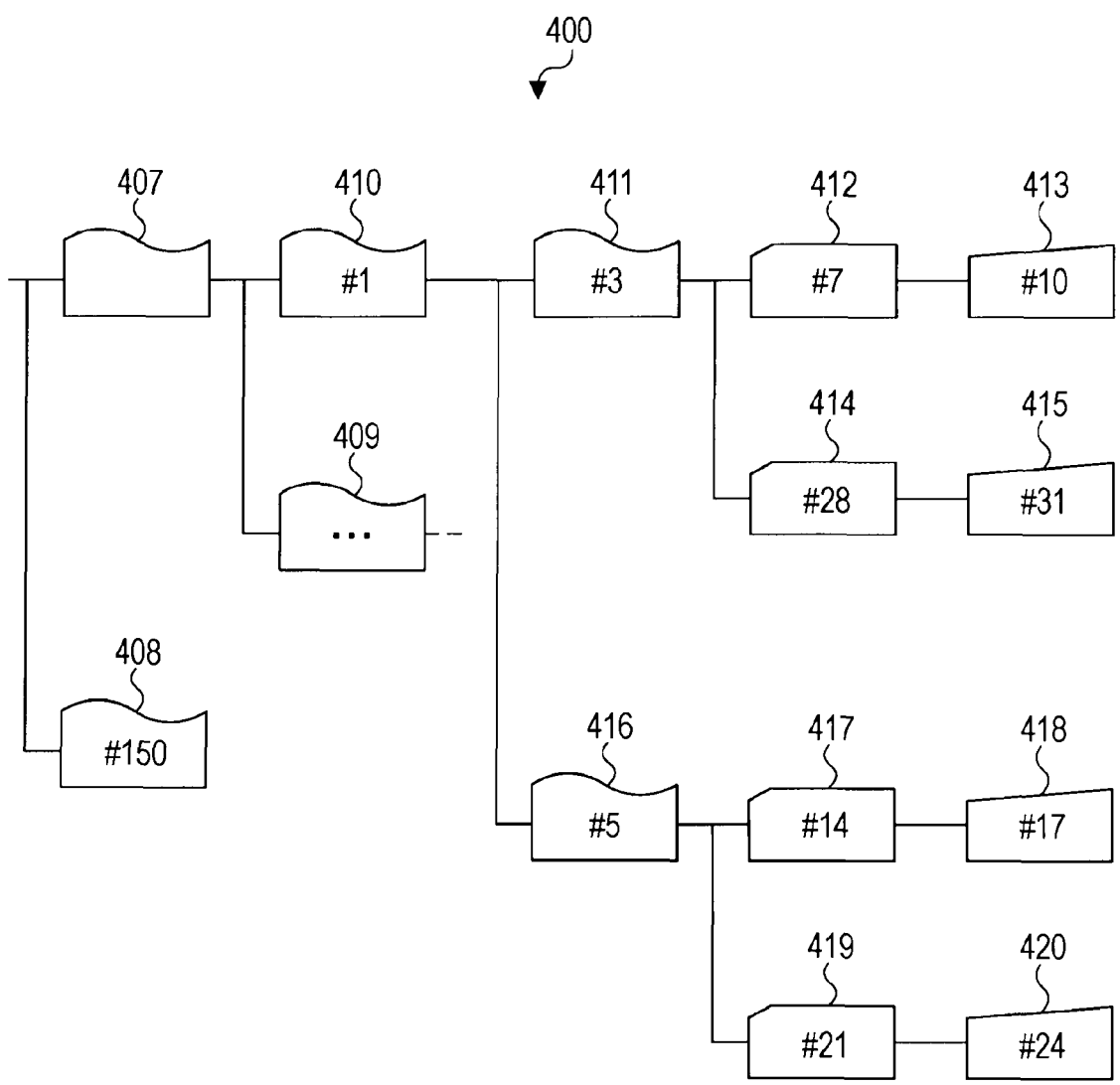
FIG. 4 illustrates a virtual folder and a virtual file, each managed by the property file in accordance with one embodiment of the present invention.

FIG. 4 illustrates virtual folders and virtual files, managed by the property file 400.

The property file 400 manages the moving image files and the still image files, recorded on the recording medium 170. The property file 400 flexibly manages the files in response to applications. For example, the property file 400 manages the moving image file and the still image file according date and time at which these files are recorded on the imaging device 100. A management method of sorting and managing the moving image files according recording date and time. A number in each entry is an entry number. The entry number is described with reference to FIG. 7.

An entry number 407 is an entry at a top layer of the layer entry structure. The entry number 407 contains a moving image folder entry 410 and a still image folder entry 409. A profile entry 408 (entry number #150) contain codec information (encoding format, image size, bit rate, etc.) of each file entry. The profile entry 408 will be described later with reference to FIG. 7C. The still image folder entry 409 manages a date and time folder entry related to a still image at a lower layer. The moving image folder entry 410 (entry number #1) manages a date folder entry at a lower layer. A date folder entry 411 and a date folder entry 416 belong to the moving image folder entry 410.

The date folder entry 411 (entry number #3) and the date folder entry 416 (entry number #5) sorts and manages the moving image files, recorded on the recording medium 170, according to date. The date folder entry 411 and date folder entry 416 manages the sorted moving image files at a lower layer. The date folder entry 411 manages moving image files recorded on Jan. 11, 2006. A moving image folder entry 412 and a moving image folder entry 414 belong to the date folder entry 411. The date folder entry 416 manages the moving image files recorded on Jul. 28, 2006. The moving image folder entry 412 and the moving image folder entry 414 belong to the date folder entry 411. The folder entry will be described in detail with reference to FIG. 5.

Each of the moving image folder entry 412 (entry number #7), the moving image folder entry 414 (entry number #28), a moving image file entry 417 (entry number #14) and a moving image file entry 419 (entry number #21) stores management information for virtually managing each moving image file and content attribute information related to data and time of creation of each moving image file stored on the recording medium 170. The file entry will be described in detail with reference to FIG. 5.

Each of a metadata entry 413 (entry number #10), a metadata entry 415 (entry number #31), a metadata entry 418 (entry number #17), a metadata entry 420 (entry number #24) stores metadata incidental to the moving image file managed by the mapped moving image file entry. The metadata contains face data extracted from the moving image content file. The face data contains a variety of data related to the face extracted from the moving image content file. As shown in FIG. 11, the face data contains face detection time information, basic face information, a face score, a smiling face score, etc. The metadata entry will be described in detail with reference to FIGS. 5 through FIGS. 16A and 16B.

A relationship between the content management file and the content file is described in detail below.

Figure 5:
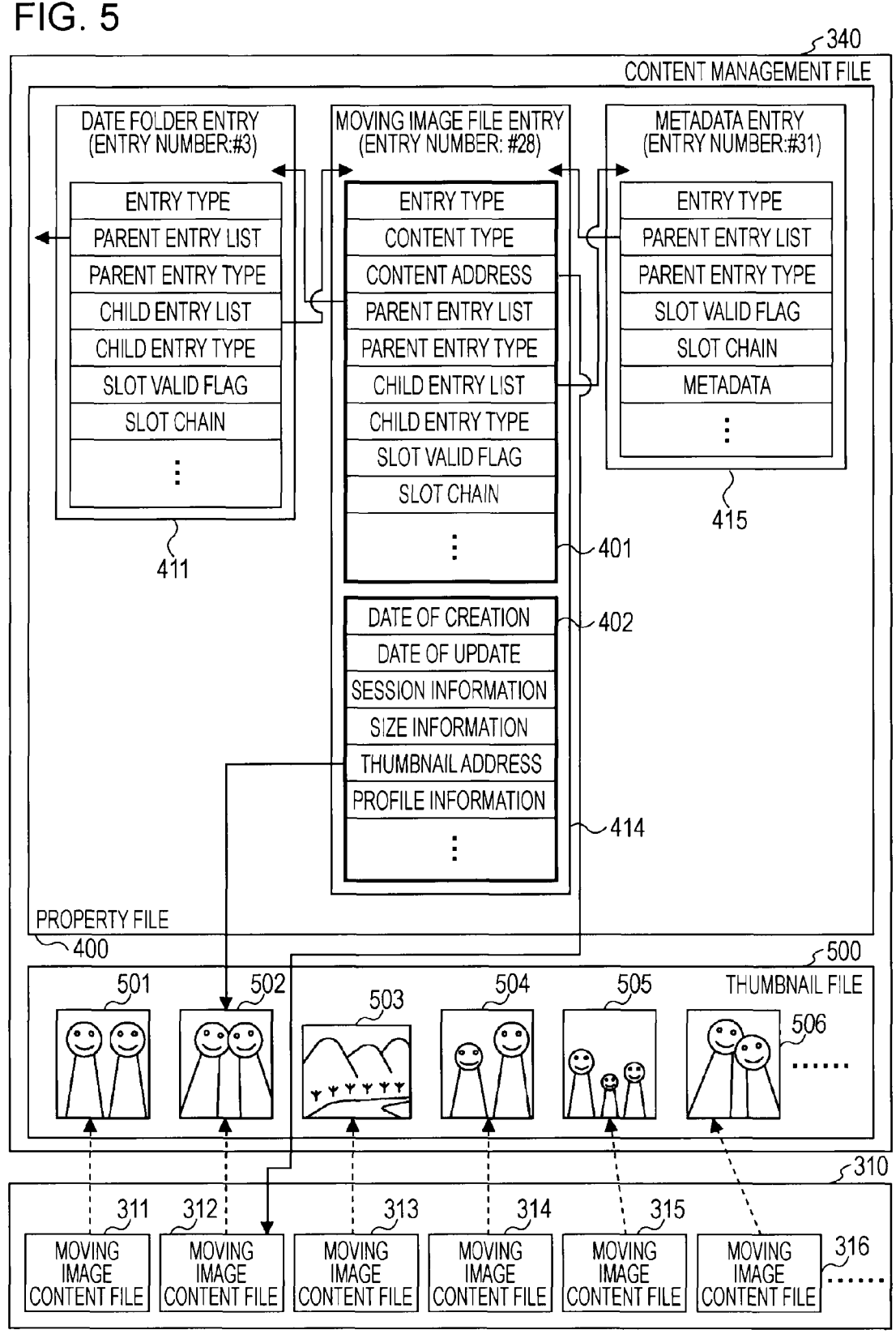
FIG. 5 diagrammatically illustrates a relationship of the property file, a thumbnail file and moving content files in accordance with one embodiment of the present invention.

FIG. 5 diagrammatically illustrates a relationship between the property file 400 and the thumbnail file 500, forming the content management file 340, and moving image content files 311 through 316 belonging to the moving image content folder 310. The relationship between the date folder entry 411, moving image folder entry 414 and metadata entry 415 shown in FIG. 4 and a representative thumbnail image 502 and a moving image content file 312.

The date folder entry 411 virtually manages the date of a real content file. The date folder entry 411 contains "entry type," "parent entry list," "parent entry type," "child entry list," "child entry type," "slot valid flag," "slot chain," etc.

Each entry number identifies the corresponding entry. For example, the date folder entry 411 is assigned entry number "#3." The method of assigning the entry number is described with reference to FIGS. 7A-7D and 8.

The "entry type" indicates a type of an entry. Depending on the type of each entry, the entry type may be one of a "moving image folder entry," a "date folder entry," "moving image file entry," a "still image file entry," a "metadata entry," etc. For example, the entry type of the date folder entry 411 is the "date folder entry."

The "parent entry list" contains an entry number corresponding to a parent entry as an upper layer entry to which the corresponding entry belongs. For example, "#1" is stored as the "parent entry list" of the date folder entry 411.

The "parent entry type" indicates a type of a parent entry corresponding to the entry number stored in the "parent entry list." Depending on the type of the parent entry, the "parent entry type" stores one of a "date folder entry," a "moving image file entry," a "still image file entry," etc. The "parent entry type" of the date folder entry 411 stores the "moving image folder entry."

The "child entry list" store an entry number corresponding to a child entry at a lower layer belonging to this entry. For example, the "child entry list" of the date folder entry 411 stores "#7" and "#28."

The "child entry type" indicates the type of the child entry corresponding to the entry number stored in the "child entry list." Depending on the type of the child entry, the "child entry type" may be one of the "moving image folder entry," the "date folder entry," the "moving image file entry," the "still image file entry," the "metadata entry," etc. For example, the "child entry type" of the date folder entry 411 stores the "moving image file entry."

The "slot valid flag" indicates whether the slot forming the entry is valid or not. The "slot chain" is information related to a link or coupling to each slot forming the entry. The "slot valid flag" and the "slot chain" will be described with reference to FIG. 7B.

The moving image folder entry 414 virtually manages a real content file and contains virtual management information 401 and content attribute information 402. The virtual management information 401 contains "entry type," "content type," "content address," "parent entry list," "parent entry type," "child entry list," "child entry type," "slot valid flag," "slot chain," etc. The "entry type," the "parent entry list," the "parent entry type," the "child entry list," the "child entry type," the "slot valid flag," and the "slot chain" are identical to those discussed with reference to the date folder entry 411, and the discussion thereof is omitted herein.

The "content type" indicates a type of a content file corresponding to the file entry. Depending on the type of content file corresponding to the file entry, the "content type" may be one of the "moving image content file," and the "still image content file." For example, the content type of the moving image folder entry 414 is the "moving image content file."

The "content address" is information indicating a recording position of the moving image content file recorded on the recording medium 170. Accessing to the moving image content file recorded on the recording medium 170 is possible in accordance with the recording position information. For example, the "content address" of the moving image folder entry 414 is "A312" indicating the address of a moving image content file 312.

The content attribute information 402 is attribute information of the content file stored in the virtual management information 401. The content attribute information 402 contains "date and time of creation," "date and time of update," "session information," "size information," "thumbnail address," "profile information," etc.

The "date of creation" indicates date and time at which the content file corresponding to the file entry has been created. The "date and time of update" indicates date and time at which the content file corresponding to the file entry has been updated. Irregularity of the metadata is determined using the "date and time of update." The "session information" indicates a time length of the content file corresponding to the file entry. The "size information" indicates a size of the content file corresponding to the file entry.

The "thumbnail address" indicates a recording position of a representative thumbnail image stored on the thumbnail file 500. Accessing to the representative thumbnail image stored on the thumbnail file 500 is accessible in accordance with the position information. For example, the "thumbnail address" of the moving image folder entry 414 contains an entry number in the thumbnail file 500 of a representative thumbnail image 502 as a representative image of the moving image content file 312.

The "profile information" contains an entry number of a video audio entry stored in the profile entry 408. The video audio entry will be described in detail with reference to FIG. 7C.

The metadata entry 415 contains the "entry type," the "parent entry list," the "parent entry type," the "slot valid flag," the "slot chain," the "metadata," etc. The "entry type," the "parent entry list," the "parent entry type," the "slot valid flag," the "slot chain" are identical to those described with reference to the date folder entry 411 and the discussion thereof is omitted herein.

The "metadata" is retrieved from the content file corresponding to the parent entry as an upper layer file entry of the metadata entry. A variety of information contained in the "metadata" will be described in detail with reference to FIG. 9 through FIGS. 16A and 16B.

The thumbnail file 500 contains a representative thumbnail image of each content file. As shown in FIG. 5, the thumbnail file 500 contains representative thumbnail images 501 through 506 as representative images of moving image content files 311 through 316 belonging to the moving image content folder 310. Each thumbnail image stored in the thumbnail file 500 is accessible in accordance with a "thumbnail address" of the content attribute information 402 in the property file 400. Each content file is accessible in accordance with a "content address" of the virtual management information 401 contained in the property file 400.

Each parent-child relationship stored in each property file is described in detail below.

Figure 6:
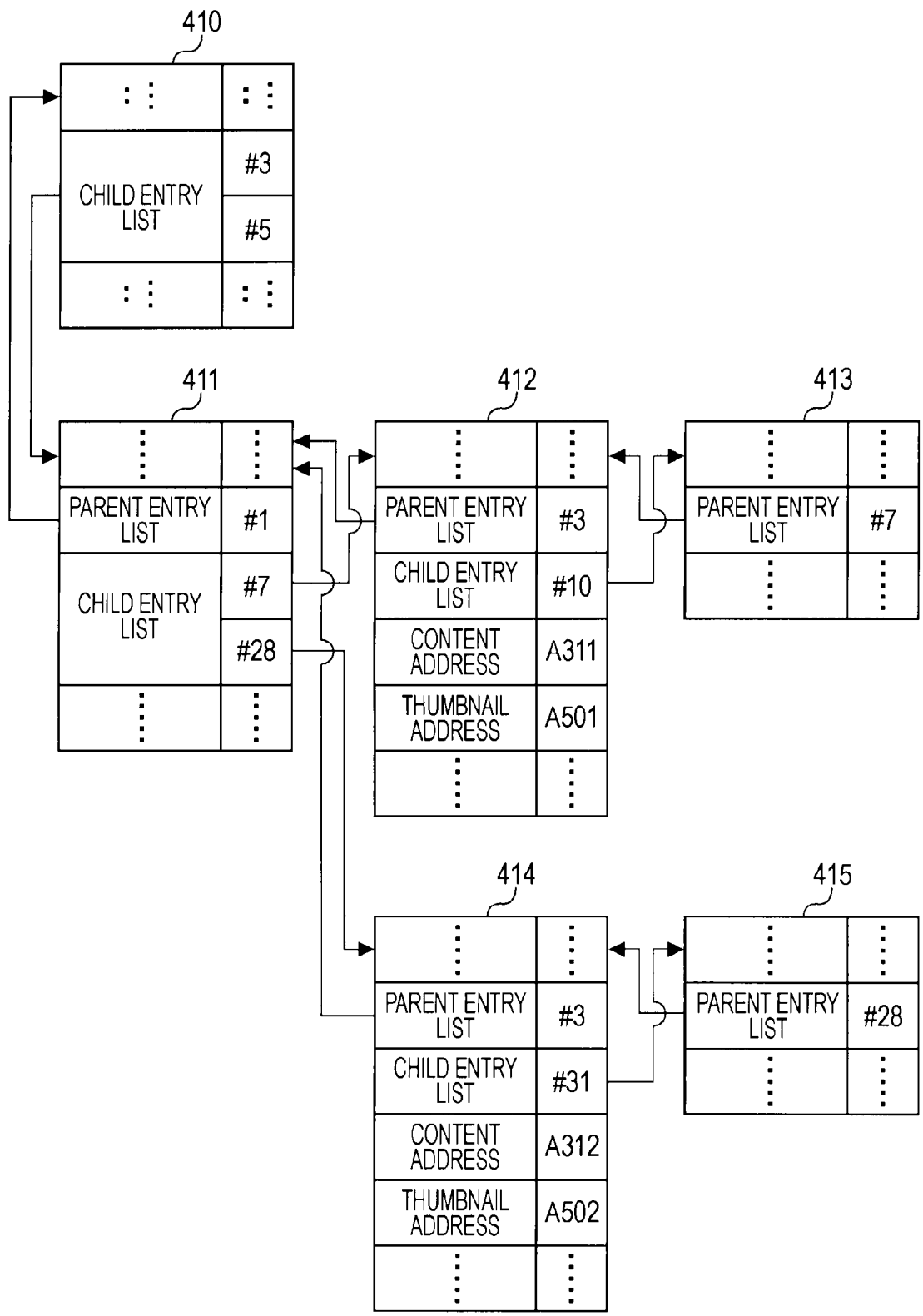
FIG. 6 diagrammatically illustrates a parent-child relationship of a moving image folder entry, a date folder entry, a moving image file entry and a metadata entry in accordance with one embodiment of the present invention.

FIG. 6 diagrammatically illustrates a parent-child relationship of the moving image folder entry 410, the date folder entry 411, the moving image folder entries 412 and 414 and metadata entries 413 and 415, each shown in FIG. 4.

The moving image folder entry 410 (entry number #1) contains information such as the "child entry list." The "child entry list" stores "#3," and "#5," for example.

The date folder entry 411 (entry number #3) stores information such as the "parent entry list," the "child entry list." The "parent entry list" contains "#1", for example. The "child entry list" contains "#7" and "#28," for example.

Each of the moving image folder entry 412 (entry number #7) and the moving image folder entry 414 (entry number #28) stores information such as the "parent entry list," the "child entry list," the "content address," and the "thumbnail address." In the moving image folder entry 412, the "parent entry list" contains "#3," the "child entry list" contains "#10," the "content address" contains "A311," and the "thumbnail address" contains "#1." "#1" contained in the "thumbnail address" is the entry number in the thumbnail file 500 and is different from the entry number of each entry stored in the property file 400. The "thumbnail address" will be described in detail with reference to FIGS. 7A-7D.

Each of the metadata entry 413 (entry number #10) and the metadata entry 415 (entry number #31) stores information such as the "parent entry list." For example, in the metadata entry 413, the "parent entry list" contains "#7." As shown in FIG. 6, an arrow-headed line denotes the parent-child relationship from one of the "parent entry list" and the "child entry list." Similar parent-child relationship holds in the moving image folder entry 410, the date folder entry 416, the moving image file entries 417 and 419, and the metadata entries 418 and 420 shown in FIG. 4.

One file entry is mapped to one metadata entry in the property file 400 of FIGS. 4 and 6. Alternatively, one file entry may be mapped to a plurality of metadata entries. More specifically, one parent file entry is mapped to a plurality of child metadata entries.

For example, a metadata entry (entry number #40) containing global position system (GPS) information (not shown) and the metadata entry 413 containing the face metadata are mapped as a child metadata entry of the moving image folder entry 412. "#10" and "#40" are then listed in the child entry list of the moving image folder entry 412. The storage order of the child entry list is determined according to the type of metadata. A plurality of pieces of metadata may be listed in a single file entry. Even if the number of pieces of metadata increases, data management remains simple and desired metadata is extracted in a shorter time. The type of metadata may refer to a simple type of data (such as face metadata or GPS) or type of coding of the metadata (such as binary data or text data).

Figure 8:
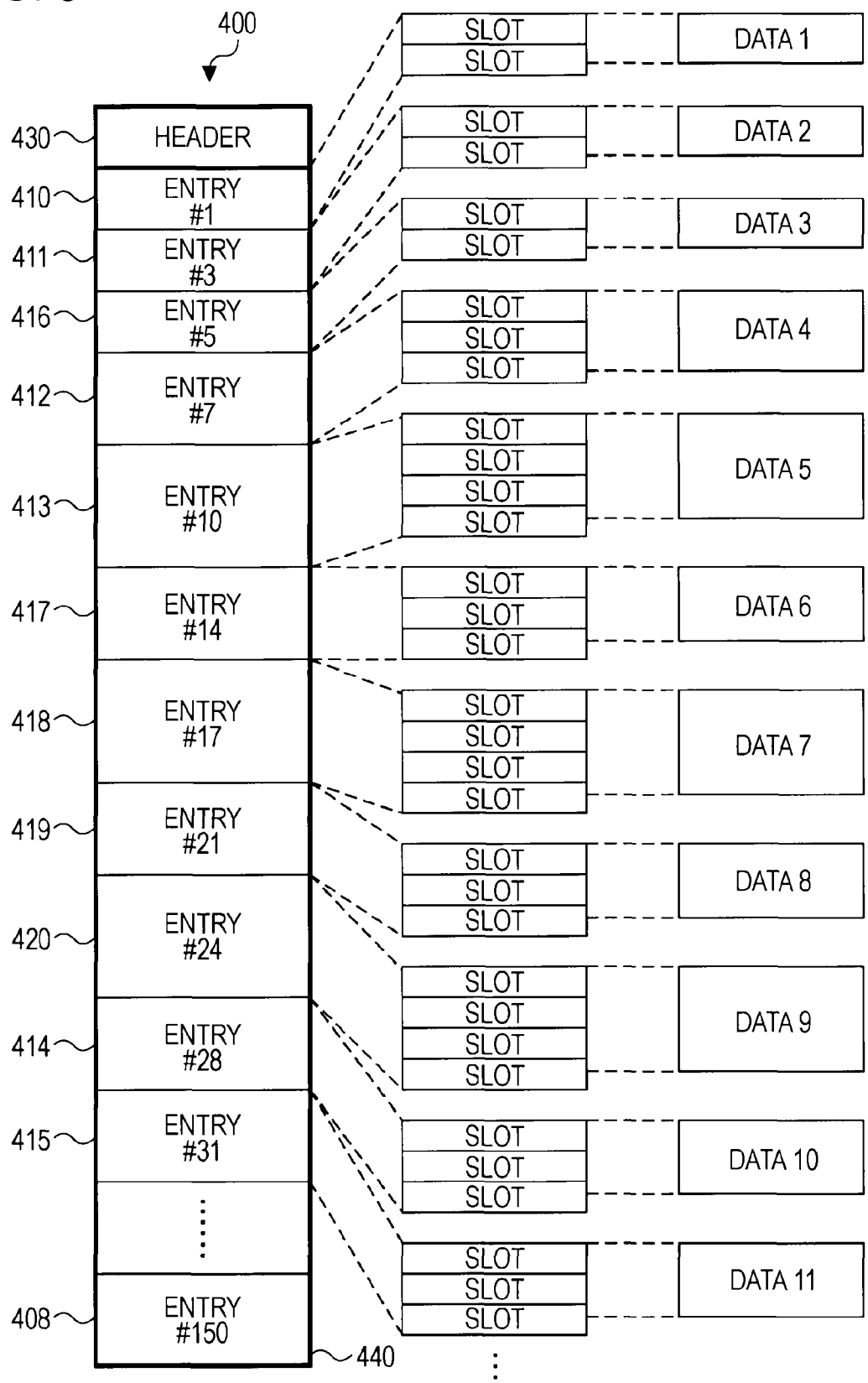
FIG. 8 diagrammatically illustrates the entire structure of the property file in accordance with one embodiment of the present invention.

FIG. 7A illustrates a basic structure of the property file 400. FIG. 7B illustrates a structure of a slot forming each entry. FIG. 7C illustrates an example of information contained in the profile entry. FIG. 7D illustrates an example information indicating a type of content data managed by the content management file 340, out of the information contained in the header 430. FIG. 8 diagrammatically illustrates the general structure of the property file 400 of FIG. 4.

As shown in FIG. 7A, the property file 400 has a basic structure of each of the header 430 and the moving image folder entry 440. Each entry is a unit of virtual folder or a virtual file.

Each entry forming the moving image folder entry section 440 is composed of one or a plurality of slots. Depending on a size of data to be stored in each entry, the entry is assigned one or a plurality of slots. The slot forming each entry is defined as a data block having a fixed data length determined by property file or thumbnail file. Since the number of slots is different from slot to slot, the entry is variable by an integer multiple of slots.

As shown in FIG. 7A, the moving image folder entry 410 is assigned two slots 441 and 442 depending on the data size of data 451 to be stored. The date folder entry 411 is assigned two slots 443 and 444 depending on the data size of data 452 to be stored.

Since the slot is fixed in length, the entire area of the slot is not always filled with data and left vacant. However, the use of the fixed length slot is preferable in terms of improving data accessing and data management.

Each entry forming the entry section 440 is managed by entry number as shown in FIGS. 4 and 6. The entry number is assigned considering the number of slots present from the first slot of the entire property file 400 to the leading slot of the entry. The leading slot of entry of the moving image folder entry 410 becomes a first slot in the property file 400 as shown in FIGS. 7A and 8, the entry is assigned entry number "#1." Since the leading slot of entry of the date folder entry 411 becomes a third slot in the property file 400, the entry is assigned entry number "#3." Since the leading slot of entry of the date folder entry 416 becomes a fifth slot in the property file 400, the entry is assigned entry number "#5." The same is true of the other entry numbers. In accordance with the entry number, the entries are managed and the parent-child relationship of each entry is also managed. When the entries are searched, the slots of the property file 400 are counted starting with the first slot.

As shown in FIG. 7B, the slots forming each entry contains a slot header 460 and a real data section 470. The slot header 460 contains a valid/invalid flag 461 indicating the validity of the slot and a chain 462.

If a valid corresponding content file is present, a flag is set at the valid/invalid flag 461. If the corresponding content file is deleted, an invalid flag is set. When the corresponding content file is deleted, the invalid flag is set and this slot looks as if non-existent with deletion of information within the slot corresponding to the deleted content file being inactivated. Without the valid/invalid flag 461, deletion of information within the slot corresponding to the deleted content file becomes necessary if the corresponding content file is deleted. In addition, information within a slot subsequent to a deleted slot should be shifted forward to fill in the deleted slot.

The chain 462 contains information for link and coupling for linking slots. Information contained in the chain 462 forms a single entry linking a plurality of entries. A data body is stored in the real data section 470.

The profile entry 408 stores 100 units of data, each unit including a pair of video, audio and codec information in each content file. The video entry as the codec information contains "codec type," "visual size," "sampling rate," etc. The audio entry as the codec information contains "codec type," "sampling rate," etc. The video and audio entry is assigned an entry number. The entry number is assigned in the recording order within the profile entry 408. As shown in FIG. 7C, a first video and audio entry 471 is assigned "#1" and a second video and audio entry 472 is assigned "#2." The entry number of the video and audio entry is recorded in "profile information" of the file entry (see FIG. 5). The codec information of the content file corresponding to the file entry is read in accordance with the entry number recorded in the "profile information."

The thumbnail file 500 (see FIG. 5) is substantially identical in structure to the property file 400 and each entry includes one or a plurality of slots. Each entry serves as a unit for indicating one representative thumbnail image. The thumbnail file 500[0] has no header. Each slot is fixed in length in the file. The slot size of one slot is recorded in the header 430 of the property file 400. The relationship of the entries within the thumbnail file 500 is stored in the property file 400. The slot size of the thumbnail file 500 is different from the slot size of the property file 400.

The slot size of the thumbnail file 500 may be set on a per thumbnail file basis and may be stored in the header 430 of the property file 400. The thumbnail file name of the thumbnail file 500 is recorded in the header 430.

A representative thumbnail image of the content file is recorded for each file entry corresponding to the content file in the thumbnail file 500. For example, if the content file is a moving image the representative thumbnail image of the content file is the entire screen of a head image. Each entry forming the thumbnail file 500 is assigned a respective entry number. The entry number of the thumbnail file is a slot number if one entry within the thumbnail file corresponds to one slot. The entry number of the thumbnail file is stored in the "thumbnail address" of each file entry (see FIG. 5).

The header 430 contains a variety of information managing each entry. For example, as shown in FIG. 7D, the header 430 contains information indicating the type of a content file managed by the content management file 340. In the example of FIG. 7D, the content file managed by the content management file 340 is a high definition (HD) moving image or a standard definition (SD) moving image, but is not a still image. In even a content recording device recording a moving image and a still image, the content management file 340 does not support a still image. The still image recorded in the header 430 as shown in FIG. 7D is managed in a standard file system. Since the moving image is also managed in the standard file system, the content is played in accordance with information of the file system in a content player device that does not support the content management file. The imaging device 100 may be connected to another content player device or a removable recording medium may be transferred to another content player device for playing. If the other content player device supports the content management file, the content file may be read in accordance with the content management file. The header 430 contains an entry number of the profile entry 408 (entry number #150). The position of the profile entry 408 is thus identified in accordance with entry number #150 among entries forming the moving image folder entry section 440.

FIG. 8 diagrammatically illustrates a relationship of each entry forming the property file 400, the slot corresponding to the entry, and data contained in each slot as shown in FIG. 4. Each entry is labeled a respective entry number rather than the name thereof.

Figure 9:
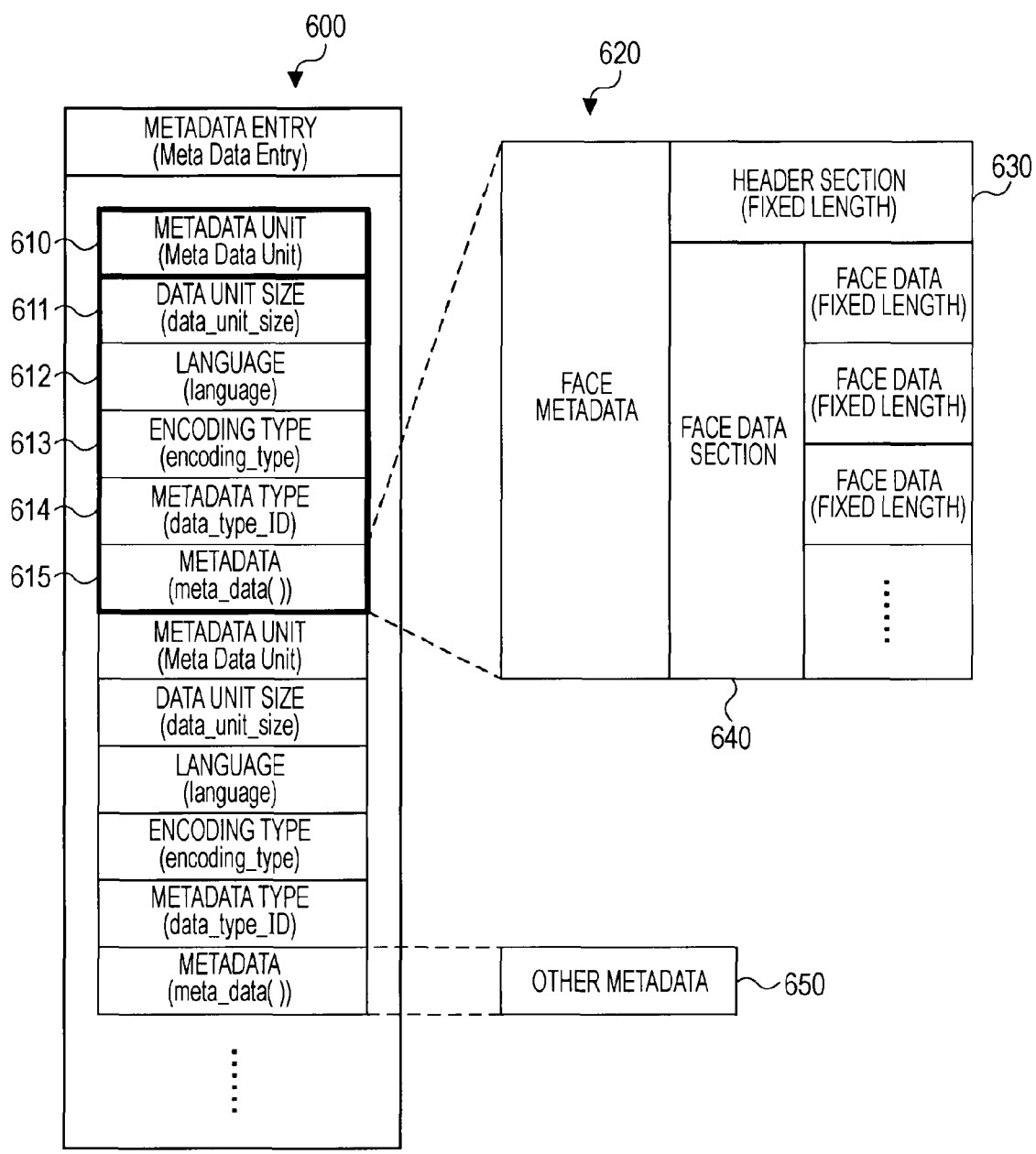
FIG. 9 diagrammatically illustrates an internal structure of the metadata entry in accordance with one embodiment of the present invention.

FIG. 9 diagrammatically illustrates an internal structure of the metadata entry 600. The metadata entry 600 corresponds to metadata entries 413, 415, 418 and 420 of FIGS. 4 and 6. In accordance with one embodiment of the present invention, face metadata is recorded on a per moving image content file basis.

The metadata entry 600 contains one or a plurality of metadata units 610. The metadata unit 610 includes data unit size 611, language 612, encoding type 613, data type identification (ID) 614 and metadata 615.

The data unit size 611 contains a record of a size of metadata stored in the metadata unit 610. The language 612 contains a record of a language of the metadata stored in the metadata unit 610. The encoding type 613 contains a record of an encoding type of the metadata stored in the metadata unit 610. The metadata type 614 contains a record of identification information identifying the type of each metadata.

The metadata 615 contains a record of face metadata 620 and metadata 650 other than the face metadata. The metadata 650 includes title information and genre information of the content file.

The face metadata 620 contains a header section 630 and a face data section 640. The header section 630 stores information managing the face metadata. The header section 630 is fixed in length on a per moving image content basis. The face data section 640 contains a record of face data recorded on a per face basis, as the face metadata of the face detected from the moving image content file. For example, the face data section 640 contains a record of face data 621 through face data 623. As shown in FIG. 11, the face data contains the face detection time information, the basic face information, the face score and the smiling face score. The face data section 640 contains one moving image content file having a fixed length. Since each of the header section 630 and the face data section 640 is a fixed length, accessing to the face data is easily performed.

The other metadata 650 has the same structure as the face metadata 620.

In accordance with one embodiment of the present invention, a value of the face data to be recorded on the face data section out of the faces detected within one frame is restricted. For example, a maximum value of the face data to be recorded on the face data section may be defined based on predetermined conditions. The predetermined conditions may be the size of a face detected within one frame and a face having a high score in face score. With such a limitation imposed on the face data, the face data of an unnecessary face (a face having a low score or an unlikely face) within one frame is excluded from being recorded onto the recording medium 170. Memory capacity of the recording medium 170 is thus conserved.

The moving image content file is recorded on the recording medium 170. If the face data of all faces detected by a face detection engine is produced, the size of face data becomes enormous. If time intervals of face detection are short, the data size increases even more. If the number of units of face data to be recorded for a frame at time t0 is equal to the number of units of face data to be recorded for a next frame at time t1, the face data of the faces detected at time t1 is not recorded on the face data section. If the number of detected faces remains unchanged, there is a high probability that the metadata of the same face is recorded. Only if there is a change in the number of units of face data between any two consecutive time points, the face data is recorded. This arrangement prevents duplicated recording of the face data. In accordance with one embodiment of the present invention, it is not necessary to produce face data for all faces detected within one frame.

Figure 10:
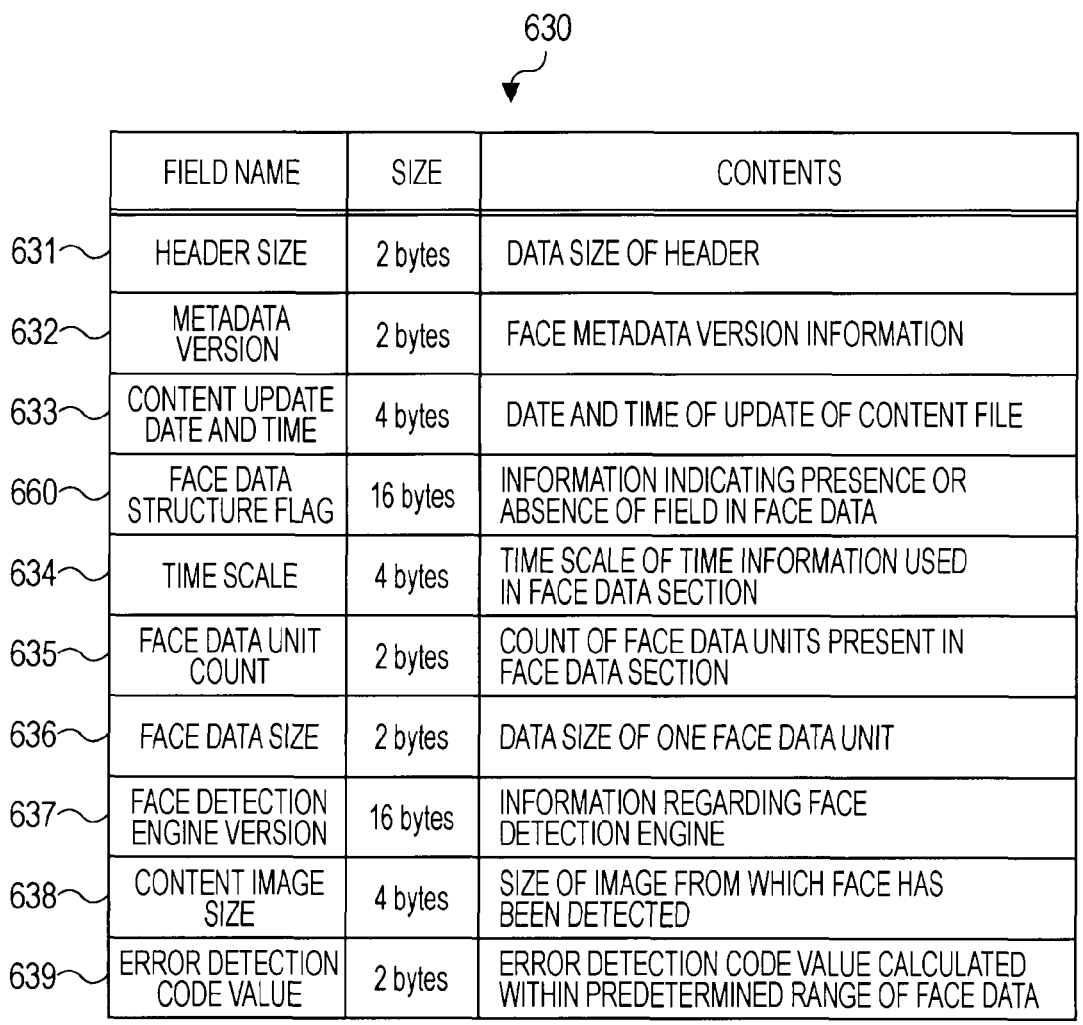
FIG. 10 illustrates a variety of types of information stored in a header section in accordance with one embodiment of the present invention.

FIG. 10 illustrates a summary of information to be stored in the header section 630.

The header section 630 stores a header size 631, a metadata version 632, a content update date and time 633, a face data structure flag 660, a time scale 634, a face data unit count 635, a face data size 636, a face detection engine version 637, a content image size 638, and an error detection code value 639. The data size of each of these units of data is 2 bytes as listed under "size" in table of FIG. 10.

The header size 631 contains a record of a data size of the header section 630. When the face data section 640 is accessed, accessing is immediately performed to the face data section 640 by jumping over the header section 630. The data size of the header size 631 is 2 bytes.

The metadata version 632 contains a record of version information of the face metadata recorded on the face data section 640 corresponding to the header section 630. When a content file is played on the content player device, the content player device examines the version of the face data stored in the metadata version 632 to verify whether the version is the one supported by the player device. In accordance with one embodiment of the present invention, "1.00" is recorded. The data size of the metadata version 632 is 2 bytes where upper 8 bits indicate a major version while lower 8 bits indicate a minor version. If the face metadata format is extended, extended version information is stored here.

The content update date and time 633 contains a record of update date and time at which the moving image content file has been recorded. A moving image content file captured by the imaging device 100 may be transferred to another device and the edited moving image content file may be then recorded on the imaging device 100. There occurs a discrepancy between the edited moving image content file and the face metadata. For example, the moving image content file may be transferred in three steps 1-3 as described below. In such a case, a discrepancy is detected, face metadata is re-detected from a moving image content file B, and the discrepancy having occurred between the edited moving image content file and the face metadata is thus corrected.

(1) Step 1

A moving image content file A is recorded on a content player device A, and metadata corresponding to the moving image content file A is generated. In this case, the date and time of creation and the date and time of update of the moving image content file A are identical to the content update date and time of the face metadata.

(2) Step 2

The moving image content file A is transferred to the content player device B and then edited on the content player device B. The moving image content file A thus becomes a moving image content file B. The update date and time of the moving image content file B is updated to those at editing.

(3) Step 3

The moving image content file B is transferred to the content player A. In this case, the moving image content file B and the face metadata are different in the values of the content update date and time.

The face data structure flag 660 contains a flag indicating the presence or absence of the metadata defined by the face data stored in the face data section 640. The face data structure flag 660 will be described in detail with reference to FIGS. 12 through 16.

The time scale 634 contains a record of a time scale (indicating the number of units per second) of time information used in the face data section. More specifically, information indicating time at which a face is detected from the moving image content file (face detection time information) is recorded as the face data on the face data section. The time scale of the time information is stored in the time scale 634. The unit of the time scale 634 is Hz.

The face data unit count 635 contains a record of a count of data units recorded in succession to the header section 630. If no face is detected, "0" is recorded.

The face data size 636 contains information indicating a data size of a single face data unit recorded in succession to the header section 630. Jumping to each face data unit is possible in accordance with the information stored in the face data size 636. If no face is detected, "0" is recorded.

The face detection engine version 637 contains information relating a face detection engine for detecting a face from the moving image content file. If the content player device recognizes, during playing of the face metadata, the face metadata that has been detected by a face detection engine lower in performance than own device, the face detection engine version 637 serves as a criterion as to whether to re-detect the face metadata. The information relating to the face detection engine is described in ASCII code, for example.

For example, if the metadata version is "1.00," data recording is performed on the face data section 640 in the order described in FIG. 11. When the content player device recognizes the metadata version as "1.00," desired data of the face data section 640 is quickly accessed because each data having a fixed length is located at a predetermined location.

The content image size 638 contains information indicating a height and width of the image from which a face is detected. The error detection code value 639 contains information indicating an error detection code value (error correction code value) calculated within a predetermined range of the image from which the face has been detected. For example, a value of a checksum calculated from the corresponding image data is recorded onto the error detection code value 639 during the production of the face metadata. The checksum is used for the error detection code value. Alternatively, the error detection code value may be one of cyclic redundancy check (CRC) value and a hush value based on a hush function.

The content image size 638 and the error detection code value 639 may be used to detect a discrepancy occurring between the moving image content file and the face metadata. The mechanism of occurring a discrepancy is identical to above-described steps 1-3. For example, a still image content file contains a large number of still image editing software programs, and in some programs, content date and time in the content data may be left unupdated even when a still image updated. In such a case, comparison process is performed on the content update date and time and content image size. Discrepancy is thus reliably detected.

FIG. 11 generally illustrates the face data stored on the face data section 640. The face data section 640 stores the face data in the order of bit assignment of the face data structure flag 660 of the header section 630.

The face data section 640 contains face detection time information 641, basic face information 642, a face score 643, a smiling face score 644 and face importance 645. The storage unit of these pieces of information is byte. Metadata to be discussed herein is defined with the metadata version of "1.00."

The face detection time information 641 indicates time of a frame from which the metadata is detected with the head of the corresponding moving image content file being "0." The face detection time information 641 contains a value that is an integer multiple of the time scale stored in the time scale 634 of the header section 630.

The basic face information 642 contains information regarding a position and size of a face detected from each frame forming the moving image content file. In the basic face information 642, the face position information is defined by upper 4 bytes and the face size information is defined by lower 4 bytes. For example, the face position information may indicate a difference between the left top corner of the image from which the face is detected and the top left point of the detected face, and a horizontal axis of the face is defined by upper 16 bits and a vertical axis of the face is defined by lower 16 bits. For example, the face size information indicates an image size of the detected face, and a face width is defined by upper 16 bits and a face height is defined by lower 16 bits. The basic face information 642 is the most important metadata in applications that use the face metadata.

The face score 643 indicates a score representing a face likeliness of the detected face.

The smiling face score 644 indicates score information indicating how much the detected face is smiling.

The face importance 645 contains information indicating the priority order (importance) of images detected at the same time. For example, a plurality of faces may be detected within the same frame. A high priority may be assigned to a face closer to the center of the image or a focused face. In the information contained therein, the smaller the value, the more important the face is. For example, "1" may be the most important value. Even when the image is displayed on a small screen on a mobile terminal, a face having the highest priority may be displayed in enlargement with the remaining faces displayed in small size.

In accordance with one embodiment of the present invention, the face data is recorded in the order of detection thereof. The face data can thus be searched quickly in a chronological order. The metadata contained in all face data in the same moving image content file is considered the same type and the face data is recorded in the order illustrated in FIG. 11. It is not necessary to record all data of FIG. 11, but the metadata of the same type in the same moving image content file is recorded. In this way, all face data remains in a fixed length, thereby increasing accessibility to the face data. Since the metadata of the same type in the same moving image content file is recorded, accessibility to predetermined metadata is improved.

FIG. 12 illustrates a data structure of the face data structure flag 660 of the header section 630 shown in FIG. 10. FIGS. 13A and 13B through FIGS. 16A and 16B illustrate a relationship between bits stored in the face data structure flag 660 and the face data stored in the face data section 640.

In accordance with one embodiment of the present invention, five units of metadata of the face data section 640 are defined. Data is assigned to 0 bit to 4 bit starting with least significant bit (LSB) of the face data section 640 in accordance with the order of the face data section 640 as shown in FIG. 11. Each bit of the face data structure flag 660 is filled with an indication of presence or absence of the data of the corresponding data field of the face data. More specifically, if data is present in the data field of the face metadata, "1" is stored in the corresponding bit of the face data structure flag 660 and if no data is present in the data field of the face metadata, "0" is stored in the corresponding bit. In this way, if data is present in the face data section 640, "1" is set in the corresponding bit. In the face data structure flag 660, 6 bit and subsequent bits are reserved for future extension.

Figures 13A, 13B:
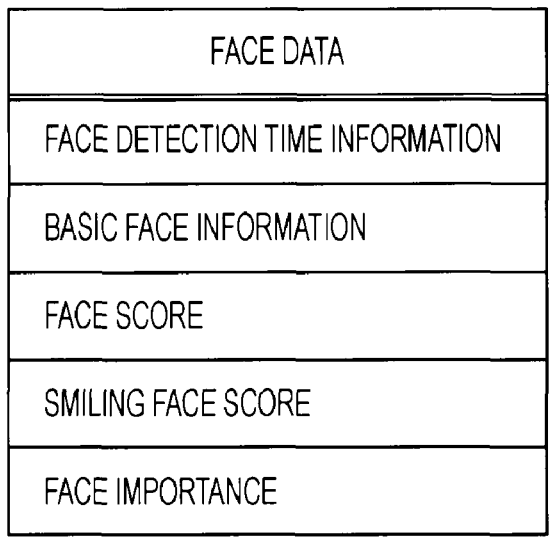
FIGS. 13A and 13B illustrate a relationship between a bit stored on the face data structure flag and face data stored on a face data section in accordance with one embodiment of the present invention.

More specifically, the face data section 640 stores date defined by the metadata version "1.00" as shown in FIG. 13A. As shown in FIG. 13B, bit 1 through bit 4 starting with LSB are filled in with "1." The content recording device does not necessarily record all the data but records necessary data. The face metadata is recorded flexibly depending on applications of the metadata and an amount of data handled is thus reduced.

Figures 14A, 14B:
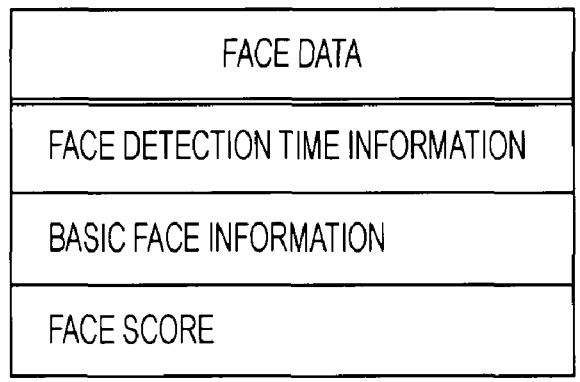
FIGS. 14A and 14B illustrate a relationship between a bit stored on the face data structure flag and face data stored on the face data section in accordance with one embodiment of the present invention.

As shown in FIG. 14A, another content recording device stores three units of metadata of the five units of data defined by the metadata version of "1.00" in the face data section 640. In such a case, the order of the recorded metadata is the one illustrated in FIG. 11, and empty fields having no data are filled with data. FIG. 14B illustrates real data of the face data structure flag 660 recorded by the other content recording device, and "1" is stored at a flag assigned to a data field present as the face data. Within the range defiled by the metadata version of "1.00," the content recording device can any metadata. Even if different metadata is recorded by the other content recording device, the content player device playing the face metadata references information at the header section, thereby verifying the presence or absence of the metadata in the metadata. Since the face data is fixed in data length, desired data is accessed fast.

An extension method of the face data stored in the face data section 640 in accordance with one embodiment of the present invention is described with drawings.

If the face detection technique is improved in the future or if the face detection results are used in new applications, the metadata defined by the metadata version of "1.00" alone may be insufficient.

FIG. 15A illustrates an example of extended face data. The extended face data includes a "sex difference score" indicating a sex difference in a detected face and "angle information" indicating an angle of the detected face in the frame. The face metadata with these pieces of data added thereto is defined as a metadata version of "1.10," and "1.10" is recorded in a metadata version field of the header section. The metadata is extended by adding new metadata below the data defined by the preceding version. More specifically, when the data is recorded on the recording medium 170, the data defined by the version "1.10" is recorded, by face data unit, on a physical address in succession to a physical address having the data defined by the version of "1.00" recorded thereon. Next metadata is then recorded, by face data unit, on an address in succession to the physical address having the data defined by the version of "1.10" recorded thereon.

Figures 16A, 16B:
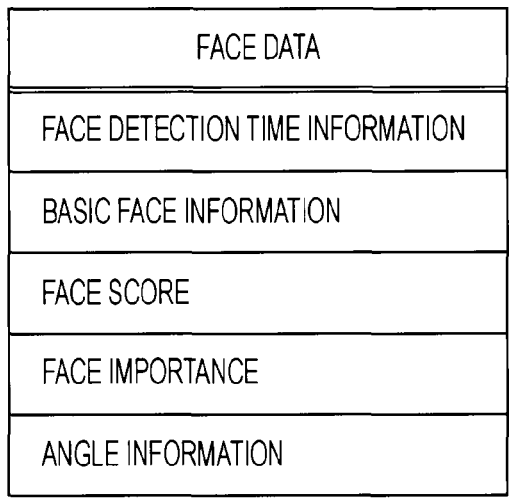
FIGS. 16A and 16B illustrate a relationship between a bit stored on the face data structure flag and face data stored on the face data section in accordance with one embodiment of the present invention.

FIG. 16B illustrates metadata recorded by one recording device out of the metadata defined by the version of "1.10." For example, when the extended face data of FIG. 15A is recorded, it is not necessary to record all the face data of FIG. 15A. If any face data is not recorded, predetermined face data of the face data of FIG. 15A is recorded in the order of data shown in FIG. 16A with empty data fields having no face data is filled with present data.

Along with version upgrade to "1.10," the face data structure flag is also extended. A bit that is reserved in the version of "1.00" is assigned a new bit in the order of fields defined as shown in FIG. 15A. If data is present in the face data section, "1" is set as shown in FIG. 15B. The player device supporting the version of "1.100" verifies the bit train of the face data structure flag of the header section and recognizes the data structure of the face data section. Since each face data is fixed in data length, desired metadata is accessed fast.

The recording device supporting the version of "1.10" might record the face metadata onto a removably loaded recording medium thereof and the recording medium might be transferred to a player device that supports the version of "1.00" only. In such a case, the player device can recognize bit 0 through bit 4 of the face data structure flag of the header section. Since specifications of the face data size remain unchanged, the player device can recognize the face data defined by the version of "1.00" if face data not defied by the version of "1.00." As shown in FIGS. 16A and 16B, the player device can recognize the "face detection time information," the "basic face information," the "face score," and the "face importance." The player device can thus access these pieces of information. The metadata entry has a data structure excellent in accessibility and can support a modification in the structure.

The functional structure of the imaging device 100 in accordance with one embodiment of the present invention is described below.

Figure 17:
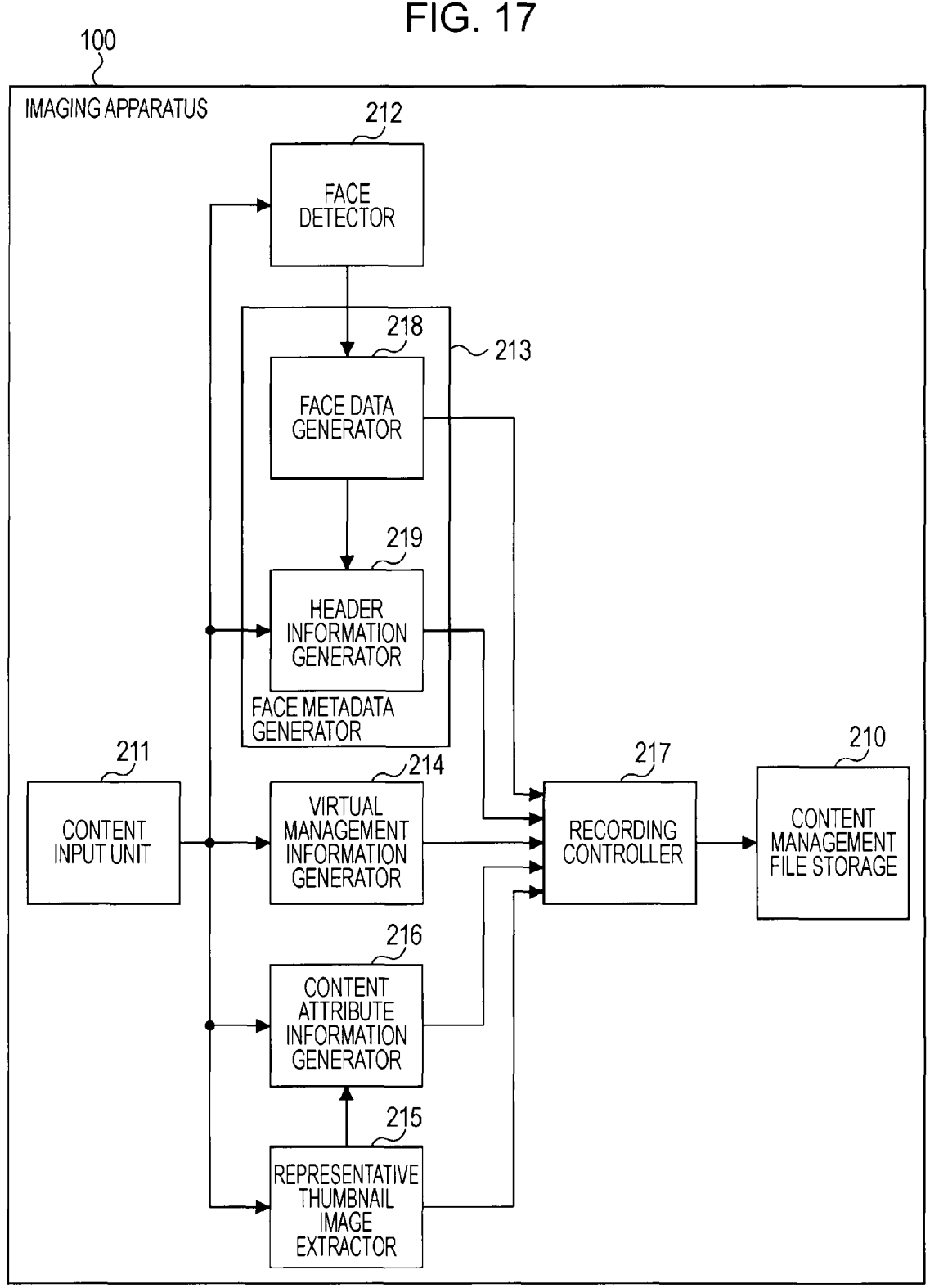
FIG. 17 is a functional block diagram illustrating the imaging device in accordance with one embodiment of the present invention.

FIG. 17 is a block diagram illustrating the imaging device 100 of one embodiment of the present invention. The imaging device 100 includes a content management file storage 210, a content input unit 211, a face detector 212, a face metadata generator 213, a virtual management information generator 214, a representative thumbnail image extractor 215, a content attribute information generator 216 and a recording controller 217.

The content management file storage 210 stores the content management file 340 containing a record of a layer entry having a virtual layer structure. The content management file 340 is illustrated in detail in FIGS. 3 through 9.

The content input unit 211 receives a content file and then outputs the received content file to each of the face detector 212, the face metadata generator 213, the virtual management information generator 214, the representative thumbnail image extractor 215 and the content attribute information generator 216. More specifically, frames captured by the camera section 110 are successively input via the content input unit 211.

The face detector 212 detects a face contained in the content file input by the content input unit 211. The face detector 212 then outputs appearing time and position of the detected face to the face metadata generator 213. If a plurality of faces are detected at the same time, the appearing time and the position of each detected face are output to the face metadata generator 213.

The face metadata generator 213 generates the face metadata based on the content file input via the content input unit 211. The face metadata generator 213 outputs the generated face metadata to the recording controller 217. The face metadata generator 213 includes a face data generator 218 and a header information generator 219. Based on the appearing time and the position of the face detected by the face detector 212, the face data generator 218 generates the face data of the face (each data of the face data section 640 of FIG. 11). The header information generator 219 generates header information (information of the header section 630 of FIG. 10) managing the face data generated by the face data generator 218. The recording controller 217 receives the face data generated by the face data generator 218 and the header information generated by the header information generator 219. Optionally, the face data generator 218 may have an option not to generate face data of any one of faces detected at predetermined intervals but failing to satisfy a predetermined condition.

The virtual management information generator 214 generates, based on the content file, the virtual management information 401 (FIG. 5) virtually managing the content file input via the content input unit 211. The virtual management information generator 214 outputs the generated virtual management information 401 to the recording controller 217.

The representative thumbnail image extractor 215 extracts representative thumbnail images 501 through 506 (see FIG. 5) of the content file from the content file input via the content input unit 211 and outputs the extracted representative thumbnail images to each of the content attribute information generator 216 and the recording controller 217.

The content attribute information generator 216 generates the content attribute information 402 (FIG. 5) related to the content file input via the content input unit 211, based on the content file and outputs the generated content attribute information 402 to the recording controller 217. The content attribute information generator 216 generates attribute information by including a recording position (thumbnail address) of the representative thumbnail image in the thumbnail file 500 in content attribute information related to the content file corresponding to the representative thumbnail image extracted by the representative thumbnail image extractor 215.

The recording controller 217 causes the content management file storage 210 to record as the property file 400 the moving image folder entry 414. The moving image folder entry 414 contains the virtual management information 401 generated by the virtual management information generator 214 and the content attribute information 402 generated by the content attribute information generator 216. The recording controller 217 also causes the content management file storage 210 to record the metadata entry 415 containing the face metadata generated by the face metadata generator 213. The metadata entry 415 is recorded as a lower layer in the property file 400 of the moving image folder entry 414 corresponding to the content file with the metadata thereof produced. The recording controller 217 further causes the content management file storage 210 to record as the thumbnail file 500 the representative thumbnail image extracted by the representative thumbnail image extractor 215.

Figure 18:
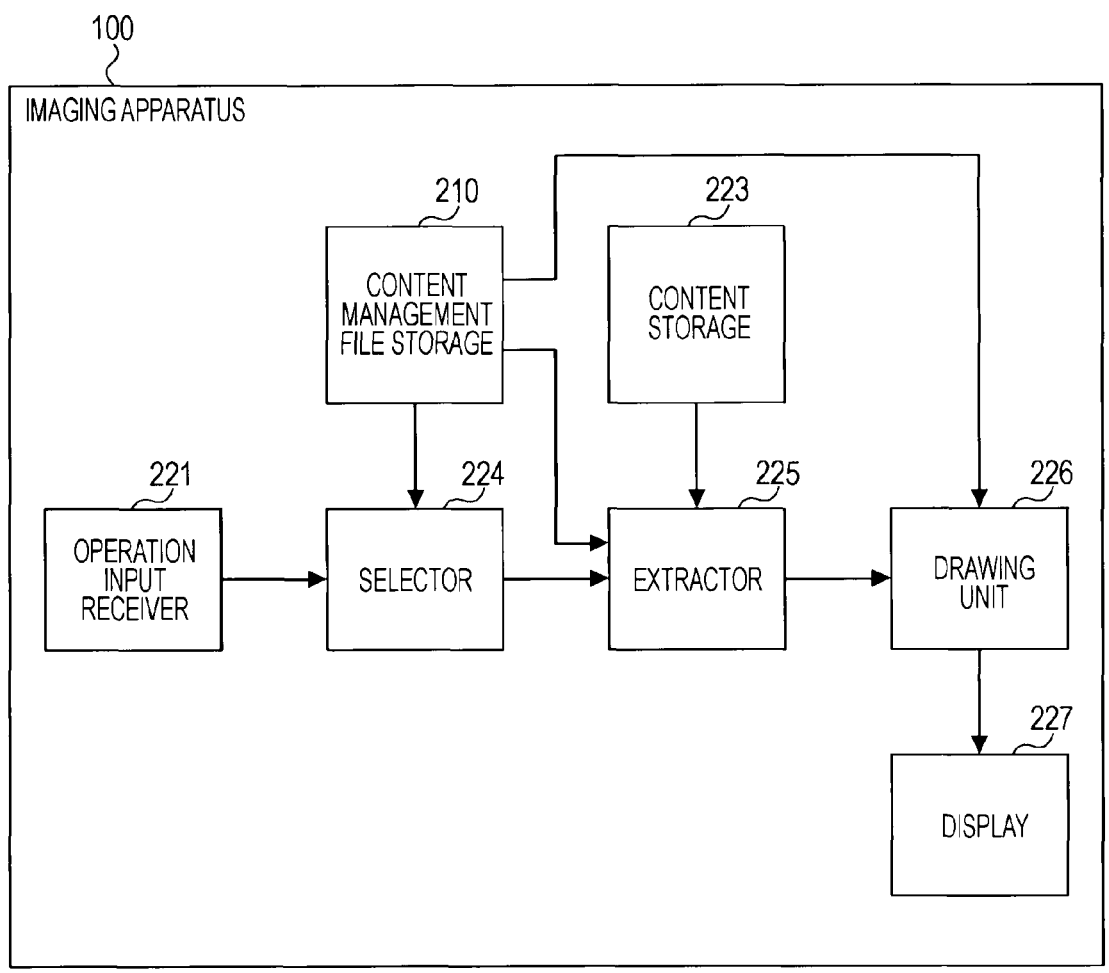
FIG. 18 is a functional block diagram illustrating the imaging device in accordance with one embodiment of the present invention.

FIG. 18 is a functional block diagram illustrating the imaging device 100 in accordance with one embodiment of the present invention. The imaging device 100 includes a content management file storage 210, an operation input receiver 221, a content storage 223, a selector 224, an extractor 225, a drawing unit 226 and a display 227.

The content management file storage 210 stores the content management file 340 recorded by the recording controller 217 (FIG. 17). The content management file storage 210 outputs each entry recorded in the content management file 340 to each of the selector 224 and the extractor 225.

The operation input receiver 221 has a variety of input keys. Upon receiving an operation input in response to selecting of one of the keys, the operation input receiver 221 output the received operation input to the selector 224. At least a portion of the operation input receiver 221 may be integrated with the content storage 223 into a unitary body as a touch-panel.

The content storage 223 stores the content file such as a moving image or a still image. The content storage 223 outputs a stored content file to each of the extractor 225 and the drawing unit 226.

The selector 224 performs a selection process responsive to the operation input entered via the operation input receiver 221 and outputs selection results to the extractor 225. More specifically, the operation input receiver 221 receives an operation input to select one representative thumbnail image from the representative thumbnail images displayed on the display 227. In response to the operation input, the selector 224 selects the file entry responsive to the selected representative thumbnail image and outputs the entry number of the selected file entry to the extractor 225. The operation input receiver 221 receives an operation input to select one face thumbnail image from among the face thumbnail images displayed on the display 227. In response to the operation input, the selector 224 selects face data responsive to the selected face thumbnail image and outputs the face detection time information of the selected face data to the extractor 225. In other words, the selector 224 selects the desired file entry from the file entries in the content management file recorded on the content management file storage 210 and selects the desired face data from the face data of the face metadata in the metadata entry.

In response to the entry number of the file entry input by the selector 224, the extractor 225 extracts the content file stored on the content storage 223. The extractor 225 extracts the face data contained in the metadata entry stored at the lower layer of the file entry responsive to the entry number input by the selector 224. In accordance with the time and position information of the face contained in the face data, the extractor 225 extracts from the content file the face thumbnail image corresponding to the face data. The extractor 225 further extracts the content file in accordance with the file entry recorded at an upper layer of the metadata entry. The metadata entry contains the face detection time information 641 of the face data input by the selector 224. From the content file stored on the content storage 223, the extractor 225 extracts a moving image at and after the recording time corresponding to the face detection time information 641 input from the selector 224. The extractor 225 outputs these extraction results to the drawing unit 226. The selection and extraction processes will be described in detail later with reference to FIGS. 19 and 20.

The extractor 225 determines whether a predetermined condition is satisfied by the image and the face data of the image corresponding to the content file stored on the content storage 223. The extractor 225 calculates the recording offset value from the head of each face data in a desired information component with respect to the face data of the face contained in the image satisfying the predetermined condition and reads the desired information component from the face data in accordance with the calculated recording offset value. If the predetermined condition is not satisfied, the extractor 225 searches the face data and the face data management information corresponding to an image different from the image determined as not satisfying the predetermined condition. The reading process of the information component will be described in detail with reference to FIGS. 26, 27, 32 and 33.

In response to the extraction results input from the extractor 225, the drawing unit 226 draws the face thumbnail image extracted from the content file stored on the content storage 223 and the moving image extracted from the content file stored on the content storage 223. The drawing unit 226 further draws the representative thumbnail image stored in the thumbnail file 500 on the content management file storage 210.

The display 227 displays the image drawn by the drawing unit 226.

The relationship of the property file, the thumbnail file and the moving image content file is described below with reference to drawings.

Figure 19:
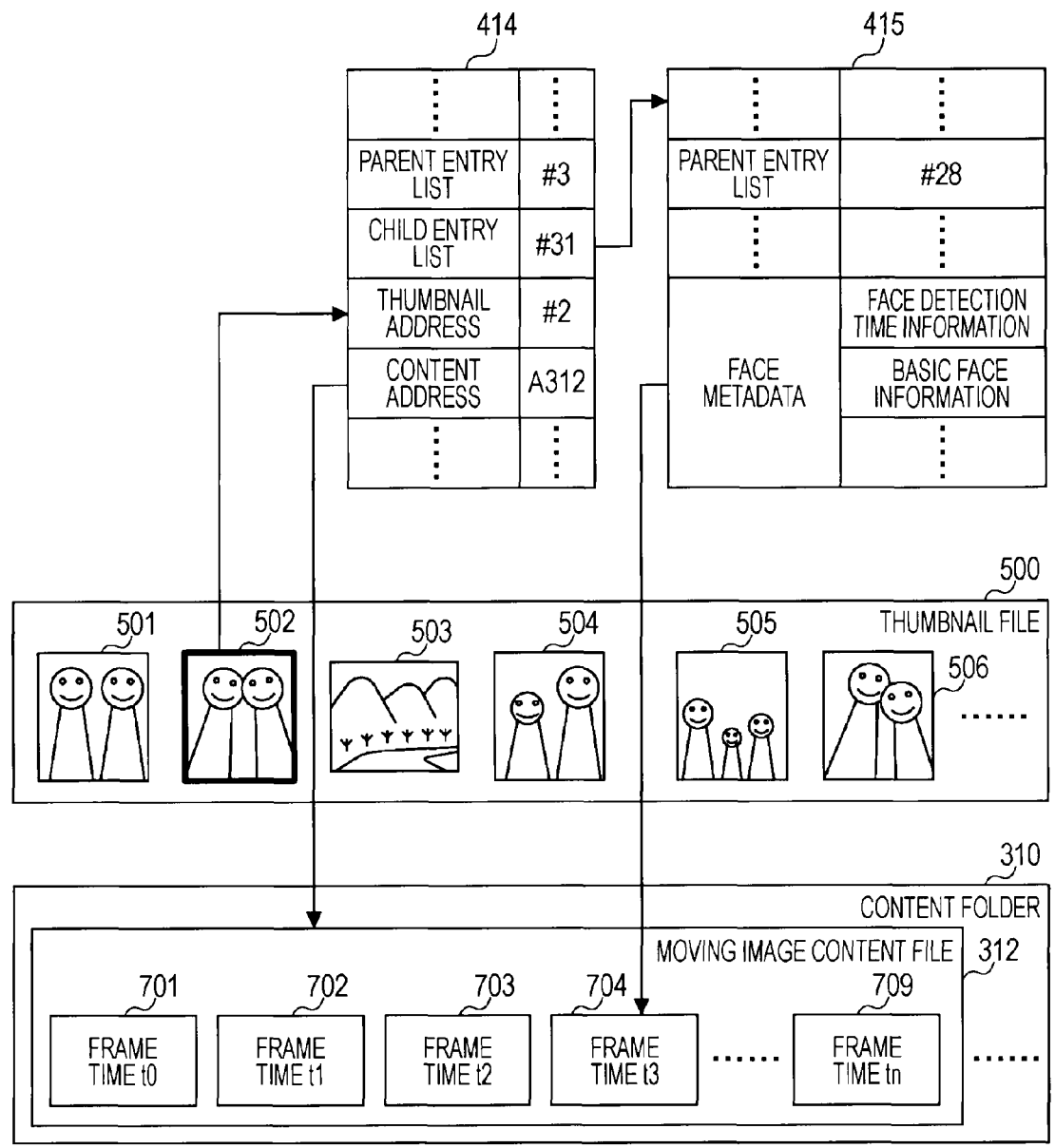
FIG. 19 diagrammatically illustrates a relationship of a moving file entry, a metadata entry, a thumbnail file and a moving image content file in accordance with one embodiment of the present invention.

FIG. 19 illustrates the relationship of the moving image folder entry 414, the metadata entry 415, the thumbnail file 500 and the moving image content file 312.

As shown in FIG. 19, the moving image folder entry 414 stores "A312" indicating a content address of the moving image content file 312 and "#2" indicating a thumbnail address of the representative thumbnail image 502 corresponding to the moving image content file 312. The child entry list of the moving image folder entry 414 stores an entry number "#31" of the metadata entry 415 storing the metadata related to the moving image content file 312. The parent entry list of the metadata entry 415 stores an entry number "#28" of the moving image folder entry 414. The metadata of the metadata entry 415 contains a variety of face metadata related to the detected face as shown in FIGS. 9 and 11. One frame may be identified from among the frames of the moving image content file 312 based on the face detection time information and the basic face information of the face metadata. The relationship described above is indicated by arrow-headed lines.

The content file is quickly searched by mapping and managing the contents of the entries.

For example, a list of moving images captured on Jan. 11, 2006 might be displayed. The moving image folder entry 410 managing the moving image content files is searched among the entries of the property file 400. The date folder entry 411 managing files for Jan. 11, 2006 is then searched from among date folder entry 411 and the date folder entry 416 stored in the child entry list in the moving image folder entry 410. The moving image folder entry 412 and the moving image folder entry 414 stored in the child entry list of the date folder entry 411 are searched. The thumbnail address (entry reference information) of the thumbnail file 500 recorded on the date folder entries 411 and 414 is extracted. The thumbnail file 500 is then opened, the representative thumbnail image is extracted from the thumbnail file 500 in accordance with the extracted thumbnail address, and the extracted representative thumbnail image is then displayed.

A list of moving images captured on Jan. 11, 2006 may be displayed without using the content management file 340. In this case, however, all content files are opened and closed for searching. Such a process is time consuming. When the representative thumbnail image is displayed, an image corresponding to a real content file is contracted and displayed. Even more time is needed.

A face of a person appearing in a moving image recorded on Jan. 11, 2006 might be displayed. The moving image folder entry 414 and the metadata entry 415 are extracted based on the displayed representative thumbnail image 502. The moving image content file 312 managed by the moving image folder entry 414 is accessed. The face image is extracted from the moving image content file 312 in accordance with the face metadata (face detection time information 641 and basic face information 642) stored in the metadata entry 415. The extracted face image is then displayed.

Figure 20:
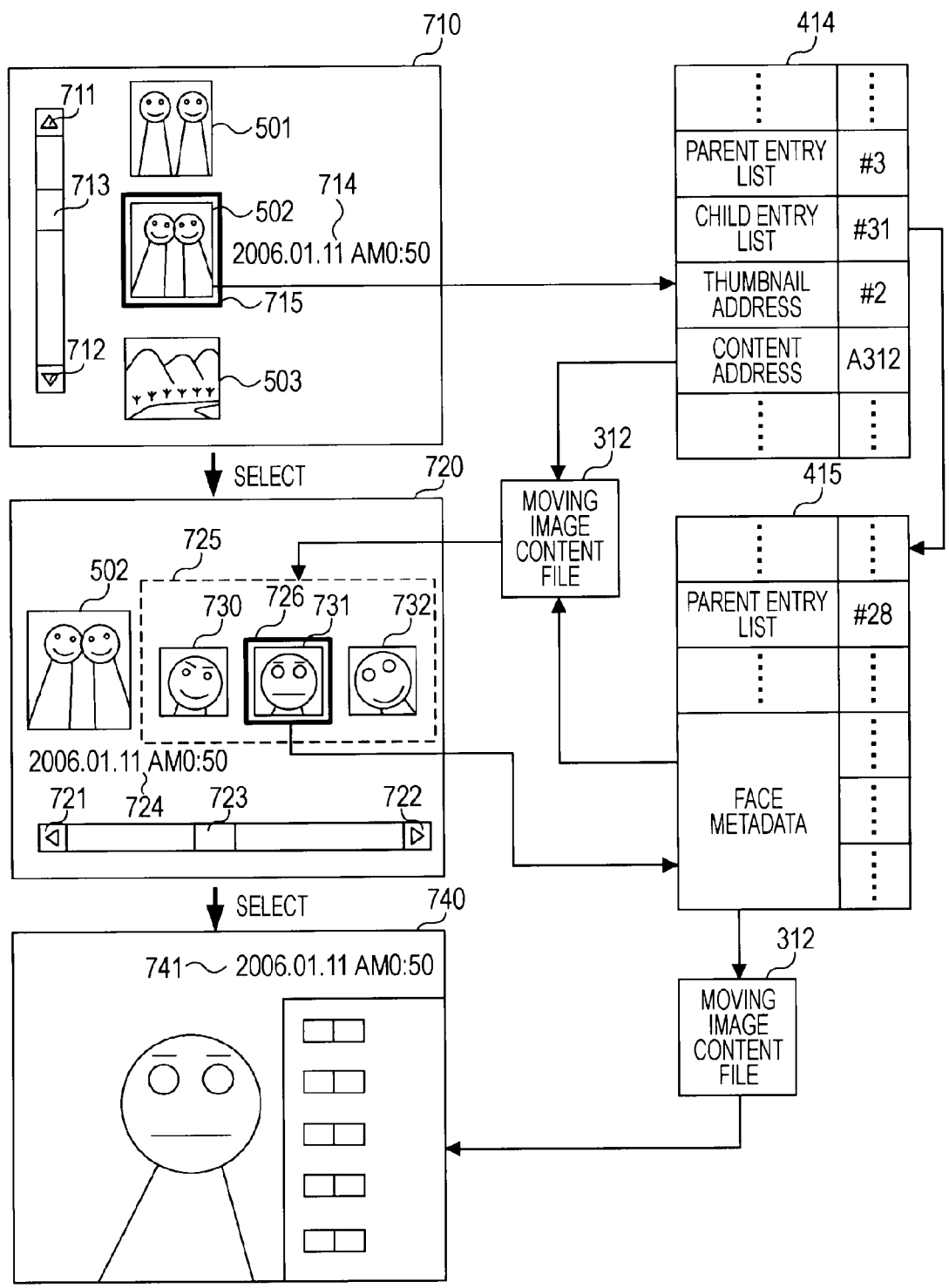
FIG. 20 illustrates an application of a content management file in accordance with one embodiment of the present invention.

FIG. 20 illustrates an application using the content management file 340. A variety of images related to the moving image content file 312 are displayed on the LCD 162 and an image related to the moving image content file 312 is played from desired time.

As shown in FIG. 19, the thumbnail file 500 is opened. A list of representative thumbnail images 501 through 506 stored in the thumbnail file 500 are displayed on the LCD 162. The representative thumbnail images 501 through 503 are displayed on a display screen 710. Recording date and time 714 of the moving image content file 312 corresponding to the representative thumbnail image 502 is displayed to the right of the representative thumbnail image 502 labeled a selection mark 715. Pressing of an upper button 711 or a lower button 712 causes a scroll bar 713 to move up or down and causes a representative thumbnail image displayed on the display screen 710 to move up or down to show other representative thumbnail images. The representative thumbnail images may be displayed from top to bottom in the order of recording date and time.

An operation input to select the representative thumbnail image 502 is entered on the display screen 710. The moving image content file 312 corresponding to the moving image folder entry 414 is extracted in accordance with the content address stored in the moving image folder entry 414 corresponding to the representative thumbnail image 502. The metadata entry 415 corresponding to the moving image folder entry 414 is extracted in accordance with the child entry list stored in the moving image folder entry 414. The face thumbnail image is extracted from the moving image content file 312 in accordance with the face metadata stored in the metadata entry 415. A list of extracted face thumbnail images is displayed on the LCD 162. The face thumbnail image is a rectangular image containing a person's face as shown in a display screen 720. As shown in the display screen 720, the representative thumbnail image 502 selected in the display screen 710 is displayed on the left portion of the screen while a face thumbnail image display area 725 displayed on the right of the screen shows extracted face thumbnail images 730 through 732. The selected face thumbnail image is labeled a selection mark 726. The LCD 162 also displays recording date and time 724 of the moving image content file 312 corresponding to the representative thumbnail image 502 selected in the display screen 710. Pressing of an upper button 721 or a lower button 722 causes a scroll bar 723 to move to the right or to the left and causes a representative thumbnail image displayed on the display screen 720 to move to the right or to the left to show other representative thumbnail images. The representative thumbnail images may be displayed from left to right in the order of recording date and time.

An operation input to select a face thumbnail image 731 may be input on the display screen 720. The face detection time information corresponding to the face thumbnail image 731 is extracted from the face detection time information stored in the metadata entry 415. The face data corresponding to the face thumbnail image 731 is identified from the face metadata stored in the metadata entry 415, starting with the head of the selected face thumbnail image 731. The face detection time information contained in the face data is extracted. A played image of the moving image content file 312 is displayed on the LCD 162 at time represented by the face detection time information. As shown in FIG. 19, the moving image is played from a frame 704 of the moving image content file 312. As shown in a display screen 740, the played image is displayed while recording date and time 741 is also displayed on the right top portion of the display screen 740. The user may wish to play the moving image from time when a particular person (for example, the user himself or herself) appears. The user can easily start playing from that moment by selecting the face thumbnail image of that particular person. If a plurality of faces are detected at the same time, a plurality of units of face data are generated at the same time. The face thumbnail image is extracted based on each face data. A plurality of face thumbnail images at the same time can be displayed. When a plurality of face thumbnail images at the same time are displayed, the moving image is played from that time if any of the face thumbnail images is selected.

Linking information (content address) from the virtual file structure (entry) to the real file structure is stored. The content file is searched and played in accordance with any information (for example, recording date and time) within the file entry. In that case, the recorded file entry having a record of the recording date and time is searched, and the content file is played in accordance with the content address within the file entry. The property file alone is simply opened without the need for opening all content files. With the fixed length management (entry number management) with the slot, fast process is performed.

A similar search may be performed when the virtual file management is not performed. The content file is actually opened, internal information (such as the recording date and time) is read, and then the content file is closed. A next content file is then opened. Such a process is time consuming. If the recording capacity of the recording medium increases, the number of content units increases accordingly. The problem of time consuming processing becomes more pronounced.

Operation of the imaging device 100 of one embodiment of the present invention is described below with reference to drawings.

Figure 21:
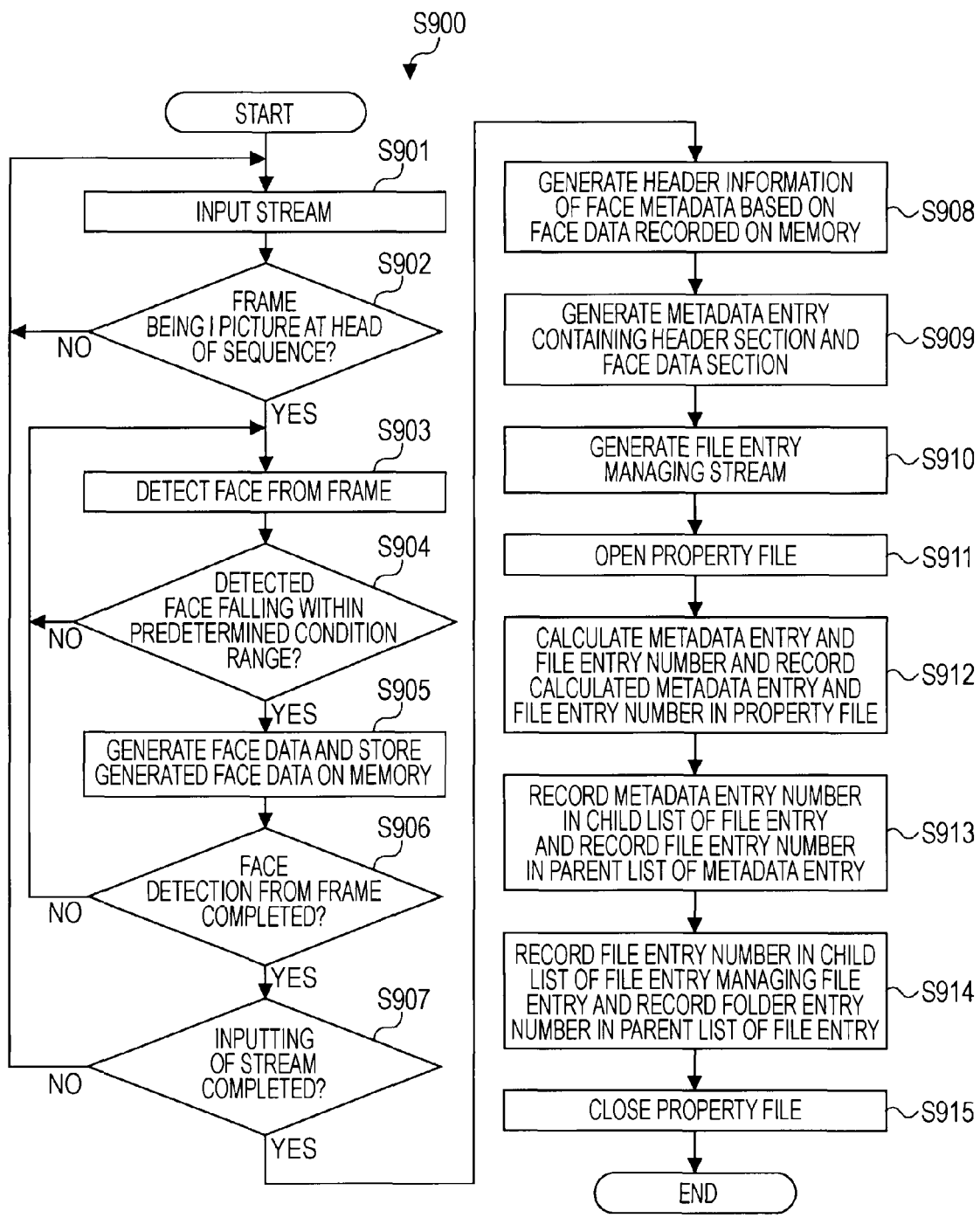
FIG. 21 is a flowchart illustrating a recording process of a property file performed by the imaging device in accordance with one embodiment of the present invention.

FIG. 21 is a flowchart illustrating a recording process of the property file 400 by the imaging device 100. A moving image content file corresponding to captured image data is here input as a content file.

An image captured by the camera section 110 is encoded. A stream as the encoded image data is input to the content input unit 211 (step S901).

It is then determined whether a frame forming the input stream is an I picture or an IDR picture at the head of a sequence (step S902). If the frame forming the input stream is neither the I picture nor the IDR picture (step S902), steam inputting continues (step S901).

If the frame forming the input stream is either the I picture or the IDR picture, the face detector 212 detects a face from the frame (step S903). It is then determined whether the detected face falls within a predetermined range of a predetermined condition (step S904). If the face is not detected, or if the detected face falls outside the range of the predetermined condition (step S904), processing returns to step S903 to repeat face detection.

If the detected face falls within the range of the predetermined condition (step S904), the face data is generated based on the detected face. The generated face data is then recorded (step S905). It is then determined whether face detection has been completed from within one frame (step S906). In other words, face detection is performed on the entire area of one frame. If it is determined face detection has not completed within one frame (step S906), processing returns to step S903. Face detection from the frame is then repeated.

If it is determined that face detection within one frame has been completed (step S906), it is then determined whether stream inputting has been completed (step S907). In other words, it is determined whether the inputting of one complete unit of image content data has been completed. If it is determined in step S907 that the inputting of the stream has not completed, processing returns to step S901 to continue to input the stream.

If the inputting of the stream has been completed, the header information is generated (step S908). The header information is recorded on the header section 630 (FIG. 10) of the face metadata based on the face data recorded on the memory (step S908).

The metadata entry is generated (step S909). The metadata entry contains the header section containing the generated header information and the face data section containing the face data of the detected face. The file entry managing the moving image content file corresponding to the input stream is generated (step S910).

The property file 400 is opened (step S911). The entry numbers of the metadata entry and the file entry are calculated and the property file 400 is assigned the generated metadata entry and the file entry in accordance with the calculation results (step S912). More specifically, a plurality of entries are assigned to the property file 400 in the order of slot numbers.

The entry number of the metadata entry belonging to the file entry is recorded on the child entry list of the file entry assigned to the property file 400 and the entry number of the file entry of the metadata entry is recorded in the parent entry list of the metadata entry (step S913).

The entry number of the file entry is recorded in the child entry list of the folder entry that the property file 400 is assigned. The entry number of the file entry of the metadata entry is recorded in the parent entry list of the metadata entry (step S913).

The entry number of the file entry is recorded in the child entry list of the folder entry of the file entry that the property file 400 is assigned, and the entry number of the folder entry is recorded in the parent entry list of the file entry (step S914). The property file 400 is closed (step S915) and the recording process of the property file 400 is thus complete.

If a frame forming the stream input in step S901 is a leading frame, a representative thumbnail image is extracted (step S903). The representative thumbnail image is stored in the thumbnail file 500 and the thumbnail address of the representative thumbnail image is recorded in the thumbnail address of the corresponding file entry (step S912). The content address of the content file corresponding to the input stream is stored in the content address of the corresponding file entry (step S912).

A playing process of playing the moving image content file from a desired time point is described with reference to drawings.

Figure 22:
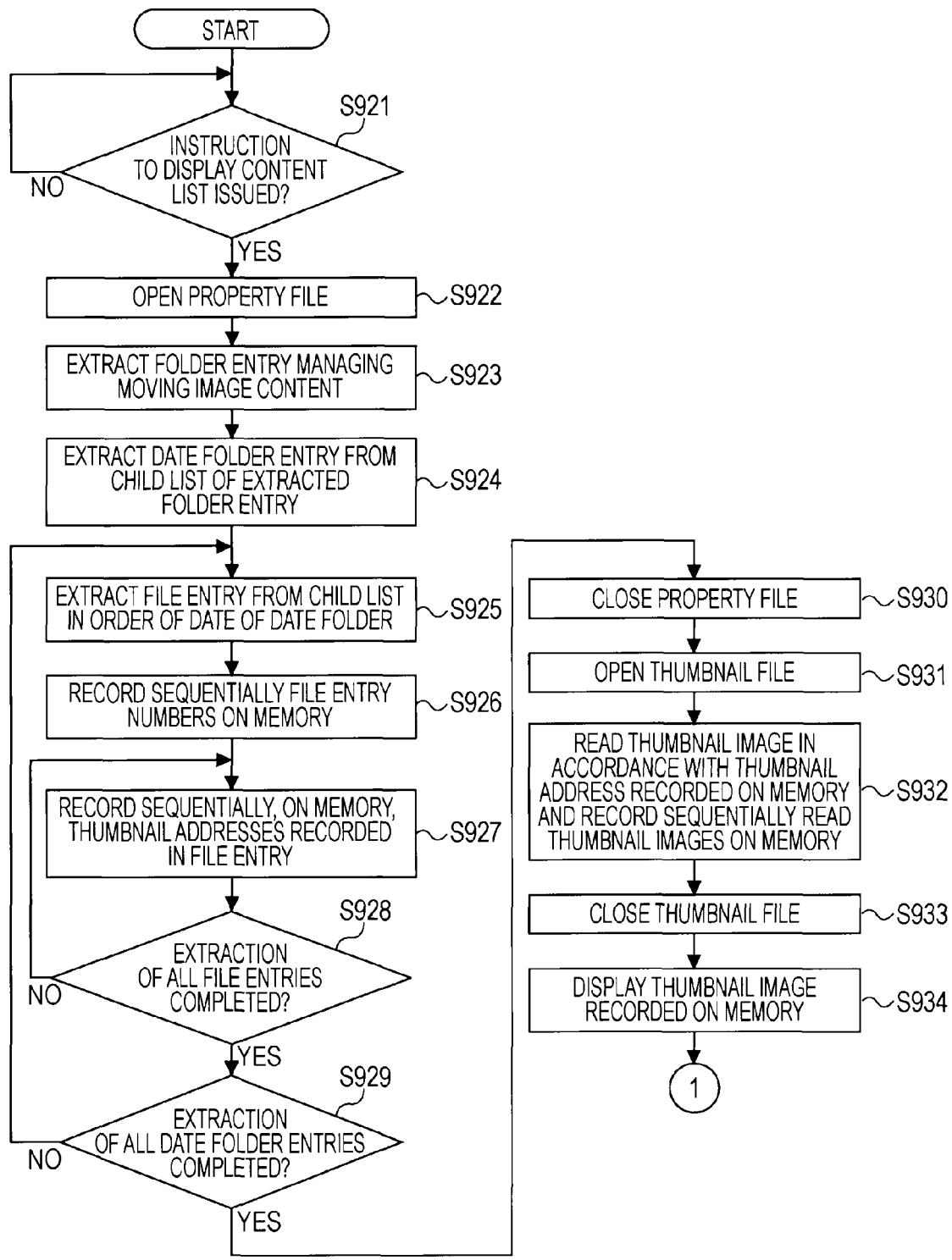
FIG. 22 is a flowchart illustrating a playing process of a moving image content file by the imaging device in accordance with one embodiment of the present invention.
Figure 23:
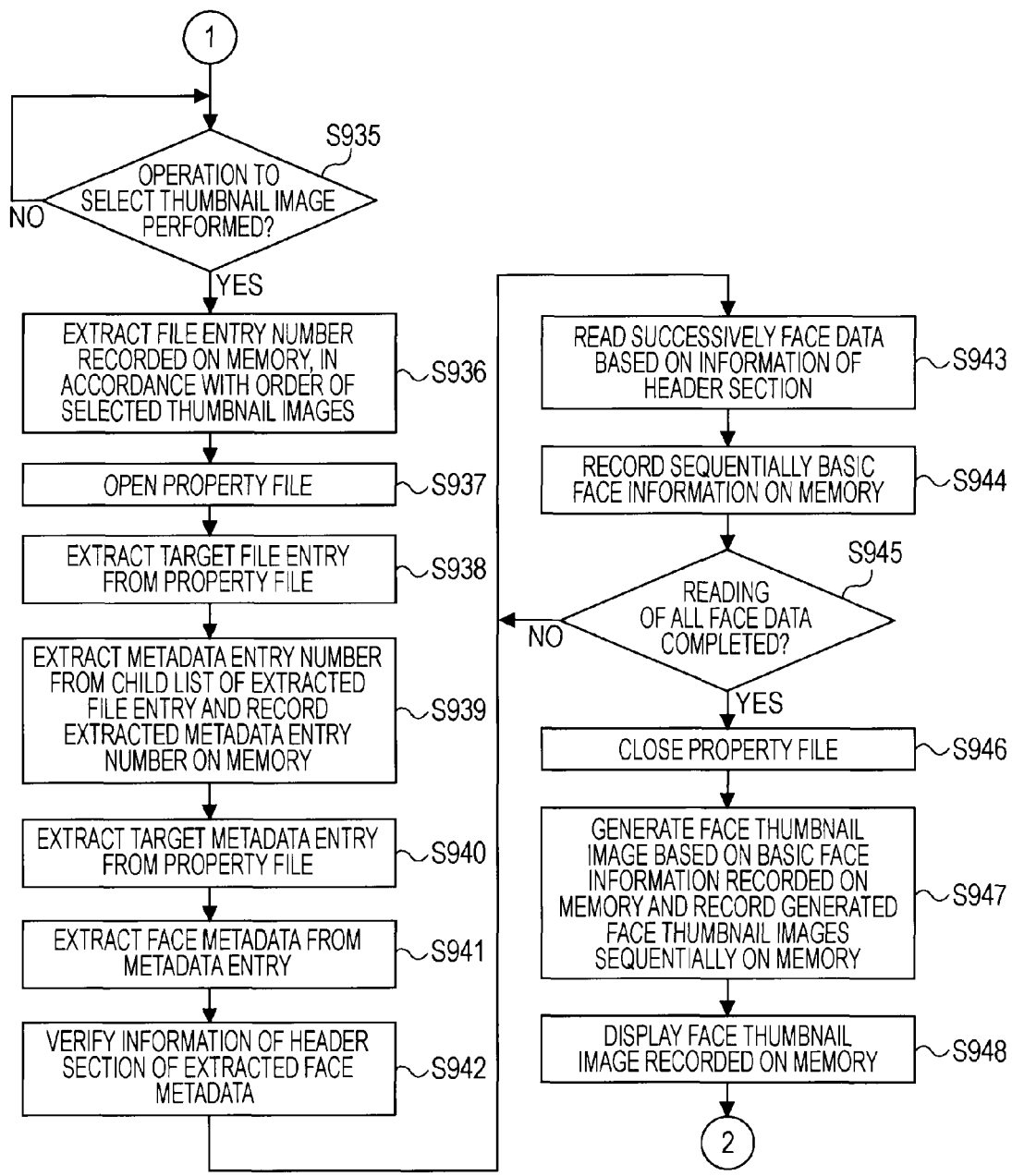
FIG. 23 is a continuation of the flowchart of FIG. 22 in accordance with one embodiment of the present invention.
Figure 24:
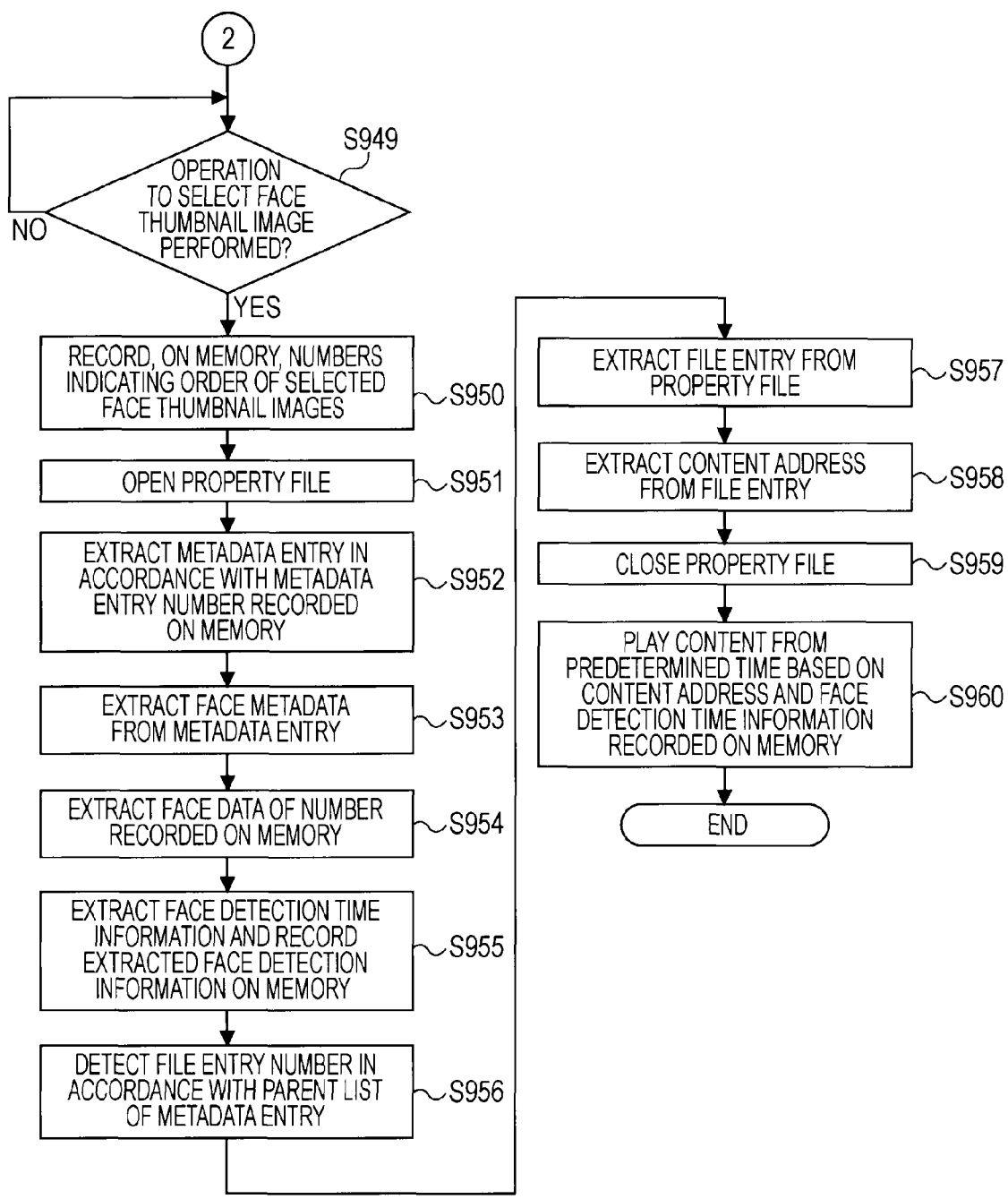
FIG. 24 is a continuation of the flowchart of FIG. 23 in accordance with one embodiment of the present invention.

FIGS. 22 through 24 are flowcharts of the playing process of the moving image content file performed by the imaging device 100.

An operation input from the operation unit 140 is monitored. The imaging device 100 determines whether an operation instruction to display a list of moving image content files has been input (step S921). If it is determined in step S921 that no instruction has been input, the imaging device 100 continuously monitors the operation input.

When the operation instruction to display the list of moving image content files is input (step S921), the property file 400 is opened (step S922). The folder entry managing the moving image content file is extracted from the property file 400 (step S923). The entry number of the date folder entry is extracted from the child entry list recorded in the extracted folder entry, and the date folder entry is extracted in accordance with the extracted entry number (step S924).

The entry number of the moving image file entry is extracted from the child entry list recorded in the extracted date folder entry, and the moving image folder entry is extracted in accordance with the extracted entry number (step S925). The entry numbers of the extracted file entries are successively recorded on the memory (step S926). The thumbnail addresses recorded in the file entries corresponding to the entry numbers recorded on the memory are successively recorded on the memory (step S927).

It is then determined whether all thumbnail addresses recorded in the file entry of one date folder entry are extracted (step S928). If all thumbnail addresses are not extracted yet, processing returns to step S927 to repeat the extraction process.

If all thumbnail addresses are extracted (step S928), it is then determined whether all date folder entries have been extracted (step S929). If all date folder entries have not been extracted (step S929), processing returns to step S925 to repeat the extraction process.

If all date folder entries have been extracted (step S929), the property file 400 is closed (step S930) and the thumbnail file 500 is opened (step S931). The representative thumbnail image is read from the thumbnail file 500 in accordance with the thumbnail address recorded on the memory in step S927 and the read representative thumbnail images are successively recorded on the memory (step S932). The thumbnail file 500 is closed (step S933). The representative thumbnail image recorded on the memory in step S932 is displayed on the LCD 162 (step S934). For example, the display screen 710 is presented as shown in FIG. 20.

The imaging device 100 determines in step S935 whether the operation unit 140 has entered an operation instruction to select one of the representative thumbnail images displayed on the LCD 162. If it is determined in step S935 that no operation instruction has been entered, the imaging device 100 continuously monitors the operation input.

When the operation instruction to select one of the representative thumbnail images (step S935), the entry number of the file entry recorded on the memory in step S926 is extracted (step S936). The property file 400 is then opened (step S937). The file entry responsive to the extracted entry number is extracted from the property file 400 (step S938).

The entry number of the metadata entry is extracted from the child entry list recorded in the extracted file entry and the entry number of the extracted metadata entry is recorded on the memory (step S939). The metadata entry responsive to the entry number recorded on the memory is extracted from the property file (step S940). The face metadata is extracted from the extracted metadata entry (step S941). The information of the header section of the extracted face metadata is verified (step S942).

The face data is read in accordance with the information of the header section (step S943). The basic face information contained in the read face data is successively recorded (step S944). It is determined in step S945 whether all face data has been read. If it is determined in step S945 that all face data has not been read, reading of the face data and recording of the face data onto the memory are continuously performed (steps S943 and S944). If all face data has been read, the property file 400 is closed (step S946). The face thumbnail image is generated from the moving image content file based on the basic face information recorded on the memory in step S944 and the generated face thumbnail images are successively recorded on the memory (step S947). The face thumbnail image recorded on the memory in step S947 is displayed on the LCD 162 (step S948). The display screen 720 is thus presented as shown in FIG. 20.

It is then determined whether the operation unit 140 has entered an operation instruction to select one of the face thumbnail images displayed on the LCD 162 (step S949). If an operation instruction to select one of the face thumbnail images has not been entered (step S949), the imaging device 100 continuously monitors the inputting of the operation instruction.

When an operation instruction to select one of the face thumbnail images has been entered (step S949), a number responsive to the display order of the selected face thumbnail image is recorded on the memory (step S950). The property file 400 is opened (step S951). The metadata entry is extracted from the property file 400 in accordance with the entry number of the metadata entry recorded on the memory in step S939 (step S952).

The face metadata is extracted from the extracted metadata (step S953). The face data corresponding to the number recorded on the memory in step S950 is extracted from the extracted face metadata (step S954). The face detection time information is extracted from the extracted face data and the extracted face detection time information is recorded on the memory (step S955).

The entry number of the file entry corresponding to the parent entry list of the metadata entry having the entry number recorded on the memory is extracted (step S956). The file entry corresponding to the extracted entry number is extracted from the property file 400 (step S957). The content address recorded in the extracted file entry is extracted and the extracted content address is recorded on the memory (step S958). The property file 400 is then closed (step S959).

The content file corresponding to the content address extracted in step S957 starts to be played from the time indicated by the face detection time information recorded on the memory in step S955 (step S960).

Figure 25:
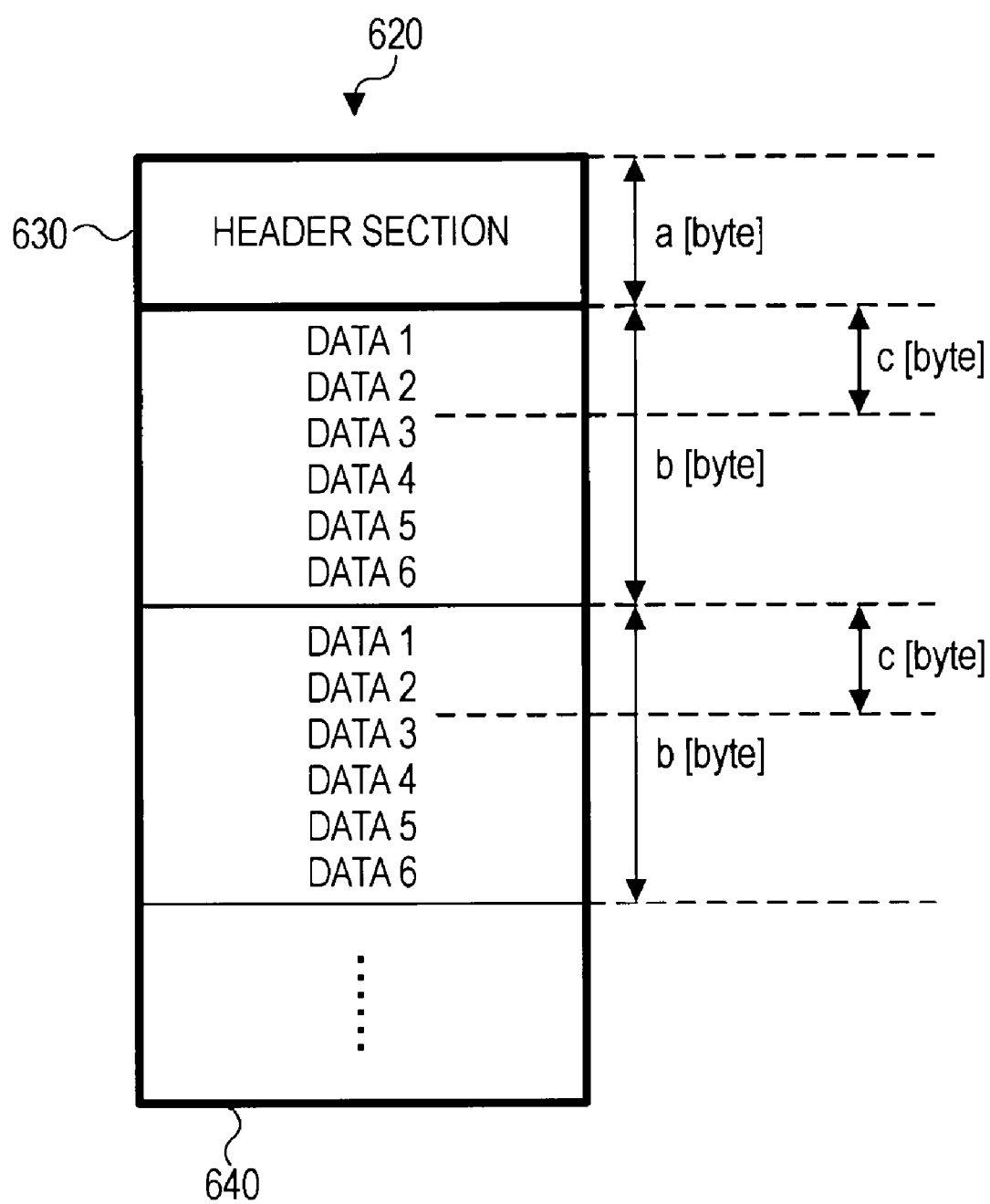
FIG. 25 diagrammatically illustrates the face data contained in the metadata entry in accordance with one embodiment of the present invention.

FIG. 25 diagrammatically illustrates the structure of the face metadata 620 contained in the metadata entry 600 of FIG. 9. The offset value of the face data is calculated in the reading process of the face data containing data 1 through data 6.

A header size "a" of the face metadata 620 is recorded in a header size 631 of the header section 630 of the face metadata 620. A face data size "b" of the face metadata 620 is recorded in a face data size 636 of the header section 630 of the face metadata 620 and "c" represents a distance of a single unit of face data to predetermined data. In order to read data from the face metadata 620, the offset value from the head of each data is calculated in accordance with equation (1) and the data is then read using the calculated offset value. When the data is read from the face data, the reading process is performed fast. For example, as shown in FIG. 25, desired data is data 3:

$$a+c+n\times b \text{ (n: an integer equal to or higher than zero)} \text{ [bytes]} \quad (1)$$

Figure 26:
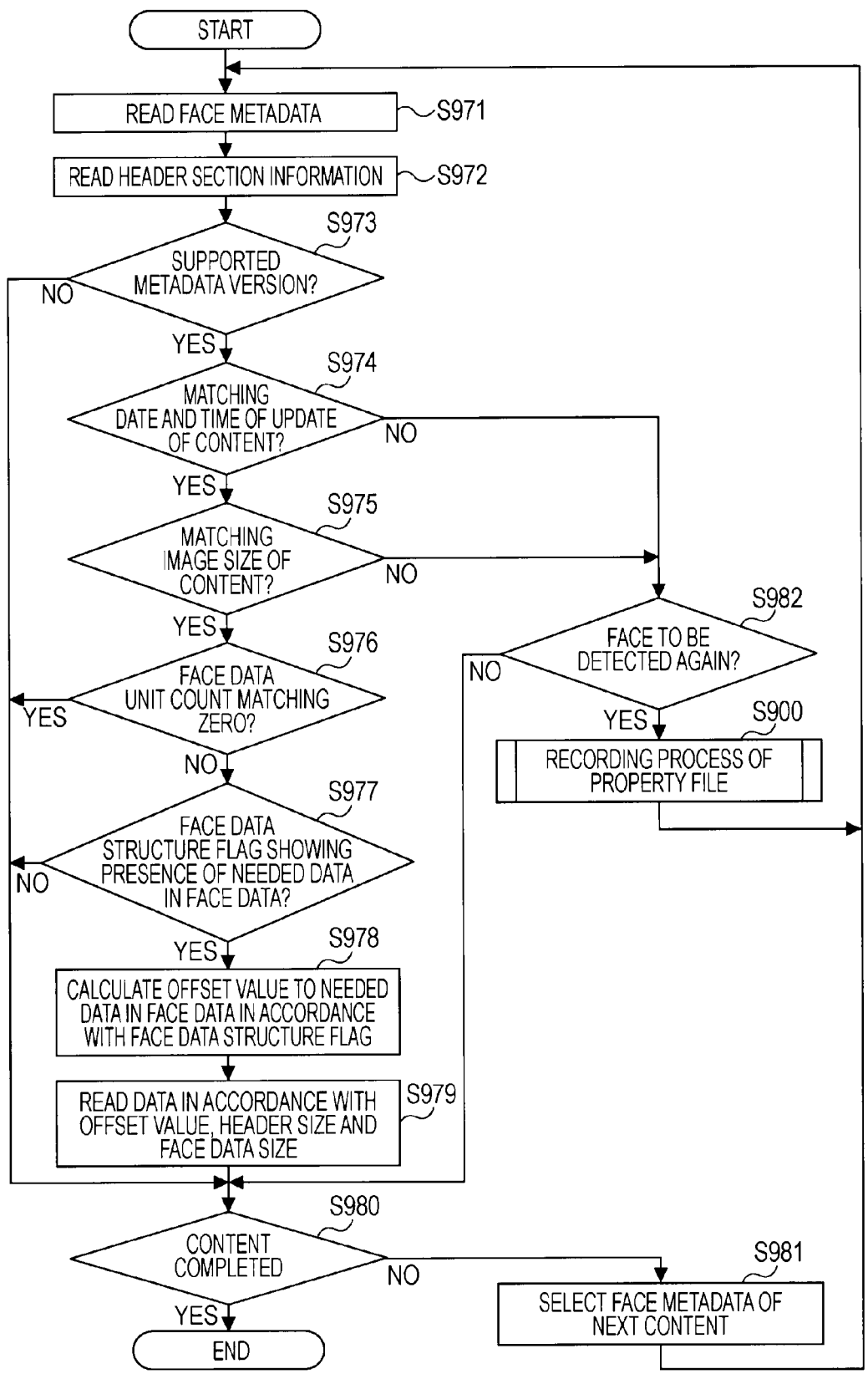
FIG. 26 is a flowchart illustrating a reading process of the face data performed by the imaging device.

FIG. 26 is a flowchart illustrating the reading process of the face data performed by the imaging device 100. The reading process, corresponding to steps S941 through S943 of FIG. 23, is performed to the header section 630 of FIG. 10.

The face metadata is read from the metadata entry (step S971). The information of the header section 630 of the read face metadata is then read (step S972). Based on the version information of the face metadata recorded in the metadata version 632 of the read header section 630, the imaging device 100 determines in step S973 whether the version of the face metadata is supported by the imaging device 100. The imaging device 100 also determines the version of the face metadata as to whether desired data is present in the face metadata. The face metadata attached to the version of "1.10" might be used. If the version of "1.00" is confirmed, processing proceeds to step S980.

If it is determined in step S973 that the version of the face metadata is not supported, processing proceeds to step S980. The imaging device 100 then determines whether the face data of all content data stored on the content storage 223 has been read (step S980).

If the version of the face metadata is supported (step S973), the imaging device 100 determines whether the update date and time of the corresponding moving image content file match the update date and time recorded in the content update date and time 633 of the header section 630 (step S974).

If it is determined in step S974 that the update date and time of the moving image content file fail to match the update date and time recorded in the content update date and time 633 of the header section 630, the imaging device 100 determines whether face re-detection is to be performed (step S982). If face re-detection is to be performed, the recording process of the property file of step S900 is performed on the moving image content file that is determined as having unmatched update date and time. Processing returns to step S971. The face metadata is then read from the metadata entry corresponding to the moving image content file that has undergone the recording process of the property file (step S971).

If it is determined in step S974 that the update date and time of the moving image content file fail to match the update date and time recorded in the content update date and time 633 of the header section 630, the imaging device 100 determines whether the image size of the corresponding moving image content file matches the image size recorded in the content image size 638 of the header section 630 (step S975). If it is determined in step S975 that the image size of the corresponding moving image content file fails to match the image size recorded in the content image size 638 of the header section 630, processing proceeds to step S982 to repeat the above-described process.

If it is determined in step S975 that the image size of the corresponding moving image content file matches the image size recorded in the content image size 638 of the header section 630, the imaging device 100 determines whether "0" is recorded in the face data unit count 635 of the header section 630 (step S976). If it is determined in step S976 that "0" is recorded in the face data unit count 635, no face is detected from the corresponding moving image content file and no face data is present. Processing proceeds to step S980.

If it is determined in step S976 that "0" is not recorded in the face data unit count 635, the imaging device 100 determines, based on the record in the face data structure flag 660 of the header section 630, whether necessary data is recorded as the face data (step S977). This determination process is performed because there is a possibility that no necessary data is included even with the same version. If no necessary data is recorded as the face data (step S977), processing proceeds to step S980.

If necessary data is recorded as the face data (step S977), the imaging device 100 calculates the offset value to the necessary data in the face data using equation (1) based on the record of the face data structure flag 660 (step S978). The offset value is calculated to determine how many bytes there are between the head of the face data and the necessary data and to determine the structure of the face data. The face data is read in accordance with the calculated offset value (step S979). The imaging device 100 determines whether all units of content stored on the content storage 223 have been read (step S980). If it is determined in step S980 that all units of content stored on the content storage 223 have been read, the reading process of the face data is complete.

If it is determined in step S980 that all units of content stored on the content storage 223 has not been read yet, the face metadata is selected from the metadata entry corresponding to a content unit with the face data thereof not yet read (step S981). The reading process of the face data is repeated (steps S971 through S979). The reading process is performed herein on all units of content stored on the content storage 223. The above-described process is also applicable to a case in which only a desired one of content units stored on the content storage 223 is read.

In addition to the comparison of the content update date and time, the discrepancy is further reliably detected by performing the content image size comparison process.

Figure 27:
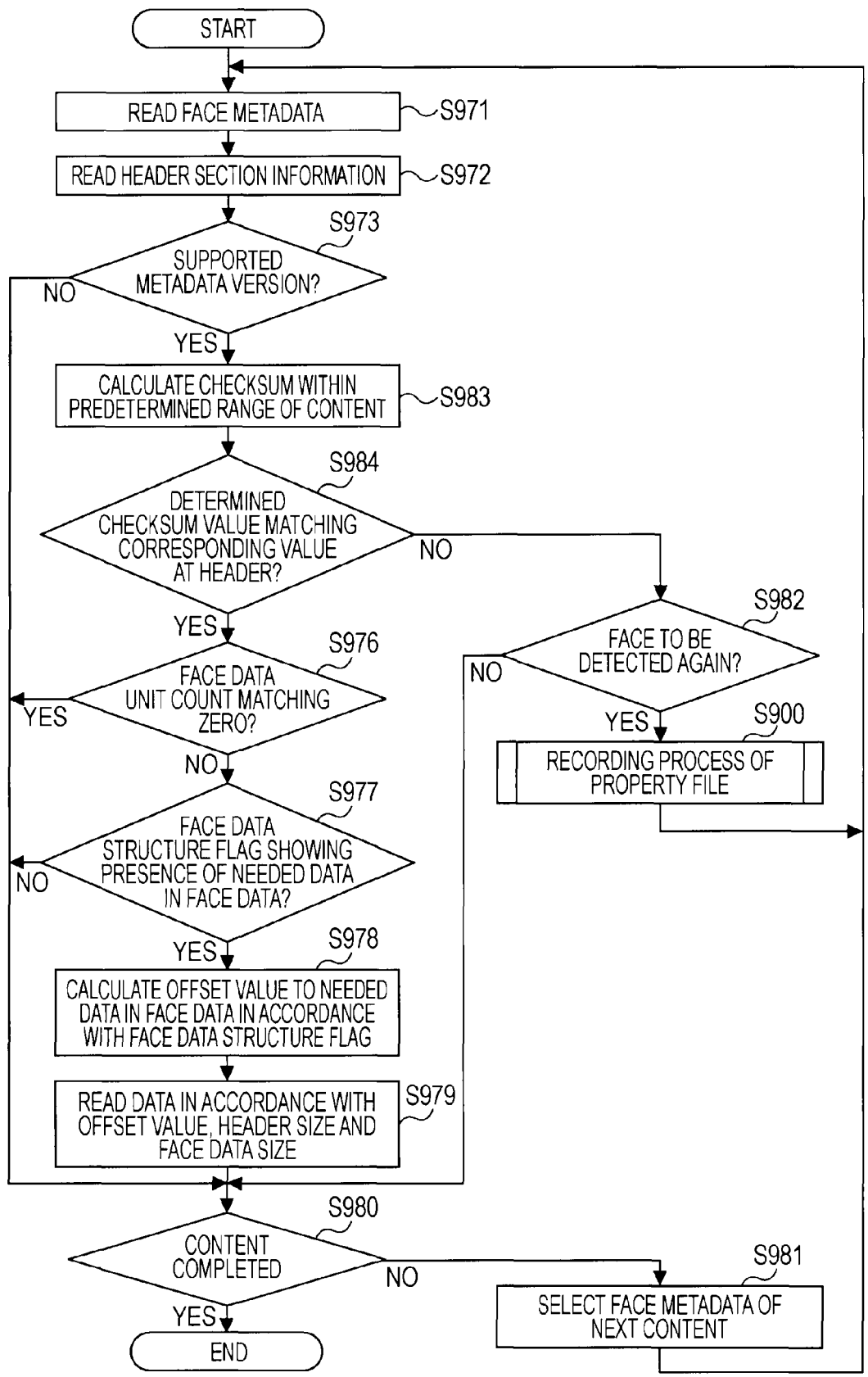
FIG. 27 is a flowchart illustrating a reading process of the face data performed by the imaging device in accordance with one embodiment of the present invention.

FIG. 27 is a flowchart illustrating a reading process of the face data performed by the imaging device 100. In this reading process, the discrepancy is detected using checksum. Steps S983 and S984 are substituted for steps S974 and S975 of FIG. 26. Steps S983 and S984 are described in detail below and the discussion of the remaining steps is omitted herein. Steps S983 and S984 are described below with reference to the header section 630 of FIG. 10.

Based on the version information of the face metadata recorded in the metadata version 632 of the header section 630 read in step S972, the imaging device 100 determines whether the version of the face metadata is supported thereby (step S973). If it is determined in step S973 that the version of the face data is supported by the imaging device 100, a checksum is calculated from the image data of the corresponding moving image content file (step S983). The checksum calculation of all image data is time consuming. Image data in a size not affecting the recording and playing process is extracted from the corresponding image data, and the checksum calculation is then performed on the extracted image data only. For example, the checksum calculation may be performed on the image data from start to 100th byte data. In this case, the checksum value of the error detection code value 639 of the header section 630 may be also calculated from the start to 100th byte data of the image data.

The imaging device 100 then determines whether the calculated checksum value equals the checksum value recorded in the error detection code value 639 of the header section 630 (step S984).

If it is determined in step S984 that the calculated checksum value equals the checksum value recorded in the error detection code value 639 of the header section 630, the face metadata is determined to be reliable. Processing proceeds to step S976. If it is determined in step S984 that the calculated checksum value is not equal to the checksum value recorded in the error detection code value 639 of the header section 630, processing proceeds to step S982. The process described herein is also applicable when CRC or hush function is used for the error detection code value. The discrepancy may be detected using at least two steps of the content update date and time comparison (step S974), the content image size comparison (step S975) and the checksum comparison (steps S983 and S984), discussed with reference to FIGS. 26 and 27.

A modification of the embodiment of the present invention is described below with reference to drawings.

The content file is a moving image content file here. The metadata entry containing the face metadata generated based on the moving image content file is recorded in the content management file 340 while also being recorded in the moving image content file. The face metadata is recorded as additional information to SEI NAL unit contained in access unit (AU) of FIG. 2.

As shown in FIG. 2, the timing of detecting the face contained in the moving image content file encoded in accordance with MPEG4-AVC is the appearing timing of IDR AU or non-IDR-I AU. For example, when a face is detected from a frame corresponding to IDR AU, the face metadata related to the detected face is recorded as the additional information to the SEI NAL unit contained in the IDR AU. For example, as shown in FIG. 2, a face is detected from the frame corresponding to AU 180. The face metadata corresponding to the detected face is recorded as the additional information of the SEI NAL unit 181 contained in the AU 180. If a face is detected from a frame corresponding to an AU 190, the face metadata related to the detected face is recorded as additional information of SEI NAL unit 191 contained in the AU 190.

The face metadata recorded in the SEI NAL unit (hereinafter referred to as SEI) is face metadata 620 composed of the header section 630 of FIG. 10 and the face data section 640 of FIG. 11. As previously discussed with reference to FIGS. 13 through 16, the face data section 640 contains only necessary information.

A predetermined condition the face data recorded in the SEI needs to satisfy is described in detail with reference to FIG. 28. When the value of the face data is recorded in the face data section of the content management file 340, the face data to be recorded onto the face data section, of the detected faces within one frame, is restricted in accordance with the predetermined condition (such as a face size, position, and a change in the number of previously detected faces). When the face data is recorded in the SEI, the face metadata of the faces detected within one frame is recorded as much as possible. More specifically, the face data is recorded in the SEI under the condition less severe than the condition that applies to the recording of the face data in the content management file 340.

An upper limit is set to the number of faces to be stored in the SEI and only if the number of detected faces exceeds the upper limit, the face metadata to be recorded onto the SEI may be restricted based on the size and position of the detected face. The recording method of the face data is described with reference to FIG. 28.

Figure 28:
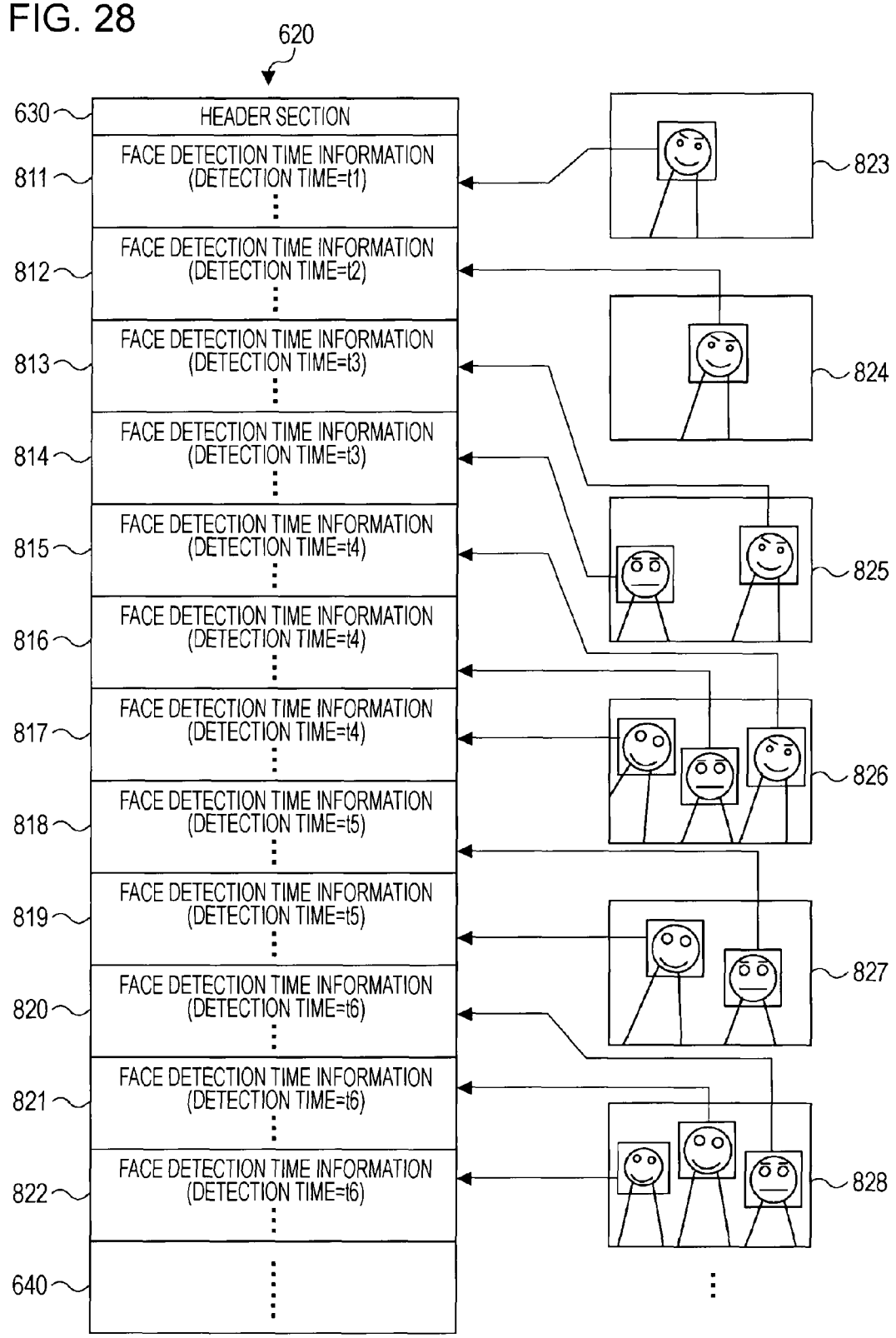
FIG. 28 illustrates a relationship between a face detected in frames and the face data in accordance with one embodiment of the present invention.

FIG. 28 illustrates a relationship of faces detected from frames 823 through 828 forming a moving image content file and face data 811 through 822 recorded in a face data section 840. As shown in FIG. 28, each of the faces detected from the frames 823 through 828 is enclosed in a rectangular outline. Two faces are detected from each of the frames 825 and 827 and three faces are detected from each of the frames 826 and 827.

The number of faces detected from the frame 823 at detection time t1 equals the number of faces detected from the frame 824 at detection time t2. If the number of faces is not above the upper limit, the face data of the face detected from the frame 823 at detection time t1 and the face detected from the frame 824 at detection time t2 are recorded in the face data section 640. The number of faces detected from the frame 827 at detection time t5 is smaller than the number of faces detected from the frame 826 at detection time t4, but the number of detected faces in each case is not above the upper limit. The face data of the faces detected from the frame 826 at detection time t4 and the faces detected from the frame 827 at detection time t5 is recorded in the face data section 640.

The predetermined condition on recording the face data onto the content management file 340 may be as below, for example. If the number of faces detected from one frame at one detection time equals the number of faces detected from a next frame at a next detection time, the face data of the face detected from the next frame is not recorded. Since the number of faces remains unchanged, the metadata of the same faces is likely to be recorded. If the number of faces detected from the next frame at the next detection time is smaller than the number of faces detected from the preceding frame, the face data of the faces detected from the next frame is left unrecorded.

As shown in FIG. 28, the number of faces detected from the frame 823 at detection time t1 equals the number of faces detected from the frame 824 at detection time t2, and the face data of the faces detected from the frame 824 at detection time t2 is not recorded in the face data section 640. The number of faces detected from the frame 827 at detection time t5 is smaller than the number of faces detected from the frame 826 at detection time t4. The face data of the faces detected from the frame 825 at detection time t5 is not recorded in the face data section 640.

Whether to record the face data in the SEI may be determined under the condition milder than the condition that is applied to the recording of the face metadata in the moving image content file. Even if the content file containing the SEI having the record of the face data is transferred from the recording device having the record of the face data to another device, the content file may find more applications on the destination device.

When the face metadata of the detected face is recoded on the recording device under the predetermined condition, the face metadata recoded under the predetermined condition on the source recording device is not necessarily useful on the destination device. To allow the face metadata to find more applications on the destination device, the condition under which the face data is recorded in the SEI is set to be milder so that a relatively larger number of units of face data is recorded. The face metadata is thus selected from a wider range.

It is not necessary that the face metadata be recorded in both the content management file and the moving stream.

When the face detection time information is recorded in the content management file, the time information is also recorded in the another NAL unit in the AU containing the SEI. The face detection time information may be left unrecorded from the SEI. In this way, the data size of the face metadata is reduced. The AU from which the face is detected is an AU that serves as an editing point. For this reason, even if the moving image is deleted in the middle thereof, the face detection time information is kept as the correct value thereof. When the face metadata in the content management file is maintained in the editing of the moving image stream, the time information recorded in the other NAL unit of the AU containing the SEI may be used.

The recording device containing the content management file may have a record of the face metadata in the stream. For example, if the content management file is destroyed, the face metadata in the content management file is quickly restored using the face metadata in the stream. As a result, the face metadata in the content management file is re-constructed quickly in comparison with a correction method in which face detection is performed on all streams and the face metadata is then corrected.

The recording device containing no content management file may have a record of the face metadata in the SEI NAL unit only of the predetermined AU of the moving image stream. In such a case, the face metadata recorded in the moving image stream is used to perform applications quickly. If the moving image stream has no face metadata, the device needs to detect a face from the moving image stream. Execution of applications can take more time.

The content file may be a still image content file. The face metadata generated from the still image content file may be recorded in the still image content file rather than in the content management file 340. Such a recording process is described below.

FIG. 29 diagrammatically illustrates a file structure of the still image content file recorded in accordance with design rule for camera file system (DCF). The DCF is a file system standard that applies to a shared-use of an image among devices including digital still cameras and printers with the image transferred in a recording medium. The DCF also defines file naming and folder structure in the data recording to the recording medium based on exchangeable image file format (Exif). Exif is a standard that applies to attachment of image data and camera information to an image file and defines a file format in the recording of the image file.

Figure 29A:
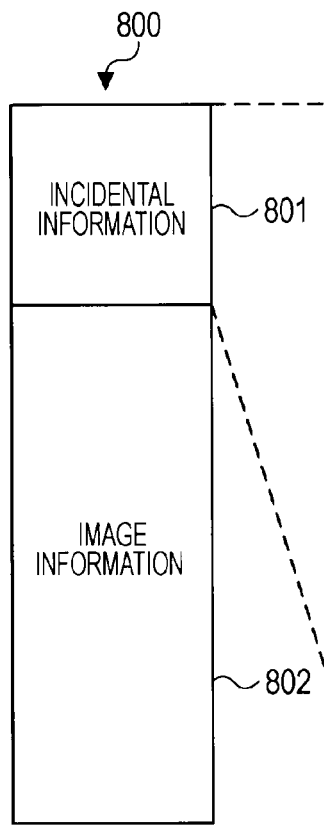
FIG. 29 illustrates a file structure of a still image file recorded in accordance with design rule for camera file system (DCF) standard in accordance with one embodiment of the present invention.

A still image file 800 is recorded in accordance with the DCF standard. As shown in FIG. 29A, the still image file 800 contains incidental information 801 and image information 802. The image information 802 is image data of a subject captured by the camera section 110.

Figure 29B:
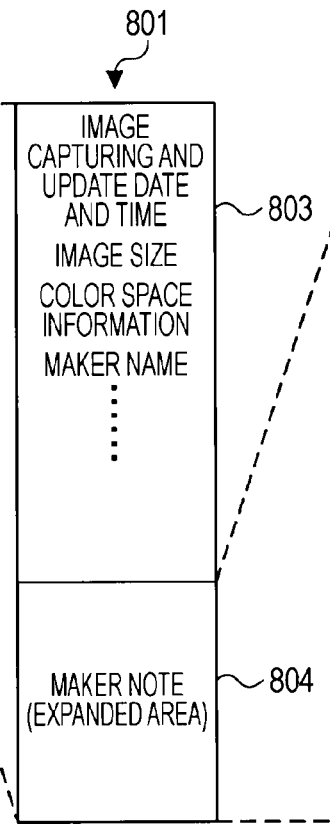

The incidental information 801 contains incidental information 803 and a maker note 804 as shown in FIG. 29B. The incidental information 803 relates to the still image file 800 and contains image capturing and update date and time, an image size, color space information, maker name, etc. The incidental information 803 further contains rotation information (TAGID=274, orientation) indicating whether the image has been rotated or not. The rotation information may be left unset with the rotation information of the image unrecorded as Exif (i.e., no rotation information recorded in tag). Even if the rotation information is set, "0" may be set as an invalid value.

Figure 29C:
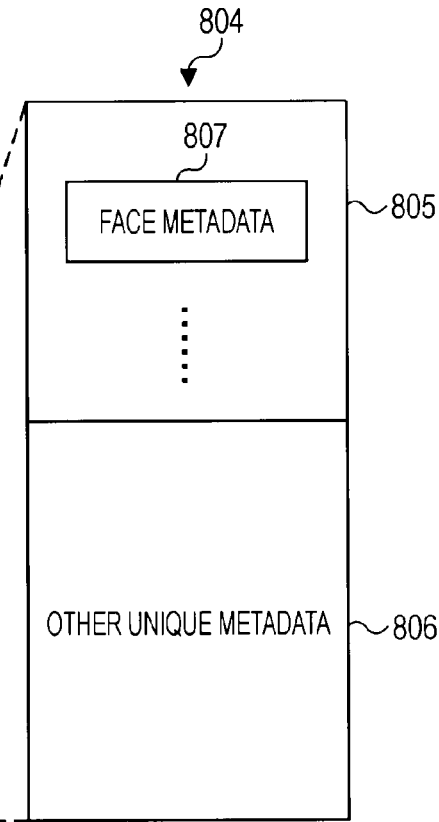

The maker note 804 serves as a region where user's own unique data may be recorded. The maker note 804 also serves as an expanded area where each maker can freely record information (TAGID=37500, MakerNote). As shown in FIG. 29C, the face metadata is recorded in the maker note 804. The maker note 804 contains a face metadata recording area 805 and a recording area 806. The face metadata recording area 805 records at least one unit of face metadata such as face metadata 807. The recording area 806 records unique metadata. In the recording of the face metadata in the still image content file, the face metadata is recorded in the maker note 804 defined by Exif.

The face metadata to be recorded in the maker note 804 is described below. The face metadata to be recorded in the maker note 804 is the face metadata 620 composed of the header section 630 of FIG. 10 and the face data section 640 of FIG. 11. As previously discussed with reference to FIGS. 13 through 16, the face data section 640 is the necessary information. Since the still image content file does not need the time scale 634 out of the information recorded in the header section 630, "0" is recorded in the time scale 634. Rather than using metadata varied from the still image to the moving image, the use of the same amount of metadata allows the header section 630 to be fixed in data length. Data accessing to the header section 630 is thus facilitated. Recording metadata different in length between the moving image and the still image imposes more workload on the recording device. The use of similar face metadata, regardless of whether the image is a moving image or a still image, lightens workload.

Figure 30:
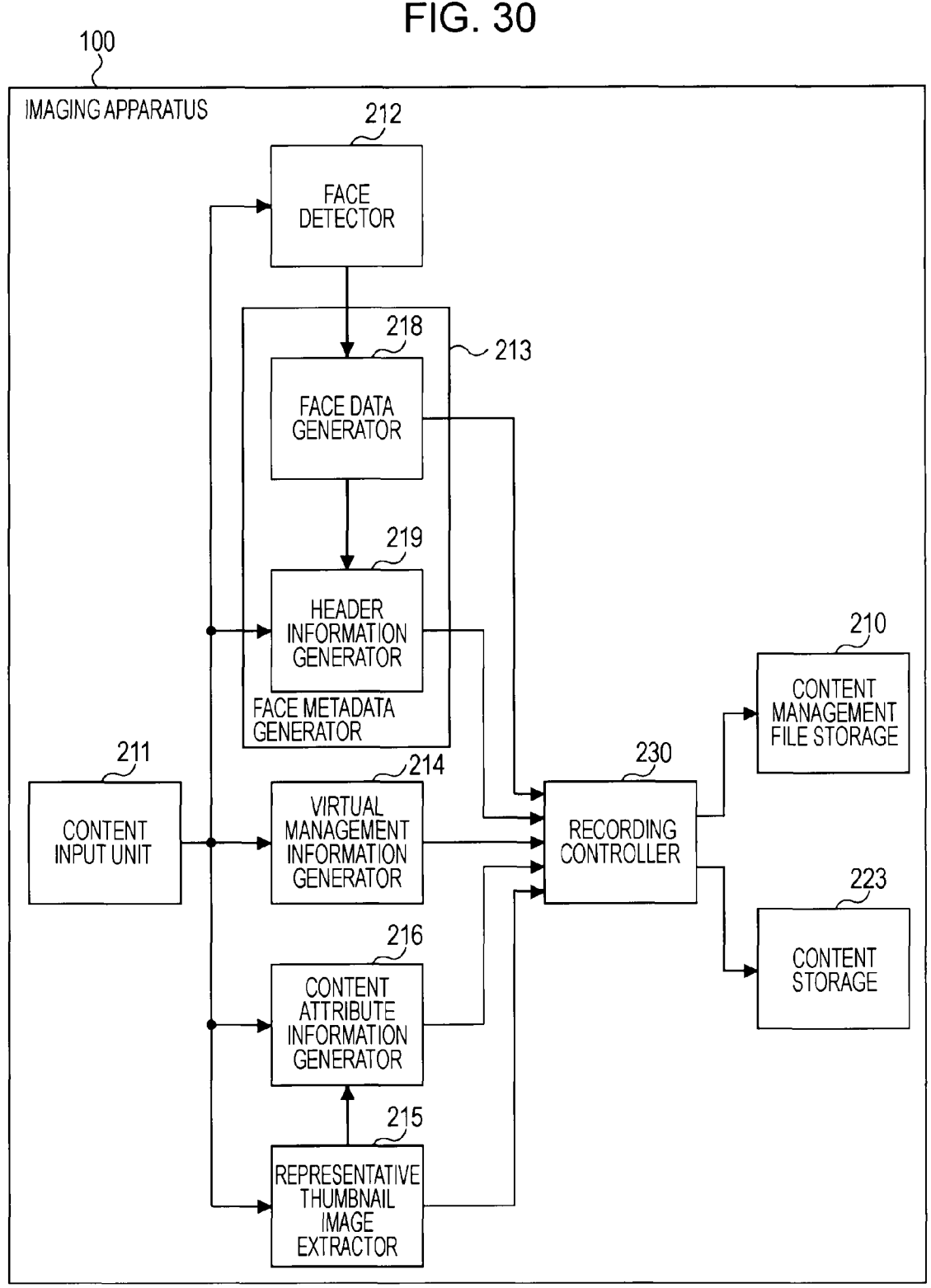
FIG. 30 is a functional block diagram illustrating the imaging device 100 in accordance with a modification of the embodiment of the present invention.

FIG. 30 is a functional block diagram illustrating the imaging device 100 as modification of the embodiment of the present invention. The imaging device 100 includes the content management file storage 210, the content input unit 211, the face detector 212, the face metadata generator 213, the virtual management information generator 214, the representative thumbnail image extractor 215 and the content attribute information generator 216. The imaging device 100 further includes a content storage 223 and a recording controller 230. The content management file storage 210, the content input unit 211, the content storage 223 and the recording controller 230, each different from the counterparts in FIG. 17, are described below and the rest of the elements are not described herein.

The content management file storage 210 stores the content management file 340 containing a record of a layer entry having a virtual layer structure. The content management file storage 210 does not store a layer entry for the still image.

The content input unit 211 receives a content file and then outputs the received content file to each of the face detector 212, the face metadata generator 213, the virtual management information generator 214, the representative thumbnail image extractor 215, the content attribute information generator 216 and the recording controller 230. More specifically, frames of the moving image captured by the camera section 110 are successively input via the content input unit 211. The still image, captured by the camera section 110, is successively input via the content input unit 211.

The recording controller 230 records the face metadata generated by the face metadata generator 213 into the content file corresponding to that face metadata. The recording controller 230 also records the face metadata generated for the moving image content file on a per IDR picture basis or on a per I picture basis onto the SEI in the AU containing the IDR picture or the I picture corresponding to the face metadata. The recording controller 230 records the face metadata generated at predetermined intervals in the moving image content file. In such a recording process, the recording controller 230 uses a recording condition milder than a recording condition applied to the recording of the face metadata to the content management file 340. The recording controller 230 does not record the face metadata of the still image on the content management file 340.

The content storage 223 stores the content file such as a moving image or a still image with the face metadata thereof recorded.

An application environment of the still image and the moving image is briefly described below.

The still image is typically transferred from device to device in a recorded state thereof in a recording medium and provides a higher portability than the moving image. When the still image is transferred, a destination device is likely to use an image management application software program not supporting the content management file. For this reason, the management of the still image with the content management file is considered unnecessary.

A large number of application software programs editing still image files on a personal computer are available. Among the application software program, some correct maker note in Exif but do not maintain correctly camera information (update date and time, rotation information, etc.) even if the still image has been trimmed or rotated. A still image file, edited using such an application software program, may be returned back to the recording device having detected the face. In such a case, the face cannot be correctly extracted even if the user attempts to extract the face from the still image using the face data representing the face position.

To avoid such an inconvenience, the image size information is used together with the update date and time information present in the still image content file. The possibility of detecting the discrepancy is thus increased.

Since content playing environment such as advanced video codec high definition (AVCHD) and blu-ray disc (BD) are currently not well established, it is likely that the moving image cannot be played on a PC application software program other than the PC application software program running on the imaging apparatus that has originally captured the moving image. It is thus likely that the user uses the PC application software program that supports the content management file. The moving image is thus managed by the content management file in view of the merit of accessing to the metadata. The metadata of the moving image content is also recorded in the content management file.

If editing application software programs supporting moving image format are few, it is more likely that the update date and time recorded in the content management file or the moving image file, as a unique file, is maintained by a PC application software program supporting such a unique file.

Since application environment is different from the still image to the moving image, the imaging device 100 as the modification of the embodiment of the present invention manages, with the content management file, the moving image content file and the metadata (not limited to the face metadata) detected from the moving image content file. The imaging device 100 manages the still image content file with a standard file system rather than the content management file, and records the metadata contained in the still image content file in the still image file (namely, the maker note in Exif).

The reading process of the face data in accordance with the modification of the embodiment of the present invention is described in detail with reference to drawings.

Figure 31:
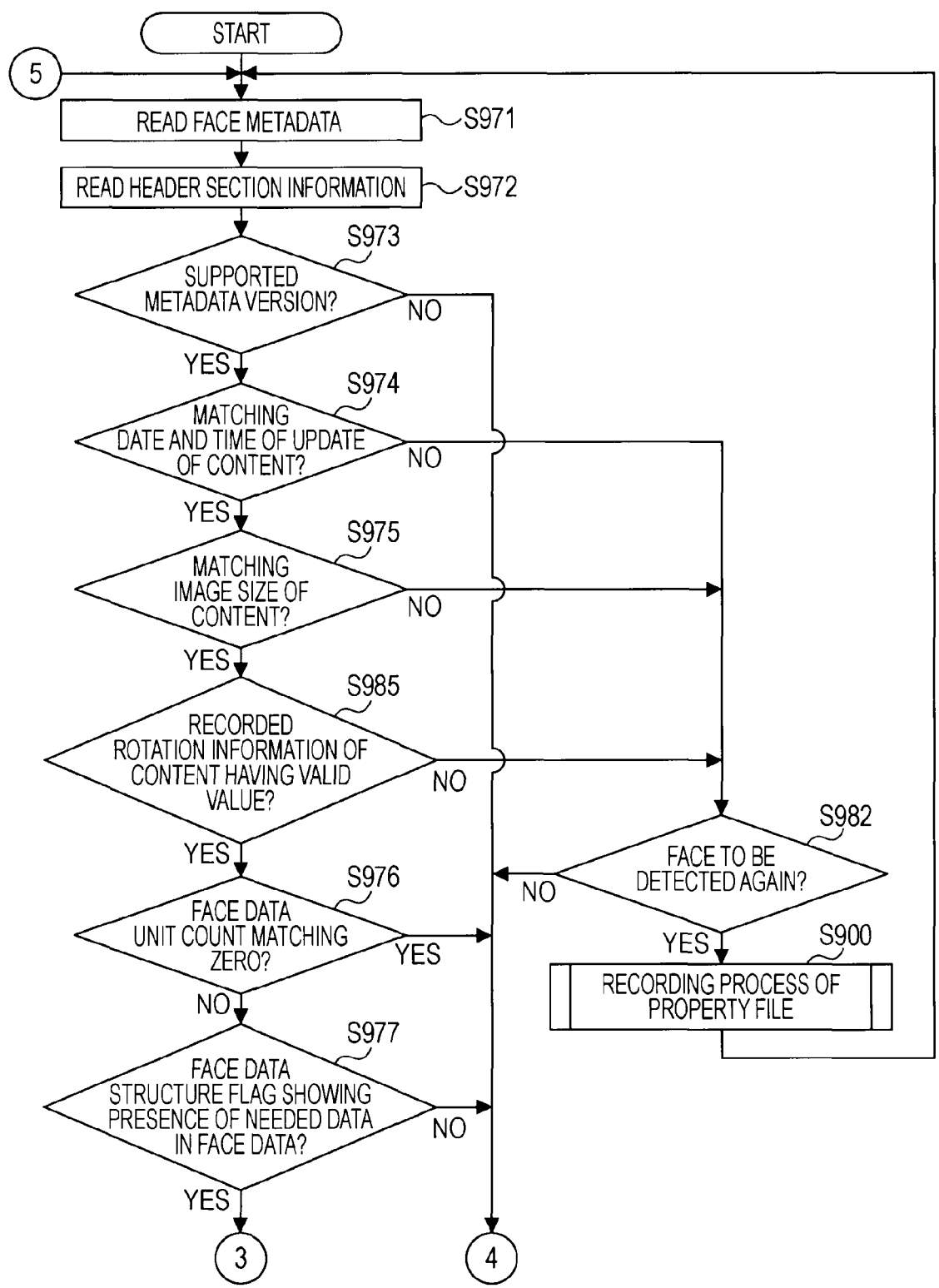
FIG. 31 is a flowchart illustrating a reading process of the face data performed by the imaging device in accordance with one embodiment of the present invention.
Figure 32:
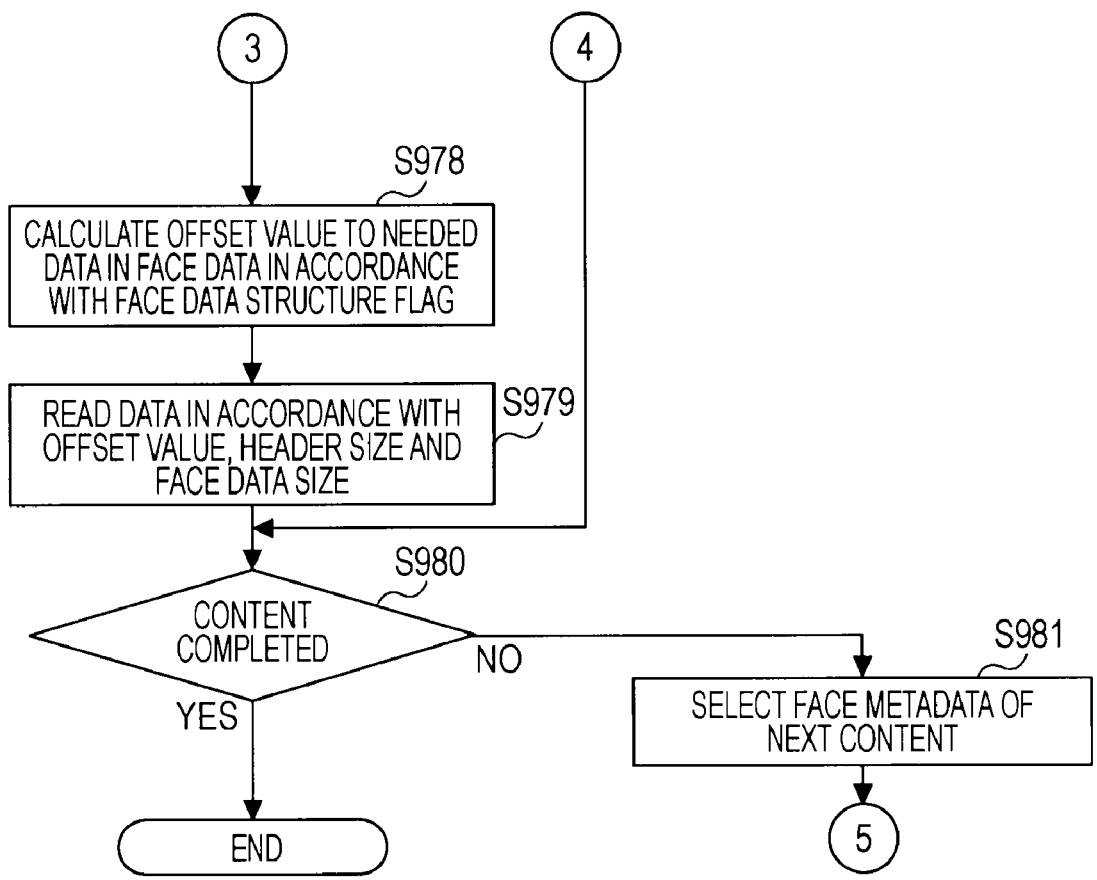
FIG. 32 is a continuation of the flowchart of FIG. 31 in accordance with one embodiment of the present invention.

FIGS. 31 and 32 are flowcharts illustrating the reading process of the face data performed by the imaging device 100. The discrepancy between the still image and the metadata is detected in the still image having the face metadata thereof recorded in the maker note 804 using the content update date and time, the content image size and the content rotation information. The process of FIG. 31 includes step S985 between steps S975 and S976 shown in FIG. 26. Step S985 is described in detail and the discussion of the other steps is omitted herein. The process is discussed with reference to the header section 630 of FIG. 10.

Based on the version information of the face metadata read in the metadata version 632 of the header section 630 read in step S972, the imaging device 100 determines whether the version of the face metadata is supported thereby (step S973). If the version of the face metadata is supported, processing proceeds to step S974. The imaging device 100 determines whether the update date and time of the corresponding still image content file match the update date and time recorded in the content update date and time 633 of the header section 630 (step S974). If the update date and time of the corresponding still image content file match the update date and time recorded in the content update date and time 633 of the header section 630 (step S974), processing proceeds to step S975. If not, processing proceeds to step S982. The imaging device 100 determines whether the image size of the corresponding still image content file equals the image size recorded in the content image size 638 of the header section 630 (step S975). If the image size of the corresponding still image content file equals the image size recorded in the content image size 638 of the header section 630 (step S975), processing proceeds to step S985. If not, processing proceeds to step S982.

If the update date and time of the corresponding still image content file match the update date and time recorded in the content update date and time 633 of the header section 630 (step S974), and then if the image size of the corresponding still image content file equals the image size recorded in the content image size 638 of the header section 630 (step S975), the imaging device 100 determines whether rotation information of the still image content file is present and whether a valid value is recorded as the rotation information (step S985). If it is determined in step S985 that the rotation information of the corresponding still image content file is present and that the valid value is recorded in the rotation information, processing proceeds to step S976.

If it is determined in step S985 that the rotation information of the corresponding still image content file is not present or that an invalid value is recorded in the rotation information, it is more likely that the image has been rotated. Processing proceeds to step S982. The above-described process is repeated. The possibility of detecting the discrepancy is increased taking into consideration the rotation, trimming and definition conversion of the image relatively often used in the editing of the still image content file. The discrepancy may be detected using at least two of the content update date and time conversion, the content image size conversion, the checksum conversion and the rotation information verification discussed with reference to FIG. 31.

An example of execution of applications using the face metadata is described below.

Figure 33A:
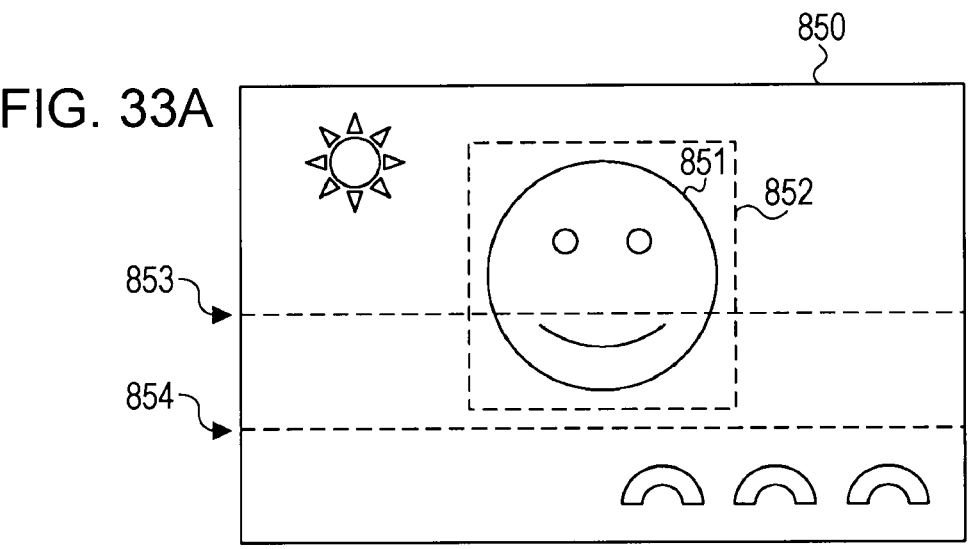
FIGS. 33A-33C illustrate a display example in a slide show of the still image content file in accordance with one embodiment of the present invention.
Figure 33B:
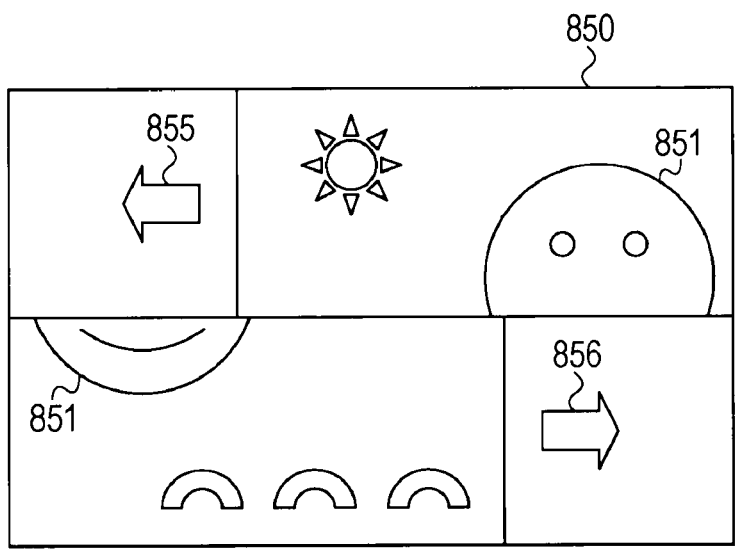
Figure 33C:
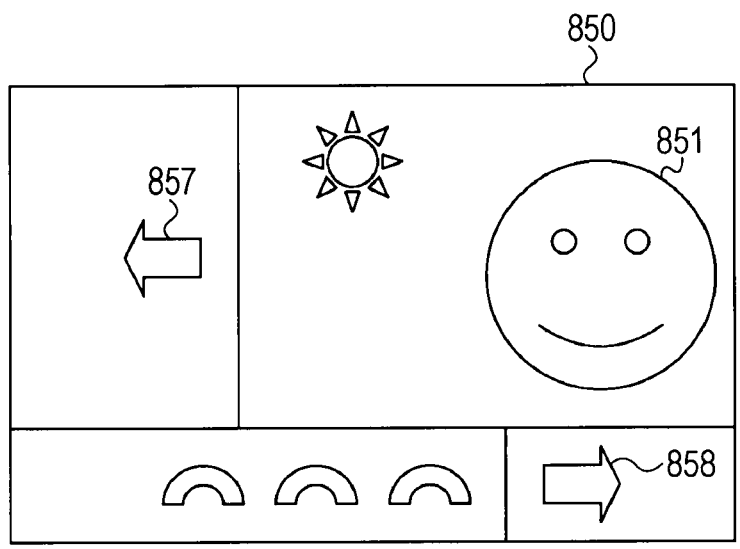

FIGS. 33A-33C illustrate a display example with which a slide show is performed for the still image content file. FIG. 33A illustrates an image containing a face 851 displayed on a display 850. The face data of the face 851 is recorded in the maker note of the still image file and an area 852 containing the face 851 is recognized from the face data.

If one image is displayed in a slide shown, the image may be split at an approximately center line into an upper half and a lower half. The upper half is then shifted rightward, and the lower half is shifted leftward. The slide shown is thus performed the single image played with a transition effect.

If the slide show is performed with the transition effect as shown in FIG. 33A, the image is split at a broken line 853 as an approximate center line, the upper half image is gradually shifted in a direction denoted by an arrow 855 and the lower half image is shifted in a direction denoted by an arrow 856 until the entire image is shown as shown in FIG. 33B. If the image is split along the broken line 853, an entire face 851 cannot be seen until the split upper and lower images merge back again.

When the image containing the face is displayed in a slide show with a transition effect, the face position is learned based on the basic face information contained in the face metadata recorded in the maker note so that the split line to split the image into the upper half and the lower half is adjusted. In this way, the face 851 contained in an area 852 is prevented from being split. For example, the image is split along a broken line 854 of FIG. 33A so that the face 851 contained in the area 852 may not be split. In the middle of shifting of the split images, the face 851 is entirely seen as shown in FIG. 33C.

As shown in FIG. 33A, a slide show is performed on an image having the face data thereof recorded in the maker note with a transition effect different from the above-described transition effect. For example, a transition effect may be performed in a manner such that the face is changed from a zoomed size to an original size. The face is thus prevented from being split. The transition effect may be switched between the image containing the face and the image containing no face in a slide so that the image containing the face is effectively displayed.

The face metadata attached to the image data captured by the recording device such as a digital still camera or a digital video camera may be used on a player device such as a video player. Such a process is described below.

Figures 34A, 34C:
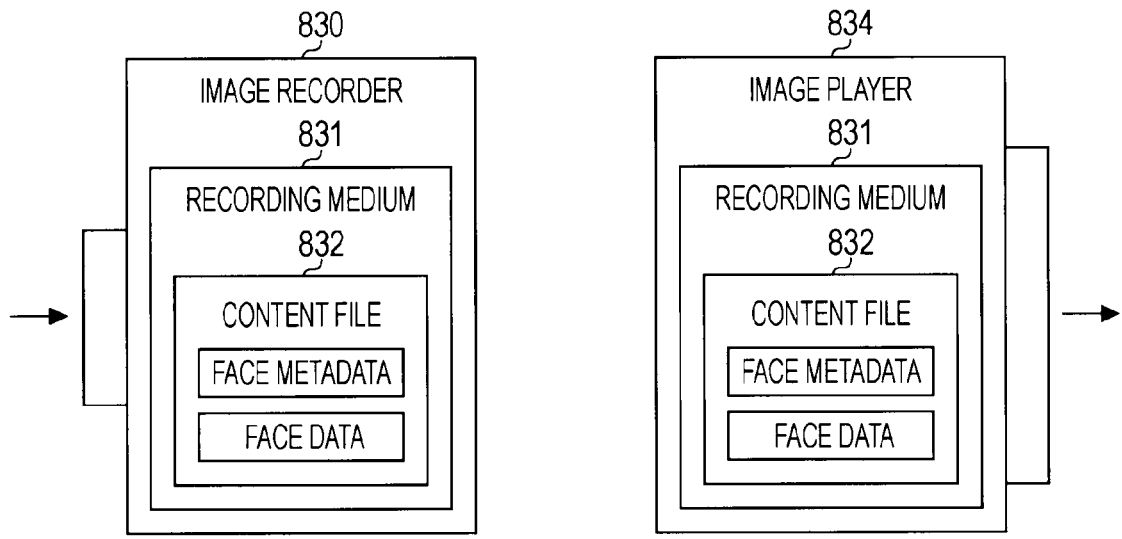
FIGS. 34A-34C illustrate an image recording device and an image player device, each connected to a removably loaded recording medium in accordance with one embodiment of the present invention.
Figure 34B:
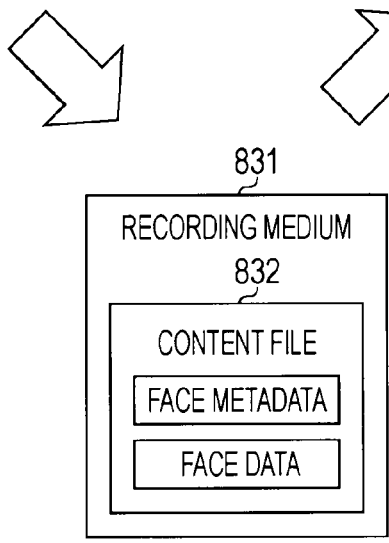

FIGS. 34A-34C illustrate an image recorder 830 and an image player 834. A recording medium 831 is removably loaded onto each of the image recorder 830 and the image player 834. The face metadata contained in the content file is used. Each of the image recorder 830 and the image player 834 is generally identical in structure to the imaging device 100 of FIGS. 17, 18 and 30.

As shown in FIG. 34A, an image of a subject is picked up with the recording medium 831 loaded on the image recorder 830. The image data thus captured and the face metadata generated from the image data are recorded as a content file 832 on the recording medium 831. When the image player 834 plays the content file 832, the recording medium 831 is removed from the image recorder 830 as shown in FIG. 34B and then connected to the image player 834 as shown in FIG. 34C. The content file 832 recorded on the recording medium 831 is thus input to the image player 834 for playing.

The image player 834 can use the metadata attached by the image recorder 830. The image player 834 without the face detection function can still play the content file 832 using the face metadata. Mobile terminals, typically having modest performance level, can perform sophisticated playing applications. A player device having the face detection function is still free from searching faces, playing process time is substantially reduced.

Figure 35:
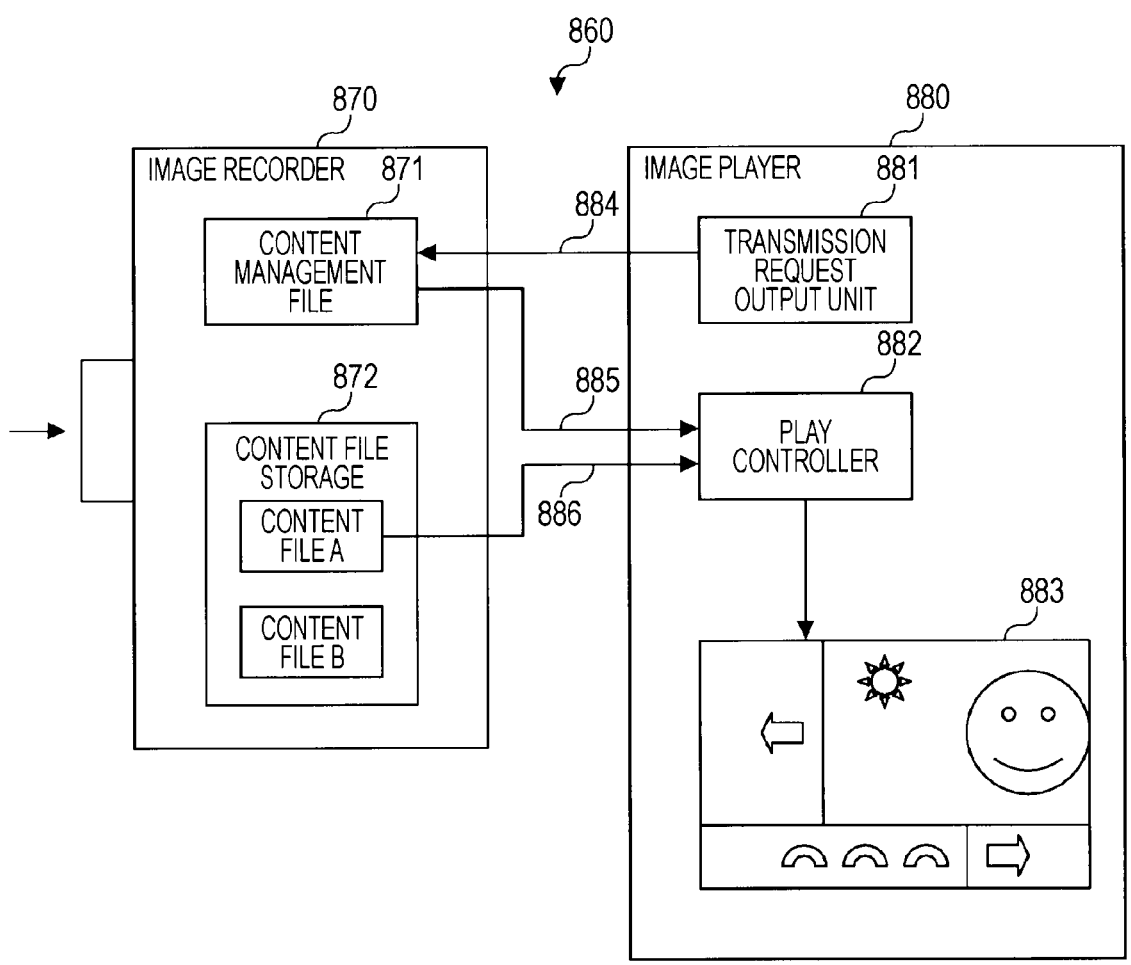
FIG. 35 illustrates a system configuration of an image processing system including the image recording device and the image player device in accordance with one embodiment of the present invention.

FIG. 35 is a system configuration of an image processing system 860 including an image recorder 870 and an image player 880. The image recorder 870 is connected to the image player 880 via a device interface such as a USB cable.

The image recorder 870 is an image recording device such as a digital still camera or a digital video camera. The image captured is stored on a content file storage 872 as a content file and face metadata related to the content file is recorded in a content management file 871.

The image player 880 includes a transmission request output unit 881, a play controller 882 and a display 883. The image player 880 reads the content file stored on the content file storage 872 in the image recorder 870 connected via the device interface and plays the read content file by displaying the content file on the display 883. The image recorder 870 is substantially identical in structure to the imaging device 100 of FIGS. 17, 18 and 30. The discussion of the rest of the image recorder 870 is omitted herein.

The transmission request output unit 881 outputs a transmission request to a signal line 884 in order to extract desired metadata from the metadata contained in the metadata entry recorded in the content management file 871 of the image recorder 870. The desired metadata is extracted from the metadata contained in the metadata entry recorded in the content management file 871 in response to the transmission request output to the signal line 844. A content file recorded on the content file storage 872 is extracted in accordance with virtual management information contained in the file entry recorded on an upper layer of the metadata entry containing the extracted metadata. The metadata extracted from the content management file 871 is output to a signal line 885 while the content file extracted from the content file storage 872 is output to a signal line 886.

The play controller 882 controls playing of the content file using the metadata output to the signal line 885 from the content management file 871. The content file is output from the content file storage 872 to the signal line 886 to be displayed on the display 883.

The image player 880 reads the content management file 871 from the image recorder 870, extracts necessary metadata from the read content management file 871, and uses the extracted metadata during playing of the content file. As previously discussed with reference to FIGS. 33A-33D, the image player 880 displays the content file stored on the content file storage 872 on the display 883 using the metadata of the content management file 871 recorded on the image recorder 870.

In the above discussion, the USB cable is used as connection means to connect the image recorder 870 to the image player 880. Another connection means such as a network including a wired line or a wireless line is also acceptable.

In accordance with embodiments of the present invention, desired metadata is searched quickly and a corresponding content file is also searched quickly. A desired application software program is executed fast. The metadata of the content file is thus quickly used.

A large number of application programs using the face metadata are currently being developed and a variety of application programs using the face metadata are expected to be available in future. Also, format extension of the face metadata is expected in future. In accordance with embodiments of the present invention, the player device assures compatibility with a format extension if the format of the face metadata is extended in future. The metadata of the content file is quickly used.

The content file is thus quickly used in accordance with embodiments of the present invention.

In accordance with one embodiment of the present invention, the metadata is the face metadata related to the human face. The embodiments of the present invention are also applicable to other metadata. For example, a face of an animal contained in an image is detected using an animal recognition or pet recognition algorithm and metadata related to the detected animal face is used. The embodiments of the present invention are also applicable in such an application. A pet detection engine is substituted for the face detection engine. The metadata related to a pet detected by the pet detection engine is used. The embodiments of the present invention may also be applicable in such an application. Behavior of persons or animals is recognized and metadata containing a record of the recognized behavior expressed in a predetermined description is used. The embodiments of the present invention may also applicable in such an application. The content recording device is an imaging device in the above discussion. The embodiments of the present invention may also applicable to a content recording device such as a mobile terminal recording a content file. The embodiments of the present invention may also applicable to a content player device such as a digital versatile disc (DVD) recorder playing content.

The embodiments of the present invention have been described for exemplary purposes only, and correspondence between elements of the claim and the features of the embodiments of the present invention are described below. The present invention is not limited to the above-reference embodiments and a variety of changes are possible to the above-described embodiment without departing from the scope of the present invention.

The image player system corresponds to the image processing system 860, for example. The image recording device corresponds to the imaging device 100, for example. The player device corresponds to the imaging device 100, for example. The imaging device corresponds to the imaging device 100, for example.

The image input unit corresponds to the content input unit 211, for example.

The face detection unit corresponds to the face detector 212, for example.

The face data generation unit corresponds to the face data generator 218, for example.

The face data management information generation unit corresponds to the header information generator 219, for example.

The record control unit corresponds to the recording controller 217, for example.

The information component verification unit corresponds to the extractor 225, for example. The information component reading unit corresponds to the extractor 225, for example.

The recording offset value calculating unit corresponds to the extractor 225, for example.

The update information comparison unit corresponds to the extractor 225, for example.

The search means corresponds to the extractor 225, for example.

The image size comparison unit corresponds to the extractor 225, for example.

The rotation information verification unit corresponds to the extractor 225, for example.

The error detection code value calculating unit corresponds to the extractor 225, for example. The error detection code value comparison unit corresponds to the extractor 225.

The version verification unit corresponds to the extractor 225, for example.

The imaging unit corresponds to the camera section 110, for example.

The step of inputting the image corresponds to step S901, for example. The step of detecting the face corresponds to step S903, for example. The step of generating the face data corresponds to step S905, for example. The step of generating the face data management information corresponds to step S908, for example. The step of controlling the recording corresponds to steps S912 through S914.

The series of steps described above may be identical to one of a method including the series of steps, a computer program for causing a computer to perform the series of steps and a recording medium storing the computer program.

It should be understood by those skilled in the art that various modifications, combinations, sub-combinations and alterations may occur depending on design requirements and other factors insofar as they are within the scope of the appended claims or the equivalents thereof.

What is claimed is:

1. An image player system, comprising an image recording device, having image input means for inputting an image containing a subject, and a player device for playing the image input to the image recording device, wherein the image recording device includes:
face detection means for detecting a face of the subject contained in the input image;
face data generation means for generating face data related to the face based on the detected face;
face data management information generation means for generating face data management information managing the generated face data; and
record control means for controlling recording of the generated face data and the generated face data management information onto predetermined recording means,
the face data including a plurality of information components, the information components being recorded in a predetermined recording sequence,
the face data management information being in a data structure having a train of bits assigned in the recording sequence of the information components of the face data, and containing face data structure information related to a presence or absence of the information component of the face data in the recording sequence; and
wherein the player device includes:
information component verification means for verifying the presence or absence of the information component forming the face data in accordance with the face data structure information contained in the face data management information;
recording offset value calculating means for calculating a recording offset value from a head of each face data of a desired information component out of information components forming the face data verified by the information component verification means; and
information component reading means for reading the desired information component out of the information components forming the face data in accordance with the calculated recording offset value.

2. An image recording device comprising:
an image input unit inputting an image containing an subject;
a face detection unit detecting a face of the subject contained in the input image;
a face data generation unit generating face data related to the face based on the detected face;
a face data management information generation unit generating face data management information managing the generated face data; and
a record control unit controlling recording of the generated face data and the generated face data management information onto predetermined recording unit,
the face data including a plurality of information components, the information components being recorded in a predetermined recording sequence, and the face data management information containing face data structure information in a data structure having a train of bits assigned in the recording sequence of the information components of the face data, wherein the face data structure information has a data structure of a train of consecutive bits with predetermined flags assigned in the recording sequence to the information components recorded in the recording sequence, and each flag indicates the presence or absence of the information component corresponding to the flag in the face data.

3. The image recording device according to claim 2, wherein the face data structure information comprises a reserve bit train reserved for extended face data other than the information components.

4. The image recording device according to claim 2, wherein the face data generation unit leaves ungenerated the face data of a face detected by the face detection unit if the detected face fails to satisfy a predetermined condition.

5. An image recording device comprising:
an image input unit inputting an image containing an subject;
a face detection unit detecting a face of the subject contained in the input image;
a face data generation unit generating face data related to the face based on the detected face;
a face data management information generation unit generating face data management information managing the generated face data; and
a record control unit controlling recording of the generated face data and the generated face data management information onto predetermined recording unit,
the face data including a plurality of information components, the information components being recorded in a predetermined recording sequence, and
the face data management information containing face data structure information in a data structure having a train of bits assigned in the recording sequence of the information components of the face data, wherein
the face data management information comprises data size information indicating a data size of the corresponding face data and version information indicating a version of the face data.

6. The image recording device according to claim 2, wherein the face data comprises data regarding a position and a size of the face detected by the face detection means.

7. An image recording device comprising:
an image input unit inputting an image containing an subject;
a face detection unit detecting a face of the subject contained in the input image;
a face data generation unit generating face data related to the face based on the detected face;
a face data management information generation unit generating face data management information managing the generated face data; and
a record control unit controlling recording of the generated face data and the generated face data management information onto predetermined recording unit,
the face data including a plurality of information components, the information components being recorded in a predetermined recording sequence, and
the face data management information containing face data structure information in a data structure having a train of bits assigned in the recording sequence of the information components of the face data, wherein
the image is a moving image file, and
the face detection means detects a face, contained in the moving image file, every predetermined time intervals.

8. The image recording device according to claim 7, wherein the record control unit records the face data and the face data management information, related to the detected face, in the moving image file from which the face has been detected.

9. An image recording device comprising:
an image input unit inputting an image containing an subject;
a face detection unit detecting a face of the subject contained in the input image;
a face data generation unit generating face data related to the face based on the detected face;
a face data management information generation unit generating face data management information managing the generated face data; and
a record control unit controlling recording of the generated face data and the generated face data management information onto predetermined recording unit,
the face data including a plurality of information components, the information components being recorded in a predetermined recording sequence, and
the face data management information containing face data structure information in a data structure having a train of bits assigned in the recording sequence of the information components of the face data, wherein
the image is an AVC codecked moving image file, and
the face detection unit detects a face in one of an IDR picture and an I picture contained in an SPS attached AU.

10. The image recording device according to claim 9, wherein the record control unit records the face data and the face data management information, related to the detected face, in SEI in the AU containing one of the IDR picture and the I picture from which the face has been detected.

11. The image recording device according to claim 2, wherein
the image is a still image file, and
the record control unit records the face data and the face data management information, related to the detected face, in the still image file from which the face has been detected.

12. A player device for playing an image in accordance with face data and face data management information, the face data related to a face contained in the image and including a plurality of information components, the information components being recorded in a predetermined recording sequence, the face data management information managing the face data and being in a data structure having a train of consecutively assigned bits in the recording sequence of the information components of the face data, and containing face data structure information related to a presence or absence of the information component of the face data in the recording sequence of the information components of the face data, the player device comprising:
information component verification means for verifying the presence or absence of the information component forming the face data in accordance with the face data structure information contained in the face data management information;
recording offset value calculating means for calculating a recording offset value from a head of each face data of a desired information component out of information components forming the face data verified by the information component verification means; and
information component reading means for reading the desired information component out of the information components forming the face data in accordance with the calculated recording offset value.

13. The player device according to claim 12, wherein the image contains information regarding update date and time at which the image has been updated,
wherein the face data management information contains information regarding update date and time at which the corresponding image has been updated,
wherein the player device further comprises update information comparison means for comparing the update date and time contained in the image with the update date and time contained in the face data management information of the corresponding image to determine whether the update time and date in the image matches the update time and date in the face data management information, and
wherein the recording offset value calculating means calculates the recording offset value of the face data of the face contained in the image that the update information comparison means has determined as having matched update date and time.

14. The player device according to claim 13, further comprising:
face detection means for detecting a face of a subject contained in the image that the update information comparison means has determined as having unmatched update date and time;
face data generation means for generating the face data of the face based on the face detected by the face detection means;
face data management information generation means for generating face data management information managing the face data; and
record control means for controlling recording of the generated face data and the generated face data management information onto predetermined recording means, with respect to the image that the update information comparison means has determined as having unmatched date and time.

15. The player device according to claim 13, further comprising search means for searching for face data and face data management information, corresponding to an image different from the image that the update information comparison means has determined as having unmatched update date and time if the update information comparison means has determined that the update date and time in the image fail to match the update date and time in the face data management information.

16. The player device according to claim 13, wherein the image contains information regarding an image size,
wherein the face data management information contains information regarding an image size of the corresponding image,
wherein the player device further comprises image size comparison means for comparing the image size contained in the image with the image size contained in the face data management information of the corresponding image to determine whether the image size in the image matches the image size in the face data management information, and
wherein the recording offset value calculating means calculates the recording offset value of the face data of the face contained in the image that the image size comparison means has determined as having a matched image size.

17. The player device according to claim 16, wherein the image contains rotation information related to a rotation thereof,
wherein the player device further comprises rotation information verification means for verifying whether the rotation information is present in the image and whether the rotation information is valid, and
wherein the offset value calculating means calculates the recording offset value of the face data of the face contained in the image that the rotation information verification means has verified that the rotation information is present in the image and that the rotation information present in the image is valid.

18. The player device according to claim 12, wherein the face data management information contains an error detection code value determined from the corresponding image,
wherein the player device further comprises:
error detection code value calculating means for calculating the error detection code value based on at least a portion of image data of the image; and
error detection code value comparison means for comparing the calculated error detection code value of the image with the error detection code value contained in the face data management information of the corresponding image,
wherein the offset value calculating means calculates the recording offset value of the face data of the face contained in the image that the error detection code value comparison means has determined as having a matched error detection code value.

19. The player device according to claim 12, wherein the face data management information contains version information indicating a version of the face data,
wherein the player device further comprises version verification means for verifying, based on the version information contained in the face data management information, whether the face data corresponding to the face data management information is supported, and
wherein the offset value calculating means calculates the recording offset value of the face data that the version verification means has determined as being supported.

20. An imaging device, comprising:
imaging means for capturing an image of a subject;
image input means for inputting the image captured by the imaging means;
face detection means for detecting a face of the subject contained in the input image;
face data generation means for generating face data relating to the detected face;
face data management information generation means for generating face data management information managing the generated face data; and
record control means for controlling recording the generated face data and face data management information onto predetermined recording means,
the face data including a plurality of information components, the information components being recorded in a predetermined recording sequence, and
the face data management information containing face data structure information related to a presence or absence of the information component of the face data in a recording sequence and having a data structure having a train of bits assigned in the recording sequence of the information components of the face data.

21. An image recording method, comprising steps of:
inputting an image containing a subject;
detecting a face of the subject contained in the input image;

generating face data related to the face based on the detected face, the face data including a plurality information components, the information components being recorded in a predetermined recording sequence;

generating face data management information managing the generated face data, the face data management information containing face data structure information related to a presence or absence of the information component of the face data in a recording sequence and having a data structure having a train of bits assigned in the recording sequence of the information components of the face data; and controlling recording of the generated face data and face data management information onto a recording unit.

22. A non-transitory computer-readable medium including a computer program, which when executed by a computer, causes the computer perform steps of:

inputting an image containing a subject;

detecting a face of the subject contained in the input image;

generating face data related to the face based on the detected face, the face data including a plurality information components, the information components being recorded in a predetermined recording sequence;

generating face data management information managing the generated face data, the face data management information containing face data structure information related to a presence or absence of the information component of the face data in a recording sequence and having a data structure having a train of bits assigned in the recording sequence of the information components of the face data; and controlling recording of the generated face data and face data management information onto a recording unit.

23. An image player system, comprising an image recording device, having image input unit inputting an image containing a subject, and a player device playing the image input to the image recording device, wherein the image recording device includes:

a face detection unit detecting a face of the subject contained in the input image;

a face data generation unit generating face data related to the face based on the detected face;

a face data management information generation unit generating face data management information managing the generated face data; and a record control unit controlling recording of the generated face data and the generated face data management information onto predetermined recording unit, the face data including a plurality of information components, the information components being recorded in a predetermined recording sequence, the face data management information being in a data structure having a train of bits assigned in the recording sequence of the information components of the face data, and containing face data structure information related to a presence or absence of the information component of the face data in the recording sequence; and wherein the player device includes:

an information component verification unit verifying the presence or absence of the information component forming the face data in accordance with the face data structure information contained in the face data management information;

a recording offset value calculating unit calculating a recording offset value from a head of each face data of a desired information component out of information components forming the face data verified by the information component verification unit; and an information component reading unit reading the desired information component out of the information components forming the face data in accordance with the calculated recording offset value.

24. A player device playing an image in accordance with face data and face data management information, the face data related to a face contained in the image and including a plurality of information components, the information components being recorded in a predetermined recording sequence, the face data management information managing the face data and being in a data structure having a train of consecutively assigned bits in the recording sequence of the information components of the face data, and containing face data structure information related to a presence or absence of the information component of the face data in the recording sequence of the information components of the face data, the player device comprising:

an information component verification unit verifying the presence or absence of the information component forming the face data in accordance with the face data structure information contained in the face data management information;

a recording offset value calculating unit calculating a recording offset value from a head of each face data of a desired information component out of information components forming the face data verified by the information component verification unit; and an information component reading unit reading the desired information component out of the information components forming the face data in accordance with the calculated recording offset value.

25. An imaging device, comprising:

an imaging unit capturing an image of a subject;

an image input unit inputting the image captured by the imaging unit;

a face detection unit detecting a face of the subject contained in the input image;

a face data generation unit generating face data relating to the detected face;

a face data management information generation unit generating face data management information managing the generated face data; and a record control unit controlling recording the generated face data and face data management information onto a predetermined recording unit, the face data including a plurality of information components, the information components being recorded in a predetermined recording sequence, and the face data management information containing face data structure information related to a presence or absence of the information component of the face data in a recording sequence and having a data structure having a train of bits assigned in the recording sequence of the information components of the face data.

* * * * *